(12) United States Patent
Marchisio et al.

(10) Patent No.: US 7,953,593 B2
(45) Date of Patent: May 31, 2011

(54) METHOD AND SYSTEM FOR EXTENDING KEYWORD SEARCHING TO SYNTACTICALLY AND SEMANTICALLY ANNOTATED DATA

(75) Inventors: Giovanni B. Marchisio, Kirkland, WA (US); Krzysztof Koperski, Seattle, WA (US); Jisheng Liang, Bellevue, WA (US); Thien Nguyen, Edmonds, WA (US); Carsten Tusk, Seattle, WA (US); Navdeep S. Dhillon, Seattle, WA (US); Lubos Pochman, Breckenridge, CO (US); Matthew E. Brown, Portland, OR (US)

(73) Assignee: Evri, Inc., Seattle, WA (US)

( * ) Notice: Subject to any disclaimer, the term of this patent is extended or adjusted under 35 U.S.C. 154(b) by 98 days.

(21) Appl. No.: 12/401,386

(22) Filed: Mar. 10, 2009

(65) Prior Publication Data

US 2009/0182738 A1    Jul. 16, 2009

Related U.S. Application Data

(60) Division of application No. 11/012,089, filed on Dec. 13, 2004, now Pat. No. 7,526,425, which is a continuation-in-part of application No. 10/371,399, filed on Feb. 19, 2003, now Pat. No. 7,398,201, which is a continuation-in-part of application No. 10/007,299, filed on Nov. 8, 2001, now Pat. No. 7,283,951.

(60) Provisional application No. 60/620,550, filed on Oct. 20, 2004, provisional application No. 60/312,385, filed on Aug. 14, 2001.

(51) Int. Cl.
*G06F 17/27* (2006.01)
*G06F 17/30* (2006.01)
*G06F 7/00* (2006.01)

(52) U.S. Cl. ............ 704/9; 707/707; 707/708; 707/759; 707/771

(58) Field of Classification Search .................. None
See application file for complete search history.

(56) References Cited

U.S. PATENT DOCUMENTS 4,839,853 A    6/1989    Deerwester et al. .......... 364/900
(Continued)

FOREIGN PATENT DOCUMENTS

EP    0 280 866    9/1988
(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — Matthew J Sked
(74) *Attorney, Agent, or Firm* — Black Lowe & Graham PLLC

(57) ABSTRACT

Methods and systems for extending keyword searching techniques to syntactically and semantically annotated data are provided. Example embodiments provide a Syntactic Query Engine ("SQE") that parses, indexes, and stores a data set as an enhanced document index with document terms as well as information pertaining to the grammatical roles of the terms and ontological and other semantic information. In one embodiment, the enhanced document index is a form of term-clause index, that indexes terms and syntactic and semantic annotations at the clause level. The enhanced document index permits the use of a traditional keyword search engine to process relationship queries as well as to process standard document level keyword searches. In one embodiment, the SQE comprises a Query Processor, a Data Set Preprocessor, a Keyword Search Engine, a Data Set Indexer, an Enhanced Natural Language Parser ("ENLP"), a data set repository, and, in some embodiments, a user interface or an application programming interface.

27 Claims, 52 Drawing Sheets

U.S. PATENT DOCUMENTS

| | | | |
|---|---|---|---|
| 5,301,109 A | 4/1994 | Landauer et al. | 364/419.19 |
| 5,317,507 A | 5/1994 | Gallant | 364/419.13 |
| 5,325,298 A | 6/1994 | Gallant | 364/419.19 |
| 5,331,556 A | 7/1994 | Black, Jr. et al. | 364/419.08 |
| 5,377,103 A | 12/1994 | Lamberti et al. | 364/419.08 |
| 5,619,709 A | 4/1997 | Caid et al. | 395/794 |
| 5,778,362 A | 7/1998 | Deerwester | 707/5 |
| 5,794,050 A | 8/1998 | Dahlgren et al. | 395/708 |
| 5,794,178 A | 8/1998 | Caid et al. | 704/9 |
| 5,799,268 A | 8/1998 | Boguraev | 704/9 |
| 5,857,179 A | 1/1999 | Vaithyanathan et al. | 707/2 |
| 5,884,302 A | 3/1999 | Ho | 707/3 |
| 5,933,822 A | 8/1999 | Braden-Harder et al. | 707/5 |
| 5,950,189 A | 9/1999 | Cohen et al. | 707/3 |
| 6,006,221 A | 12/1999 | Liddy et al. | 707/5 |
| 6,026,388 A | 2/2000 | Liddy et al. | 707/1 |
| 6,061,675 A | 5/2000 | Wical | 706/45 |
| 6,064,951 A | 5/2000 | Park et al. | 704/8 |
| 6,122,647 A | 9/2000 | Horowitz et al. | 707/513 |
| 6,192,360 B1 | 2/2001 | Dumais et al. | 707/6 |
| 6,202,064 B1 | 3/2001 | Julliard | 707/5 |
| 6,219,664 B1* | 4/2001 | Watanabe | 1/1 |
| 6,246,977 B1 | 6/2001 | Messerly et al. | 704/9 |
| 6,363,373 B1 | 3/2002 | Steinkraus | 707/3 |
| 6,411,962 B1 | 6/2002 | Kupiec | |
| 6,460,029 B1 | 10/2002 | Fries et al. | |
| 6,510,406 B1 | 1/2003 | Marchisio | |
| 6,584,464 B1 | 6/2003 | Warthen | |
| 6,601,026 B2 | 7/2003 | Appelt et al. | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 6,745,161 B1 | 6/2004 | Arnold et al. | 704/7 |
| 6,757,646 B2 | 6/2004 | Marchisio | 704/8 |
| 6,859,800 B1 | 2/2005 | Roche et al. | 707/3 |
| 6,862,710 B1 | 3/2005 | Marchisio | 715/501.1 |
| 6,910,003 B1 | 6/2005 | Arnold et al. | 704/4 |
| 6,996,575 B2 | 2/2006 | Cox et al. | 707/102 |
| 7,051,017 B2 | 5/2006 | Marchisio | 707/3 |
| 7,054,854 B1 | 5/2006 | Hattori et al. | 707/3 |
| 7,171,349 B1 | 1/2007 | Wakefield et al. | 704/9 |
| 7,283,951 B2 | 10/2007 | Marchisio et al. | 704/9 |
| 7,356,778 B2* | 4/2008 | Hooper et al. | 715/841 |
| 7,398,201 B2 | 7/2008 | Marchisio et al. | 704/9 |
| 2002/0007267 A1 | 1/2002 | Batchilo et al. | 704/9 |
| 2002/0010574 A1* | 1/2002 | Tsourikov et al. | 704/9 |
| 2002/0059161 A1 | 5/2002 | Li | 707/1 |
| 2002/0078041 A1 | 6/2002 | Wu | 707/4 |
| 2002/0091671 A1 | 7/2002 | Prokoph | 707/1 |
| 2003/0004716 A1 | 1/2003 | Haigh et al. | 704/238 |
| 2003/0101182 A1 | 5/2003 | Govrin et al. | 707/7 |
| 2003/0115065 A1 | 6/2003 | Kakivaya et al. | 704/270.1 |
| 2003/0115191 A1 | 6/2003 | Copperman et al. | 707/3 |
| 2003/0233224 A1 | 12/2003 | Marchisio et al. | 704/4 |
| 2004/0125877 A1 | 7/2004 | Chang et al. | 375/240.28 |
| 2004/0167870 A1 | 8/2004 | Wakefield et al. | 707/1 |
| 2004/0167883 A1 | 8/2004 | Wakefield et al. | 707/3 |
| 2004/0167884 A1 | 8/2004 | Wakefield et al. | 707/3 |
| 2004/0167885 A1 | 8/2004 | Wakefield et al. | 707/3 |
| 2004/0167886 A1 | 8/2004 | Wakefield et al. | 707/3 |
| 2004/0167887 A1 | 8/2004 | Wakefield et al. | 707/3 |
| 2004/0167907 A1 | 8/2004 | Wakefield et al. | 707/100 |
| 2004/0167908 A1 | 8/2004 | Wakefield et al. | 707/100 |
| 2004/0167909 A1 | 8/2004 | Wakefield et al. | 707/100 |
| 2004/0167910 A1 | 8/2004 | Wakefield et al. | 707/100 |
| 2004/0167911 A1 | 8/2004 | Wakefield et al. | 707/100 |
| 2004/0221235 A1 | 11/2004 | Marchisio et al. | 715/534 |
| 2004/0243388 A1 | 12/2004 | Corman et al. | 704/1 |
| 2005/0108001 A1* | 5/2005 | Aarskog | 704/10 |
| 2005/0177805 A1 | 8/2005 | Lynch et al. | 715/968 |
| 2005/0210000 A1 | 9/2005 | Michard | 707/3 |
| 2005/0267871 A1 | 12/2005 | Marchisio et al. | 707/3 |

FOREIGN PATENT DOCUMENTS

| | | |
|---|---|---|
| EP | 0 597 630 | 7/2002 |
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 2004/053645 | 6/2004 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations, Jun. 2005, vol. 7, No. 1, pp. 67-75.

Littman et al., "Automatic Cross-Language Information Retrieval using Latent Semantic Indexing," *In Grefenstette, G., editor*, Cross Language Information Retrieval. Kluwer, 1998.

Nagao et al., "Semantic Annotation and Transcoding: Making Web Content More Accessible," *IEEE Multimedia, IEEE Computer Society, US.* 8(2):69-81, Apr. 2001.

Nguyen et al., "Accessing Relational Databases from the World Wide Web," SIGMOD Record, ACM USA, Jun. 1996, vol. 25, No. 2, pp. 529-540.

Pohlmann et al., "The Effect of Syntactic Phrase Indexing on Retrieval Performance for Dutch Texts," Proceedings of RIAO, pp. 176-187, Jun. 1997.

Rasmussen, "WDB-A Web Interface to Sybase," Astronomical Society of the Pacific Conference Series, Astron. Soc. Pacific USA, 1995, vol. 77, pp. 72-75.

Sneiders, "Automated Question Answering Using Question Templates That Cover the Conceptual Model of the Database," Natural Language Processing and Information Systems, 6th International Conference on Applications of Natural Language to Information Systems, Revised Papers (Lecture Notes in Computer Science vol. 2553), Springer-Verlag, Berlin, Germany, 2002, vol. 2553, pp. 235-239.

* cited by examiner

101 — Enter known entity and specify an action:    Restrict by entity type:

| Known Entity | Action | | Entity Type |
|---|---|---|---|
| jeep | drive | Find Relationships / Clear | Person - Any Individual |

☐ Is Source  ☑ Is Target
  103      104

*Found for Entity: "jeep" (as Target) and Action: "drive" constrained by Entity Type*

| Source (?) | Action (?) | Target (?) |
|---|---|---|
| anthony elias | drive[1] | jeep |
| bush | drive[1] | jeep |
| charles fields | drive[1] | jeep |
| daniel john o'brien | drive[1] | jeep |
| evan evans | drive[1] | jeep |
| gordon | drive[2] | jeep |
| hart | drive[1] | jeep |
| harvey brown | drive[1] | jeep |
| james r. pratley | drive[1] | jeep |
| johnson | drive[1] | jeep |
| joseph e. cappy | drive[1] | jeep |
| manuel adan rugama acevedo | drive[1] | jeep |
| mitchell | drive[1] | jeep |
| moran | drive[1] | jeep |
| rancho bernardo | drive[1] | jeep |
| rancho bernardo/ james r. pratley | drive[1] | jeep |

Fig. 1

Discovering a Relationship:
What is China's attitude to other countries?

QUERY: China_subj AND *_verb AND COUNTRY_obj

| | C001 | C002 | C003 |
|---|---|---|---|
| (ontology root node)/ENTITY/LOCATION/COUNTRY/China_subj — 206 | 1 | | 1 |
| (ontology root node)/ENTITY/LOCATION/COUNTRY/US_obj — 207 | 1 | | 1 |
| (ontology root node)/ENTITY/LOCATION/COUNTRY/Soviet Union_obj | | 1 | 1 |
| (ontology root node)/ENTITY/LOCATION/COUNTRY/Soviet Union_prep — 208 | | | |
| (ontology root node)/ENTITY/NUMERIC/DATE/1949_prep | 1 | | |
| (ontology root node)/ENTITY/NUMERIC/DATE/1950_prep | | 1 | |
| (ontology root node)/ENTITY/NUMERIC/DATE/1960_prep | 1 | | |
| (ontology root node)/ENTITY/NUMERIC/DATE/1972_prep | | | 1 |
| relationship_subj | | 1 | |
| strain_obj | | 1 | |
| expansionism_prep | | | 1 |
| (ontology root node)/VERB/VERB_CHANGE/align_verb | 1 | | |
| ally_verb | 1 | | |
| (ontology root node)/VERB/VERB_STATIVE/be_verb | | 1 | |
| ... | | | |

*Fig. 2*

Target information: What is China's attitude to other countries?

QUERY: China AND (USSR OR Soviet Union) .....

|  | D001 | D002 | D003 | D004 | D005 | D006 |
|---|---|---|---|---|---|---|
| China | 3 |  |  |  |  | 1 |
| president | 1 |  |  |  |  | 1 |
| France | 1 |  |  |  |  |  |
| visit | 1 |  |  |  |  | 1 |
| 1948 | 1 |  | 5 |  |  |  |
| visit | 1 | 1 |  |  |  |  |
| ally | 1 |  | 2 |  |  | 1 |
| 1949 | 1 | 1 |  |  |  |  |
| 1960 | 1 | 1 |  |  |  | 1 |
| Soviet Union | 1 |  |  |  |  | 1 |
| relationship | 1 |  |  |  |  | 1 |
| strain | 1 |  |  |  |  |  |
| ... |  |  |  |  |  |  |

Fig. 3

InFact®  Search | Corpus | Preferences | History | Help

Show Query Generator

Enter query: china>buy>*       [Search] [Clear]  — 6B01

Relationship results 1 - 99:

Sort by: [Action Similarity ▼] [Sort]   Export as: [HTML ▼] [Export]   Nested search: [Set]

| Source(?) | Action(?) | Target(?) |
|---|---|---|
| china | buy[2] | u.s. : wheat |
| china  (6B02) | buy | additional : one million : metric ton : of wheat |
| people : in china | buy : at will | various : kind : of food |
| china | buy | 60,000 : metric ton : of refined sugar |
| china travel agency of hong kong hong kong china travel agency | buy | stock |
| china navigation subsidiary : of british shipping company john swire son | buy : at cost of pounds 37m each | three : of yard capesize vessel |
| china | buy | 250,000 : ton : of refined sugar |
| soviet union china | buy | everyone : waiting |
| china | buy : in a few large autumn last purchase | us : wheat |
| china | potential : buy : in world market | - |
| chinese : airline | buy | 757 : boeing |
| growing : number : of well-to-do chinese | buy : for private use | car |
| chinese | buy | - |
| china | purchase | 500,000 : metric ton : of subsidized u.s. wheat analyst |
| chinese | purchase | large : shipment : over weekend analyst |
| chinese : wheat | purchase : after close | 500,000 : ton |

InFact™

Search | Corpus | Preferences | History | Help

Show Query Generator

Enter query: [suicide AND (attack OR bombing) > kill > * ; israel]     6C01

Search   Clear

Relationship results 101 - 200 of about 275:     Page 2 of 3   Prev Next Sort by: [Action Similarity ▼]   Sort     Export as: [HTML ▼]   Export     Nested search:   Set

| Source (?) | Action (?) | Target (?) |
|---|---|---|
| double suicide : bombing | kill[5] | 13 : people |
| suicide : bombing | kill[5]  — 6C02 | three israeli ; woman :: in tel aviv on friday |
| march 21 tel aviv suicide : bombing | kill[4] | three israeli ; woman |
| suicide : attack | year last : kill[3] | 59 : people :: in israel |
| suicide : bombing | kill[3] | 57 : people |
| palestinian suicide : bombing | last week : kill[3] | three ; woman :: at tel aviv cafe |
| two suicide : attack | kill[2] | bomber |
| separate raid following twin suicide : attack | day earlier : kill[2] | 13 : people ; in market in jewish west jerusalem |
| suicide : attack | kill[2] | scores : of israeli |
| islamist suicide bomb : attack | kill[2] | three ; woman :: in tel aviv on friday |
| apparent suicide : attack | kill[2] | - |
| suicide : bombing | kill[2] | three : israeli |
| suicide : bombing | kill[2] | 15 : people :: in jerusalem |

InFact search | Corpus | Preferences | History | Help

Show Query Generator

Enter query: [pope > [motion] > [location]]    — 6E01

[Search] [Clear]

Relationship results 1 - 100 of about 362:
Sort by: [Action Similarity ▼] [Sort]    Export as: [HTML ▼] [Export]    Page 1 of 4  Next
                     6E02                                              Nested search: [Set]    — 6E03

| Source(?) | Action(?) | Target(?) |
|---|---|---|
| pope | go | supersonic : to zambia |
| entourage pope | leave : for lesotho in convoy of car | johannesburg : jan smuts airport |
| pope dc-9 alitalia : plane | leave | rome |
| pope | take | vision : of united western europe to france |
| pope | meet | cuban : envoy |
| pope | meet | president : of el salvador |
| pope | meet | libyan 2 : no. |
| pope | meet : in zimbabwe | south african : bishop |
| pope | send | message : to lithuanian |
| pope | send : during one of pope on pope way to lesotho to swaziland | greeting two : flight ; over vatican |
| pope | send | representative : to warsaw |
| pope | make | pope fourth : tour ; of africa in september |
| pope : john paul ii | fly : to monday | french indian ocean : island |

| Chunk 1 of 3 Next | | |
|---|---|---|
| Source (?) | Action (?) | Target (?) |
| acetyl nac cysteine<br>radical scavenger vitamin e<br>dimethyl dmso thiourea | abolish —7C01 | p70/erk downstream<br>activation of erk 1/2<br>p90 ribosomal s6 kinase<br>growth stimulation of kinase<br>(thyroid) |
| dose-dependent activation of<br>akt/pkb p70 s6 kinase | accompany | phenotype |
| enhancement of membrane protein<br>kinase activity<br>myelin basic protein<br>s6 kinase activity<br>inositol phosphate level<br>activation of c-fos jun-b gene<br>expression | accompany | |
| pi3-kinase | act | upstream of p70 s6 kinase<br>s6 kinase |
| protein kinases | act upon | ribosomal small subunit<br>ribosomal protein s6 |

Fig. 7C

Document Attributes: [InFactCorpus=Medline 2003; PMID=11641267; Journal=FASEB J; Volume=15; Issue=13; JournalLine=FASEB J Nov 2001 ; 15(13): 2539-41; MedlinePgn=2539-41; PubDate=2001.11.01-00:00:00; Title=Activation of p90RSK and growth stimulation of multicellular tumor spheroids are dependent on reactive oxygen species generated after purinergic receptor stimulation by ATP.; Affiliation=Department of Neurophysiology, University of Cologne, D-50931 Cologne, Germany.; WordCount=1493; ByteCount=1493; Author=Sauer H; Author=Klimm B; Author=Hescheler J; Author=Wartenberg M; Mesh=Acetylcysteine; Mesh=Adenosine Triphosphate; Mesh=Calcium; Mesh=Cell Division; Mesh=Dose-Response Relationship; Drug; Mesh=Enzyme Activation; Mesh=Flavones; Mesh=Free Radical Scavengers; Mesh=Human; Mesh=MAP Kinase Signaling System; Mesh=Male; Mesh=Mitogen-Activated Protein Kinases; Mesh=NADPH Oxidase; Mesh=Phospholipases A; Mesh=Phosphorylation; Mesh=Prostatic Neoplasms; Mesh=Reactive Oxygen Species; Mesh=Receptors, Purinergic; Mesh=Ribosomal Protein S6 Kinases; Mesh=Spheroids; Mesh=Thiourea; Mesh=Tumor Cells, Cultured; Mesh=Vitamin E; ] Title: PubMed 11641267. Activation of p90RSK and growth stimulation of multicellular tumor spheroids are dependent on reactive oxygen species generated after purinergic receptor stimulation by ATP.

Mitogenic stimulation by growth factors may be mediated through intracellular reactive oxygen species (ROS) acting as signaling molecules. Incubation of multicellular prostate tumor spheroids with adenosine 5'-triphosphate (ATP) dose-dependently stimulated tumor growth. ATP, uridine 5'-triphosphate (UTP), adenosine 5'-diphosphate (ADP), and 2-methylthio-ATP (2-MeS-ATP) increased intracellular ROS levels significantly. ROS generation by ATP was inhibited by the P2 receptor antagonist suramin, by the reduced nicotinamide adenine dinucleotide phosphate (NADPH) oxidase inhibitors diphenylene iodonium chloride (DPI) and 4-(2-aminoethyl) benzenesulfonylfluoride (AEBSF), as well as by the Ca2+-dependent phospholipase A2 (PLA2) inhibitors indomethacin and methyl arachidonyl fluorophosphonate (MAFP). The generation of ROS was dependent on the intracellular Ca2+ response evoked by ATP. Exogenous ATP activated the extracellular signal-regulated kinase 1/2 (ERK1/2) mitogen-activated protein kinase (MAPK) pathway, which was blunted by the MAPK/ERK kinase 1/2 (MEK1/2) antagonist PD98059. The radical scavengers vitamin E, dimethyl thiourea (DMTU), and N-acetyl cysteine (NAC) failed to inhibit ERK1/2 activation but abolished p90 ribosomal S6 kinase (p90RSK) activation downstream of ERK1/2, as well as the growth stimulation of tumor spheroids. Our data indicate that p90RSK downstream of ERK1/2 is the molecular target for ROS generated through stimulation of purinergic receptors by ATP.

| | furthermore : block | |
|---|---|---|
| protein kinase-dependent phosphorylation : of ribosomal protein s6 | determine | p70 s6 kinase : phosphorylation : with rapamycin |
| | determine | role of phosphatidylinositol 3-kinase p70 ribosomal s6 kinase in stimulation |
| activated glucocorticoid receptor | modulate | prerequisite autoregulation of ribosomal protein s6 protein kinase |
| nutrient | modulate | in regulation of p70 s6 kinase eef2 through unidentified as yet mechanism activation of eif2b |
| ribosomal protein kinase p70 s6 kinase | modulate | cell-cycle progression cell survival cell size |
| p70 s6 kinase | modulate | translation of specific mrna |
| phosphatidic acid | modulate | a mammalian target of rapamycin-p70 1 s6 kinase |
| protein kinase b activation | regulate | t1 ribosomal s6 kinase phosphorylation of glycogen synthase kinase 3 cell growth kinase with critical role in regulation of protein synthesis |
| liposome availability | regulate | glycogen synthase kinase 3 activity in l6 muscle cells |

InFact™

Search | Corpus | Preferences | History | Help

Query History  [Clear] —1010

| Query Id | Depends On | Query | Document Count |
|----------|------------|-------|----------------|
| 2 | - | Clinton → visit → [Country]  ~1001 | 20  ~1003 |
| 1 | - | [Person] AND Clinton <~> [Country]  ~1002 | 26  ~1004 |

| | Grammatical Role | Modifier | Modifier Type | Term | Entity Type / Ontology Specification | Modifier | Modifier Type - Entity Type / Ontology Specification |
|---|---|---|---|---|---|---|---|
| 1601 | subject | | | president | IF/ENTITY/PERSON | France | IF/ENTITY/LOCATION/COUNTRY |
| 1602 | verb | | | visit | | | |
| 1603 | object | | | capital | IF/ENTITY/LOCATION | China | IF/ENTITY/LOCATION/COUNTRY |
| | | | | | | 1948 | IF/ENTITY/NUMERIC/DATE |
| 1604 | prepositional complement | | | China | IF/ENTITY/LOCATION/COUNTRY | | |
| 1605 | prepositional complement | | | 1948 | IF/ENTITY/NUMERIC/DATE | | |
| 1606 | interclause relationship & sentence attributes | | | temporal_c | | | |

Fig. 16

Example: "Jane admires sunny Seattle on a busy June 3d."

| Field Name | Value |
|---|---|
| id | 3_3_1 |
| subject | jane t_entity/person/any/individual t_entity/person/female t_entity |
| verb | admire m_on m_busy m_june m_3rd tm_entity/temporal/date tm_entity |
| object | m_sunny seattle m_on m_busy m_june m_3rd t_entity/location/city tm_entity/temporal/date t_entity tm_entity |
| pcomp | m_on m_busy june 3rd t_entity/temporal/date t_entity |
| parent_id | |
| clause_rel_sent_class | temporal_s |
| relationship | 9jane\&14_20\;admire\\\on busy\#june 3rd\&7\#\,seattle\&13_3\\sunny\\on busy\#june 3rd\&7\# |

3001 — id
3002 — subject
3003 — verb
3004 — object
3005 — pcomp
3006 — parent_id
3007 — clause_rel_sent_class
3008 — relationship

Fig. 30

| Field Name | Value |
|---|---|
| doc_id | 30000000 |
| title | Northwest Travels |
| creationDate | 2002.10.22-11:00:33 |
| metadata | Author#Jane Author#Desaurus numberOfCities#2 |
| content | .... |
| document_type | HTML |

3101 — doc_id
3102 — title
3103 — creationDate
3104 — metadata
3105 — content
3106 — document_type

*Fig. 31*

METHOD AND SYSTEM FOR EXTENDING KEYWORD SEARCHING TO SYNTACTICALLY AND SEMANTICALLY ANNOTATED DATA

STATEMENT REGARDING FEDERALLY SPONSORED RESEARCH OR DEVELOPMENT

This invention was made with government support under Contract No. DAAH01-00-C-R168, awarded by Defense Advanced Research Project Agency and Contract No. W74Z8H-04-P-0104, awarded by the Office of the Secretary of Defense, U.S. Army. The government has or may have certain rights in this invention.

BACKGROUND OF THE INVENTION

1. Field of the Invention

The present invention relates to a method and system for searching for information in a data set, and, in particular, to enhanced methods and systems for syntactically indexing and performing syntactic searching of data sets using relationship queries to achieve greater search result accuracy.

2. Background

Often times it is desirable to search large sets of data, such as collections of millions of documents, only some of which may pertain to the information being sought. In such instances it is difficult to either identify a subset of data to search or to search all data yet return only meaningful results. The techniques that have been traditionally applied to support searching large sets of data have fallen short of expectations, because they have not been able to achieve a high degree of accuracy of search results due to inherent limitations.

One common technique, implemented by traditional keyword search engines, matches words expected to found in a set of documents through pattern matching techniques. Thus, the more that is known in advance about the documents including their content, format, layout, etc., the better the search terms that can be provided to elicit a more accurate result. Data is searched and results are generated based on matching one or more words or terms that are designated as a query. Results such as documents are returned when they contain a word or term that matches all or a portion of one or more keywords that were submitted to the search engine as the query. Some keyword search engines additionally support the use of modifiers, operators, or a control language that specifies how the keywords should be combined when performing a search. For example, a query might specify a date filter to be used to filter the returned results. In many traditional keyword search engines, the results are returned ordered, based on the number of matches found within the data. For example, a keyword search against Internet websites typically returns a list of sites that contain one or more of the submitted keywords, with the sites with the most matches appearing at the top of the list. Accuracy of search results in these systems is thus presumed to be associated with frequency of occurrence.

One drawback to traditional keyword search engines is that they do not return data that fails to match the submitted keywords, even though the data may be relevant. For example, if a user is searching for information on what products a particular country imports, data that refers to the country as a "customer" instead of using the term "import" would be missed if the submitted query specifies "import" as one of the keywords, but doesn't specify the term "customer." For example, a sentence such as "Argentina has been the main customer for Bolivia's natural gas" would be missed, because no forms of the word "import" are present in the sentence. Ideally, a user would be able to submit a query and receive back a set of results that were accurate based on the meaning of the query—not just on the specific keywords used in submitting in the query.

Natural language parsing provides technology that attempts to understand and identify the syntactical structure of a language. Natural language parsers ("NLPs") have been used to identify the parts of speech of each term in a submitted sentence to support the use of sentences as natural language queries against data. However, systems that have used NLPs to parse and process queries against data, even when the data is highly structured, suffer from severe performance problems and extensive storage requirements.

Natural language parsing techniques have also been applied to extracting and indexing information from large corpora of documents. By their nature, such systems are incredibly inefficient in that they require excessive storage and intensive computer processing power. The ultimate challenge with such systems has been to find solutions to reduce these inefficiencies in order to create viable consumer products. Several systems have taken an approach to reducing inefficiencies by subsetting the amount of information that is extracted and subsequently retained as structured data (that is only extracting a portion of the available information). For example, NLPs have been used with Information Extraction engines that extract particular information from documents that follow predetermined grammar rules or when a predefined term or rule is recognized, hoping to capture and provide a structured view of potentially relevant information for the kind of searches that are expected on that particular corpus. Such systems typically identify text sentences in a document that follow a particular part-of-speech pattern or other patterns inherent in the document domain, such as "trigger" terms that are expected to appear when particular types of events are present. The trigger terms serve as "triggers" for detecting such events. Other systems may use other formulations for specified patterns to be recognized in the data set, such as predefined sets of events or other types of descriptions of events or relationships based upon predefined rules, templates, etc. that identify the information to be extracted. However, these techniques may fall short of being able to produce meaningful results when the documents do not follow the specified patterns or when the rules or templates are difficult to generate. The probability of a sentence falling into a class of predefined sentence templates or the probability of a phrase occurring literally is sometimes too low to produce the desired level of recall. Failure to account for semantic and syntactic variations across a data set, especially heterogeneous data sets, has led to inconsistent results in some situations.

BRIEF SUMMARY OF THE INVENTION

Embodiments of the present invention provide enhanced methods and systems for syntactically indexing and searching data sets to achieve more accurate search results with greater flexibility and efficiency than previously available. Techniques of the present invention provide enhanced indexing techniques that extend the use of traditional keyword searching techniques to relationship and event searching of data sets. In summary, the syntactic and/or semantic information that is gleaned from an enhanced natural language parsing process is stored in an enhanced document index, for example, a term-clause matrix, that is amenable to processing by the pattern (string) matching capabilities of keyword search engines. Traditional keyword search engines, including existing or even off-the-shelf search engines, can be utilized to discover information by pattern (or string) matching the terms of a relationship query, which are associated with syntactic and semantic information, against the syntactically and/or semantically annotated terms of sentence clauses (of documents) that are stored in the enhanced document index. In this manner, the relationship information of an entire corpus can be searched using a keyword search engine without needing to limit a priori the types or number of relationships that are stored.

Example embodiments of the present invention provide an enhanced Syntactic Query Engine ("SQE") that parses, indexes, and stores a data set, as well as performs syntactic searching in response to queries subsequently submitted against the data set. In one embodiment, the SQE includes, among other components, a data set repository and an Enhanced Natural Language Parser ("ENLP"). The ENLP parses each object in the data set and transforms it into a canonical form that can be searched efficiently using techniques of the present invention. To perform this transformation, the ENLP determines the syntactic structure of the data by parsing (or decomposing) each data object into syntactic units, determines the grammatical roles and relationships of the syntactic units, associates recognized entity types and/or ontology paths if configured to do so, and represents these relationships in a normalized form. The normalized data are then stored and/or indexed as appropriate in an enhanced document index.

In one aspect, a corpus of documents is prepared for electronic searching by parsing each sentence into syntactic elements, normalizing the parsed structure to a plurality of tagged terms, each of which indicate an association between the term and a type of tag, and then transforming each sentence into a data structure that treats the tagged terms as additional terms of the sentence to be searched by a keyword search engine. In some embodiments, the tags include a grammatical role tag, a part-of-speech tag, an entity tag, an ontology path specification, or an action attribute. Other tags that indicate syntactic and semantic annotations are also supported. In some embodiments, linguistic normalization is performed to transform the sentence.

In another aspect, the SQE supports a syntax and a grammar for specifying relationship searches that can be carried out using keyword search engines. In one embodiment, the syntax supports a base component that specifies a syntactic search, a prepositional constraint component, a keyword (e.g., a document level keyword) constraint component, and a meta-data constraint component. One or more of the components may be optional. In another embodiment, the components are combined using directional operators that identify which query term has a desired grammatical role.

In yet another aspect, the SQE receives a query that specifies a relationship query using a term, tag type, or tag value. The SQE transforms the query into a set of Boolean expressions that are executed by a keyword search engine against the data structure that has been enhanced to include syntactic and/or semantic annotations. Indicators to matching objects, such as clause, sentences, or documents are returned. In one embodiment, the data structure comprises a term-clause index, a sentence index, and a document index.

In another aspect, the SQE performs corpus ingestion and executes queries using parallel processing. According to one embodiment, each query is performed in parallel on a plurality of partition indexes, which each include one or more portions of the entire enhanced document index.

BRIEF DESCRIPTION OF THE DRAWINGS

FIG. 1 shows a relationship query and the results returned by an example embodiment of the InFact® 2.5 search engine.

FIG. 2 is an example block diagram that conceptually represents a term-clause matrix that stores terms and enhanced indexing information for syntactic searching.

FIG. 3 is an example block diagram that conceptually represents a traditional term-document index.

FIGS. 6A-6G are example screen displays that illustrate the general capabilities of the example user interface and the types of queries that can be executed by an example Syntactic Query Engine.

FIGS. 7A-7F are example display screens of the progression of an example RQL query submitted to a Syntactic Query Engine.

FIGS. 8A-8F are example screen displays of an interface associated with browsing ontology paths, viewing corpus metadata, and finding synonyms.

FIG. 10 is an example screen display of an interface associated with displaying SQE query history.

FIG. 16 is a table that conceptually illustrates normalized data that has been annotated with syntactic and semantic tags by the postprocessor component of an Enhanced Natural Language Parser.

FIG. 30 is an example conceptual block diagram of a sentence that has been indexed and stored in a term-clause index of a Syntactic Query Engine.

FIG. 31 is an example conceptual block diagram of sample contents of a document index of a Syntactic Query Engine.

DETAILED DESCRIPTION OF THE INVENTION

Figure 4:
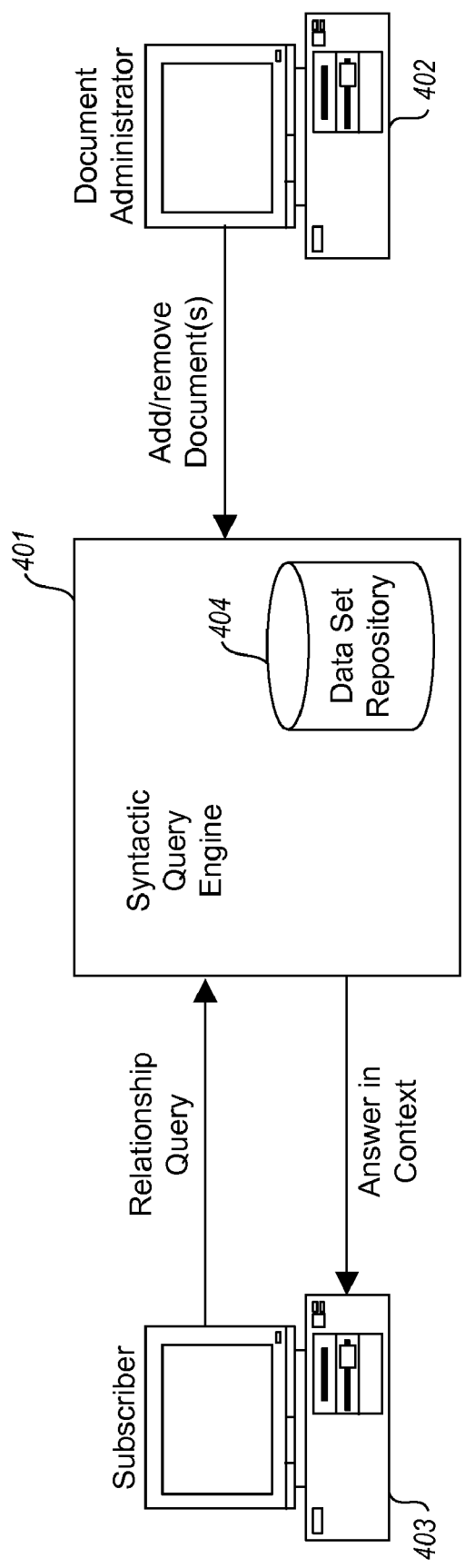
FIG. 4 is an example block diagram of an example Syntactic Query Engine.

It is often desirable to search large sets of unstructured data, such as collections of millions of documents, only some of which may pertain to the information being sought. Traditional search engines approach such data mining typically by offering interactive searches that match the data to one or more keywords (terms) using classical pattern matching or string matching techniques. At the other extreme, information extraction engines typically approach the unstructured data mining problem by extracting subsets of the data, based upon formulations of predefined rules, and then converting the extracted data into structured data that can be more easily searched. Typically, the extracted structured data is stored in a relational database management system and accessed by database languages and tools. Other techniques, such as those offered by Insightful Corporation's InFact® products, offer greater accuracy and truer information discovery tools, because they employ generalized syntactic indexing with the ability to interactively search for relationships and events in the data, including latent relationships, across the entire data set and not just upon predetermined extracted data that follows particular syntactic patterns. InFact®'s syntactic indexing and relationship searching uses natural language parsing techniques to grammatically analyze sentences to attempt to understand the meaning of sentences and then applies queries in a manner that takes into account the grammatical information to locate relationships in the data that correspond to the query. Some of these embodiments support a natural language query interface, which parses natural language queries in much the same manner as the underlying data, in addition to a streamlined relationship and event searching interface that focuses on retrieving information associated with particular grammatical roles. Other interfaces for relationship and event searching can be generated using an application programming interface ("API"). Insightful's syntactic searching techniques are described in detail in U.S. Provisional Application Nos. 60/312,385 and 60/620,550, and U.S. application Ser. Nos. 10/007,299, and 10/371,399. The techniques described in these patent applications have typically employed the use of complex data bases with a proprietary search technology for performing relationship and event searching.

Embodiments of the present invention provide enhanced methods and systems for syntactically indexing and searching data sets to achieve more accurate search results with greater flexibility and efficiency than previously available. Techniques of the present invention provide enhanced indexing techniques that extend the use of traditional keyword search engines to relationship and event searching of data sets. In summary, the syntactic and semantic information that is gleaned from an enhanced natural language parsing process is stored in an enhanced document index, for example, a form of a term-clause matrix, that is amenable to processing by the more efficient pattern (string) matching capabilities of keyword search engines. Thus, traditional keyword search engines, including existing or even off-the-shelf search engines, can be utilized to discover information by pattern (or string) matching the terms of a relationship query, which are inherently associated with syntactic and semantic information, against the syntactically and semantically annotated terms of sentence clauses (of documents) stored in the enhanced document index. As another benefit, the additional capabilities of such search engines, such as the availability of Boolean operations, and other filtering tools, are automatically extended to relationship and event searching.

Relationship and event searching, also described as "syntactic searching" in U.S. Application No. 60/312,385, Ser. No. 10/007,299, Ser. No. 10/371,399, and 60/620,550, supports the ability to search a corpus of documents (or other objects) for places, people, or things as they relate to other places, people, or things, for example, through actions or events. Such relationships can be inferred or derived from the corpus based upon one or more "roles" that each term occupies in a clause, sentence, paragraph, document, or corpus. These roles may comprise grammatical roles, such as "subject," "object," "modifier," or "verb;" or, these roles may comprise other types of syntactic or semantic information such as an entity type of "location," "date," "organization," or "person," etc. The role of a specified term or phrase (e.g., subject, object, verb, place, person, thing, action, or event, etc.) is used as an approximation of the meaning and significance of that term in the context of the sentence (or clause). In this way, a relationship or syntactic search engine attempts to "understand" the sentence when a query is applied to the corpus by determining whether the terms in sentences of the corpus are associated with the roles specified in the corresponding query. For example, if a user of the search engine desires to determine all events in which "Hillary Clinton" participated in as a speaker, then the user might specify a relationship query that instructs a search engine to locate all sentences/documents in which "Hillary Clinton" is a source entity and "speak" is an action. In response, the syntactic search engine will determine and return indicators to all sentences/clauses in which "Hillary Clinton" has the role of a subject and with some form of the word "speak" (e.g., speaking, spoke) or a similar word in the role of a verb.

For example, FIG. 1 shows a relationship query and the results returned by an example embodiment of the InFact® 2.5 search engine. In the InFact® 2.5 product, a user of the search engine can specify a search for a known "source" or "target" entity (or both) looking for actions or events that involve that entity. The user can also specify a second entity and look for actions or events that involve both the first and second entity. The user can specify a particular action or may specify a type of action or any action. An entity specified as a source entity typically refers to the corresponding term's role as a subject (or subject-related modifier) of a clause or sentence, whereas an entity specified as a target typically refers to the corresponding term's role as an object (or object-related modifier) of a clause or sentence. An action or event typically refers to a term's role as a verb, related verb, or verb-related modifier. Moreover, instead of a specific entity, the user can specify an entity type, which refers to a tag such as an item in a classification scheme such as a taxonomy. A user can also specify a known action or action type and look for one or more entities, or entity types that are related through the specified action or action type. Many other types and combinations of relationship searches are possible and supported as described in the above-mentioned co-pending patent applications.

In the example user interface shown in FIG. 1, a value for the first known entity is specified in entity field 102, a value for a known action is specified in action field 105, and a value for the type of the second entity is specified in entity type field 107. The source field 103 and target field 104 indicate whether the first known entity is to be a source of the action or a recipient (target) of the action. The particular query displayed instructs the search engine to look for sentence clauses that describe any person that drives a jeep when the Find Relationships button 106 is pressed. The results are returned in result field 110, which is shown sorted by similarity to the query.

Example embodiments of the present invention provide an enhanced Syntactic Query Engine ("SQE") that parses, indexes, and stores a data set, as well as performs syntactic searching in response to queries subsequently submitted against the data set. In one embodiment, the SQE includes, among other components, a data set repository and an Enhanced Natural Language Parser ("ENLP"). The ENLP parses each object in the data set (typically a document) and transforms it into a canonical form that can be searched efficiently using techniques of the present invention. To perform this transformation, the ENLP determines the syntactic structure of the data by parsing (or decomposing) each data object into syntactic units, determines the grammatical roles and relationships of the syntactic units, associates recognized entity types if configured to do so, and represents these relationships in a normalized form. The normalized data are then stored and/or indexed as appropriate.

In one set of example embodiments, which were described in U.S. Application Nos. 60/312,385, 60/620,550 Ser. No. 10/007,299, and Ser. No. 10/371,399, normalized data structures are generated by an enhanced natural language parser and are indexed and stored as relational data base tables. The SQE stores the grammatical relationships that exist between the syntactic units and uses a set of heuristics to determine which additional relationships to encode in the normalized data structure in order to yield greater accuracy in results subsequently returned in response to queries. For example, the SQE may generate relationship representations in the normalized data structure that correspond to more "standard" ways to relate terms, such as the relationship represented by the tuple (subject, verb, object), but may also generate relationships that treat terms with corresponding certain grammatical roles in a non-standard fashion, such as generating a relationship representation that treats a term that is a modifier of the subject as the subject of the sentence itself. This allows the SQE to search for a user specified entity (as a subject) even in sentences that contain the specified entity as a modifier instead of as the subject of the sentence. For example, the clause:
 "the young boy bought a dog"
may be parsed and assigned the following grammatical roles:
 boy=subject
 young=modifier
 bought=verb
 dog=object
Relationship representations that correspond to (boy, bought, dog), as well as a relationship representations that corresponds to (young, bought, dog) may be generated and stored by the SQE. Once the relationship representations are generated, they are stored in a variety of as relational data base tables to facilitate retrieval.

In the example embodiments of the SQE that are described herein, the normalized data, including the grammatical role and other tag information that can be used to discover relationships, are integrated into enhanced versions of document indexes that are typically used by traditional keyword search engines to index the terms of each document in a corpus. A traditional keyword search engine can then search the enhanced indexing information that is stored in these document indexes for matching relationships in the same way the search engine searches for keywords. That is, the search engine looks for pattern/string matches to terms associated with the desired tag information as specified (explicitly or implicitly) in a query. In one such example system, the SQE stores the relationship information that is extracted during the parsing and data object transformation process (the normalized data) in an annotated "term-clause matrix," which stores the terms of each clause along with "tagged terms," which include the syntactic and semantic information that embodies relationship information. Other example embodiments may provide different levels of organizing the enhanced indexing information, such as an annotated "term-sentence matrix" or an annotated "term-document matrix." One skilled in the art will recognize that other variations of storage organization are possible, including that each matrix may be comprised of a plurality of other data structures or matrices.

FIG. 2 is an example block diagram that conceptually represents a term-clause matrix that stores terms and enhanced indexing information for syntactic searching. The term-clause matrix 201 is an inverted index of tagged terms. That is, the matrix is indexed by the terms of each clause of each sentence of each document and indicates which clauses contain which terms. The diagram is conceptual in that it doesn't imply that what is represented is stored in the SQE precisely in that matter. Different implementations may store the term separate from its annotations and may be stored as a plurality of data structures that together comprise the term-clause index. For example, terms that correspond to a particular grammatical role, for example, a "subject" may be stored separately than terms that correspond to a different grammatical role, for example an "object." For example, in FIG. 2, each row 202 is indexed by a (tagged) term, e.g., " . . . /COUNTRY/China_subj" 206, and each column, e.g., columns 203, 204, and 205, represents a clause and contains a value that represents the number of times (e.g., a word count) that the clause contains the indexed term. The diagram is conceptual in that it doesn't imply that what is represented is stored in the SQE precisely in that matter. Different implementations may store the term separate from its annotations and may be stored as a plurality of data structures that together comprise the term-clause index. For example, terms that correspond to a particular grammatical role, for example, a "subject" may be stored separately than terms that correspond to a different grammatical role, for example an "object."

For illustrative purposes, FIG. 2 shows a partial term-clause index that corresponds to the text of a given Document D1 that includes:
 The president of France visited the capital of China in 1948. From 1949 to 1960 China was in alliance with the Soviet Union, although this relationship was already under severe strain in the late 1950s." From 1972 China aligned itself with the US against perceived Soviet expansionism.
The portion shown corresponds to the second and third sentences of the text, which together contain three clauses. (The indexing of the first clause is not shown.) The rows 202 each contain a term from one of these clauses, tag information that has been associated with the term during the data object parsing and transformation phase, and an indication of whether the clause contains the term in the role that is indicated by the associated tag information. That is, the terms are annotated with syntactic (e.g., grammatical role) and semantic (e.g., entity/ontology tag) information. For example, the tagged term "(ontology root node)/ENTITY/LOCATION/COUNTRY/China_subj" 206 consists of the term from the associated text "China," a grammatical role tag "subj" that indicates use of the term "China" as a subject, and an ontology path to the an entity tag "COUNTRY," that indicates that the term "China" is known to have an entity type of "COUNTRY" as determined from an ontology, database, dictionary, or similar structure associated with the SQE. The string "(ontology root node)" is a placeholder in the figure for the real indicator (e.g., name) of the root node of whatever ontology is being used. Also, depending upon the particular ontology being used, there may be a series of different nodes that contain the type "COUNTRY" (other than "ENTITY/LOCATION") and the SQE is programmed to take multiple nodes into account, when ingesting the documents and when searching for terms/tags in a relationship query that may be ambiguously expressed. The tagged terms "(ontology root node)/ENTITY/LOCATION/COUNTRY/Soviet Union_obj" 207 and "(ontology root node)/ENTITY/LOCATION/COUNTRY/Soviet Union_prep" 208 associated with the same document term "Soviet Union" indicate that the term is present in the document in two different grammatical roles—the first clause contains the term as an object and the third clause contains the term as a complement of a prepositional phrase. Note also that several linguistic normalizations have been performed during the data object transformation process to the normalized data. For example, the tense of the verb "was" has been changed to "be" (passive to active) and the verb phrase "was in alliance" has been changed to the verb "ally" (verbalization).

Several additional aspects are also notable with respect to the conceptual term-clause index illustrated in FIG. 2. The index illustrates the use of custom specified portions of an ontology. In this case, in order to add verb sense information for a set of verbs (i.e., group a set of verbs together), a "VERB" node that indicates different types of verb sense information has been added to the ontology. Additional ontology information could be configured by a system administrator, or, alternatively, a user interface for dynamically modifying the ontology could be provided. In the particular portion of the ontology shown, two verb senses "VERB_CHANGE" and "VERB_STATIVE" are present. When the SQE ingests a verb that has not been categorized by the ontology, the verb is simply added to the index without a semantic annotation, such as the verb "ally," which has been indexed as "ally_verb. The same is true for other terms that correspond to other parts of speech that have not been classified (yet) by the ontology. For example, the nouns "relationship," "strain" and "expansionism" have been indexed with syntactic annotations for their respective grammatical roles, but do not have any associated semantic (ontology path) annotations. One skilled in the art will recognize that a variety of combinations could be represented in the term-clause index. Also note that the concepts of wildcard interpretation can be implemented a variety of ways, including explicitly putting "generic" nodes that correspond to particular types of wildcards (e.g., entity wildcards, physical_object wildcards, verb wildcards, etc.) depending upon the nodes in the ontology.

The integration of the enhanced indexing information into traditional search engine type document indexes (for example, an inverted index) is what supports the use a standard keyword search techniques to find a new type of document information—that is, relationship information—easily and quickly. An end user, such as a researcher, can pose simple Boolean style queries to the SQE yielding results that are based upon an approximation of the meaning of the indexed data objects. Because traditional search engines do not pay attention to the actual contents of the indexed information (they just perform string matching or pattern matching operations without regard to the meaning of the content), the SQE can store all kinds of relationship information in the indexed information and use a keyword search engine to quickly retrieve it.

The SQE processes each query by translating or transforming the query into component keyword searches that can be performed against the indexed data set using, for example, an "off-the-shelf" or existing keyword search engine. These searches are referred to herein for ease of description as keyword searches, keyword-style searches, or pattern matching or string matching searches, to emphasize their ability to match relationship information the same way search terms can be string- or pattern-matched against a data set using a keyword search engine. The SQE then combines the results from each keyword-style search into a cohesive whole that is presented to the user.

For example, suppose a researcher is attempting to discover something about China's relationships. In particular, suppose that the researcher would like to know China's attitude toward other countries. The researcher accordingly enters a relationship query to the SQE, for example, China_subj AND *_verb AND COUNTRY_obj (query 209) which instructs the SQE to find all clauses (sentences and/or documents) in which China is a source entity (used as a subject) along with any action (any verb) and a second entity of entity type "COUNTRY" is the recipient of the action. Note that the syntax of this query is a conceptual example of a specification of a relationship query using the SQE of the present invention. The SQE will automatically determine that for this particular ontology the node "COUNTRY" is part of a full ontology pathname of "(ontology root node)/ENTITY/LOCATION/COUNTRY." Many different language specifications and user interfaces can be used to effectively communicate this same instruction to the SQE, and one skilled in the art will recognize that other alternatives are contemplated for use with the SQE. (The query specification matches the way the information is stored in the term-clause and other indexes.) Using the example term-clause index shown in FIG. 2, the SQE would respond with at least indicators to the second and third sentences of the Document D1 as they both contain clauses with the term "China" as the subject. Moreover, the results returned indicate several different relationships, allowing the researcher quickly to discover a lot about China's foreign policy. For example, the following relationships would be quickly discovered:

China (is) ally of the Soviet Union

China aligns itself with the United States which upon first glance may appear contradictory. By further drilling down to look at the returned clauses or sentences, the researcher can quickly discover that China's alliance with the Soviet Union ended in 1960.

In contrast to the term-clause index, the document index of a traditional keyword search engine system simply stores each term that is present in the document, along with an indication of the number of times the term appears in each document. FIG. 3 is an example block diagram that conceptually represents a traditional term-document index. The term document index 301 includes rows indexed by the terms 302 of the document. Each column, for example columns 303-305, indicates the number of times the indexed term (in each row) appears in the document. In order to pose a query to find out the same information against this document index, the researcher needs to be much smarter about the content of the documents being searched, or, alternatively, willing to end up with a lot of potentially random information to search through. For example, the researcher could search for documents that contain "China" or documents that contain "China" and a list of alternative countries to look for. In any case, because much of the information concerning China's role in each document is lost when stored in this type of traditional document index, the results provided would tend to be less informative.

FIG. 4 is an example block diagram of an example Syntactic Query Engine. A document administrator 402 adds and removes data sets (for example, sets of documents), which are indexed and stored within a data set repository 404 of the SQE 401. When used with keyword style searching techniques, the data set repository 404 stores an enhanced document index as described above. In the example shown in FIG. 4, a subscriber 403 to a document service submits queries to the SQE 401, typically using a visual interface. The queries are then processed by the SQE 401 against the data sets indexed in the data set repository 404. The query results are then returned to the subscriber 403. In this example, the SQE 401 is shown implemented as part of a subscription document service, although one skilled in the art will recognize that the SQE may be made available in many other forms, including as a separate application/tool, integrated into other software or hardware, for example, cell phones, personal digital assistants ("PDA"), or handheld computers, or associated with other types of existing or yet to be defined services. Additionally, although the example embodiment is shown and described as processing data sets and queries that are in the English language, one skilled in the art will recognize that the SQE can be implemented to process data sets and queries in any language, or any combination of languages.

Figure 5:
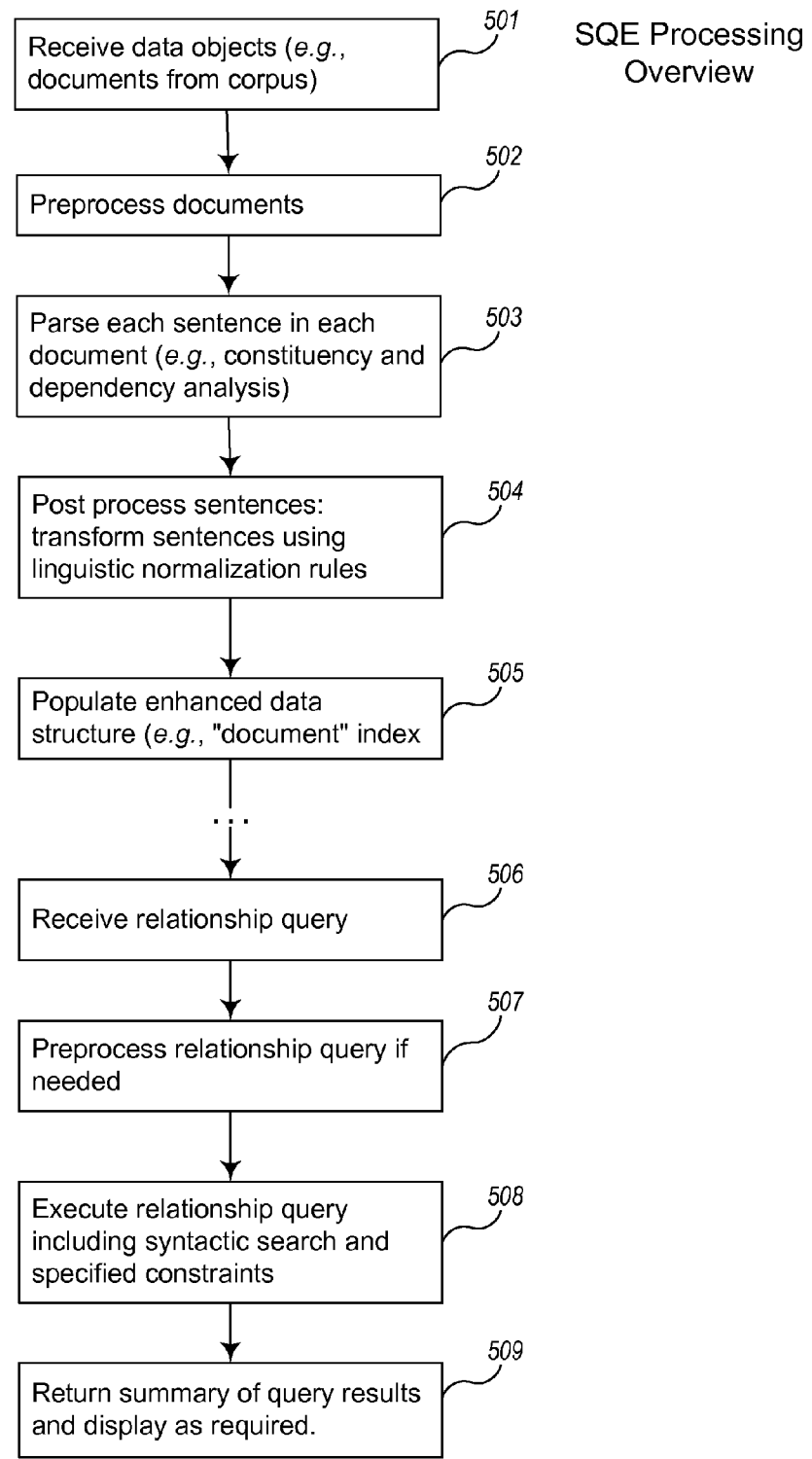
FIG. 5 is an overview of the steps performed by a Syntactic Query Engine to process data sets and relationship queries.

FIG. 5 is an overview of the steps performed by a Syntactic Query Engine to process data sets and relationship queries. Steps 501-505 address the indexing (also known as the ingestion) process, and steps 506-509 address the query process. Note that although much of the discussion herein focuses on ingestion of an entire data set prior to searching, the SQE also handles incremental document ingestion and is described below with respect to an example embodiment of the SQE architecture. Also, the configuration process that permits an administrator to set up ontologies, dictionaries, sizing preferences for indexes and other configuration and processing parameters is not shown.

Specifically, in step 501, the SQE receives a data set, for example, a set of documents. The documents may be received electronically, scanned in, or communicated by any reasonable means. In step 502, the SQE preprocesses the data set to ensure a consistent data format. In step 503, the SQE parses the data set, identifying entity type tags and the syntax and grammatical roles of terms within the data set as appropriate to the configured parsing level. For the purpose of extending keyword searching to syntactically and semantically annotated data, parsing sufficient to determine at least the subject, object, and verb of each clause is desirable to perform syntactic searches in relationship queries. However, one skilled in the art will recognize that subsets of the capabilities of the SQE could be provided in trade for shorter corpus ingestion times if full syntactic searching is not desired. For example, as described in U.S. Patent Publication No. 2003/0233224 (U.S. patent application Ser. No. 10/371,399), the parsing level may be configured using a range of parsing levels, from "deep" parsing to "shallow" parsing. Deep parsing decomposes a data object into syntactic and grammatical units using sophisticated syntactic and grammatical roles and heuristics. Shallow parsing decomposes a data object to recognize "attributes" of a portion or all of a data object (e.g., a sentence, clause, etc), such as entity types specified by a default or custom ontology associated with the corpus or the SQE. In step 504, the SQE transforms the each parsed clause (or sentence) into normalized data by applying various linguistic normalizations and transformations to map complex linguistic constructs into equivalent structures. Linguistic normalizations include lexical normalizations (e.g., synonyms), syntactic normalizations (e.g., verbalization), and semantic normalizations (e.g., reducing different sentence styles to a standard form). These heuristics and rules are applied when ingesting documents and are important to determining how well the stored sentences eventually will be "understood" by the system.

For example, the SQE may apply one or more of transformational grammar rules, lexical normalizations (e.g., normalizing synonyms, acronyms, hypernyms, and hyponyms to canonical or standard terms), semantic modeling of actions (e.g., verb similarity), anaphora resolution (e.g., noun and pronoun coreferencing resolution) and multivariate statistical modeling of semantic attributes. Multivariate statistical modeling of semantic attributes refers to applying the techniques used to determine similar verbs to other parts of speech, such as nouns and adjectives. These techniques as applied to verbs include such determinations as the frequency weight of the primary sense of the verb; the set of troponyms associated to this verb sense (other ways to perform this verb, e.g., "sweep," "carry," and "prevail" are all troponyms of the verb "win" because they express ways to win); the set of hypernyms associated to this verb sense (more generic classes of which this verb is a part, e.g., "win" is one way to "gain," "get," or "acquire"); and the set of entailments associated with this verb sense (other verbs that must be done before this verb sense can be done, e.g., "winning" entails "competing," "trying," "attempting," "contending," etc.). The ability to transform a term to alternatives so that similar actions and entities will also be searched for provides one important way to increase the ability of the SQE to "understand" a search query and retrieve more relevant results. Many transformational grammar rules also can be incorporated into the SQE. The transformational grammar rules may take many forms, including, for example, noun, pronoun, adjective, and adverb verbalization transformations. Verbalization rules convert the designated part of speech to a verb. For example, the clause "X is a producer of Tungsten" can be simplified to the clause "X produces Tungsten." Another example transformation rule is to simplify a clause by changing it from passive to active voice. For example, the clause "the chart was created by Y" can be transformed to the clause "Y created the chart."

In step 505, the SQE stores the parsed and transformed sentences in a data set repository. As described above, when the SQE is used with a keyword search engine, the normalized data is stored in (used to populate) an enhanced document index such as the term-clause matrix shown in FIG. 2. After storing the data set, the SQE can process relationship queries against the data set. In step 506, the SQE receives a relationship query, for example, through a user interface such as that shown in FIGS. 6A-6G below. Alternatively, one skilled in the art will recognize that the query may be transmitted through a function call, batch process, or translated from some other type of interface. In step 507, if necessary (depending upon the interface) the SQE preprocesses the received relation query and transforms it into the relationship query language understood by the system. For example, if natural language queries are supported, then the natural language query is parsed into syntactic units with grammatical roles, and the relevant entity and action terms are transformed into the query language formulations understood by the SQE. In step 508, the SQE executes the received query against the data set stored in the data set repository. The SQE transforms the query internally into sub-queries as appropriate to the organization of the data in the indexes and executes a traditional keyword search engine (or its own version of keyword style searching) to process the query. In step 509, the SQE returns the results of the relationship query, for example, by displaying them through a user interface such as the summary information shown in FIG. 6B.

One skilled in the art will recognize that, although the techniques are described primarily with reference to text-based languages and collections of documents, similar techniques may be applied to any collection of terms, phrases, units, images, or other objects that can be represented in syntactical units and that follow a grammar that defines and assigns roles to the syntactical units, even if the data object may not traditionally be thought of in that fashion. Examples include written or spoken languages, for example, English or French, computer programming languages, graphical images, bitmaps, music, video data, and audio data. Sentences that comprise multiple words are only one example of a phrase or collection of terms that can be analyzed, indexed, and searched using the techniques described herein. One skilled in the art will recognize how to modify the structures and program flow exemplified herein to account for differences in types of data being indexed and retrieved. Essentially, the concepts and techniques described are applicable to any environment where the keyword style searching is contemplated.

Also, although certain terms are used primarily herein, one skilled in the art will recognize that other terms could be used interchangeably to yield equivalent embodiments and examples. In addition, terms may have alternate spellings which may or may not be explicitly mentioned, and one skilled in the art will recognize that all such variations of terms are intended to be included. Also, when referring to various data, aspects, or elements in the alternative, the term "or" is used in its plain English sense, unless otherwise specified, to mean one or more of the listed alternatives. For example, the terms "matrix" and "index" are used interchangeably and are not meant to imply a particular storage implementation. Also, a document may be a single term, clause, sentence, or paragraph or a collection of one or more such objects.

For example, the term "query" is used herein to include any form of specifying a desired relationship query, including a specialized syntax for entering query information, a menu driven interface, a graphical interface, a natural language query, batch query processing, or any other input (including API function calls) that can be transformed into a Boolean expression of terms and annotated terms. Annotated terms are terms associated with syntactic or semantic tag information, and are equivalently referred to as "tagged terms." Semantic tags include, for example, indicators to a particular node or path in an ontology or other classification hierarchy. "Entity tags" are examples of one type of semantic tag that points, for example, to a type of ENTITY node in an ontology. In addition, although the description is oriented towards parsing and maintaining information at the clause level, it is to be understood that the SQE is able to parse and maintain information in larger units, such as sentences, paragraphs, sections, chapters, documents, etc., and the routines and data structures are modified accordingly. Thus, for ease of description, the techniques are described as they are applied to a term-clause matrix. One skilled in the art will recognize that these techniques can be equivalently applied to a term-sentence matrix and a term-document matrix.

In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

The Syntactic Query Engine is useful in a multitude of scenarios that require indexing, storage, and/or searching of, especially large, data sets, because it yields results to queries that are more contextually accurate than other search engines. An extensive relationship query language ("RQL") is supported by the SQE. The query language is designed to be used with any SQE implementation that is capable of retrieving relationship information from an indexed data set, regardless of whether the SQE uses a relational database implementation with a proprietary search engine or an enhanced document index that supports a keyword search engine. However, some of the operators may be more easily implemented in one environment versus the other, or may not be available in certain situations. One skilled in the art will recognize that variants of the query language are easily incorporated and that other symbols can be equivalently substituted for operators.

In general, the syntax for a relationship query specifies "entities" and "actions" that are linked via a series of "operators" with one or more constraints such as document level filters.

Entity: An Entity is a noun or noun phrase in the search query or result. It can be the source (initiator of an action), the target (receiver of an action), or the complement of a prepositional phrase. Entities can be multiple words. If they are quoted, the exact phrase is preferably matched by a phrase in a document being searched. Either double quotes or single quotes may be used; if double quotes are used, then synonyms of the quoted expression will not be included in a search. If single quotes are used, synonyms of the quoted expression will be included. Synonyms are typically specified as properties of an ontology related to the corpus or in a dictionary.

Source: The initiator of an action is referred to as the source. For example, in the query
[Country]>threaten>USA,
"Country" is the source. The query instructs a search for all countries that threaten the US, but not all countries that the US threatens.

Target: The receiver of an action is referred to as the target. For example, in the query
USA>investigates>[organization]
"organization" is the target of the action. The query instructs a search for all political organizations that are the target of an investigation, but not those that are initiating an investigation.

Prepositional Complement: An action is often performed with a prepositional complement. For example, in the query
Maya>visit>grandmother PREP CONTAINS Tuesday
"Tuesday" is the prepositional complement of the sentence. The query instructs a search for only visits that happened on Tuesdays.

Action: All relationships are based on an action, or verb. For example, in the query
Maya>visit>grandmother
"visit" is the action.

Operators: The following example operators are supported:
Action directionality for events: <, >, < > (or alternatively <-, ->, <->)
Boolean: AND, OR, NOT. The default operation for omitted Boolean operators is OR. Booleans do not have to be uppercase.
Prepositional constraint: PREP CONTAINS (upper or lowercase), or '^'
Document keyword constraint: DOCUMENT CONTAINS (upper or lowercase), or ';'
Metadata constraint: METADATA CONTAINS (upper or lowercase), or '#'
Wildcards (not within quotes): *, ? (single and multi-character)
Offset indicators: ~
Curly braces { } are used for indirect link searches, to search for entities that link other entities together
Brackets [ ] are used to denote types, either an Ontology-Path, or, if used with a verb, an ActionType.
Parenthesis can be used to nest portions of the query.

The general format for a relationship query comprises four components:
Syntactic query ^ Prep constraints; Document keyword constraints # Metadata constraints
The syntactic query component is specified in the format Source Entity>Action>Target Entity. However, it is not necessary to specify all three components, nor do the directional arrows need to point to the right. For example,
Bush<*
Bush<*<*
>*>Bush
are all correct specifications of the entity "Bush" as he related to other entities through any action, and there is no difference between the first two or the last two. Although both actions and entities can be represented by a wildcard, the position of the wildcard in the query determines what it represents. Entities preferably do not point to each other directly.

In addition to the basic syntactic search component of the query, there are three optional components that can be added to filter results (constrain the search):
any prepositional constraints, to filter results by information found in a prepositional phrase;
any document keyword constraints, to restrict search to documents that have certain keyword(s); (this causes a basic keyword search)
any metadata constraints, to restrict search to documents tagged with specific metadata values or ranges or values.
These clauses can be expressed in either a long or abbreviated format. In the long format, the clauses are separated by the self-explanatory terms "PREP CONTAINS", "DOCUMENT CONTAINS" and "METADATA CONTAINS". For example, broken up into several lines for easier reading, the relationship query:
Bush>visit>[Country] AND NOT China
PREP CONTAINS plane
DOCUMENT CONTAINS "foreign service" OR diplomat
METADATA CONTAINS Date>04/2002
specifies a syntactic search for "visit" relationships between the entity "Bush" and any country except China. The relationship query is constrained by the preposition "plane", meaning that the word plane must be included in a prepositional phrase within this relationship, indicating travel by plane. The query is further constrained by the document keywords/key phrases "foreign service" and "diplomat," meaning that only relationships from documents containing these words should be returned. Finally, the search is constrained by a date range, and instructs the search engine to only search documents written after April 2002. (This assumes that date related metadata has been associated with the documents at time of data set ingestion.) Date and numeric metadata ranges are specified with "=", ">", "<", ">=", and "<=". Put together, this query searches specifically for diplomatic trips that Bush took by plane since April 2002 to foreign countries with the exception of China.

Note that there are two expressions designated in the document filter above: "foreign service" and "diplomat." When a document contains a keyword in adjective form, e.g., "diplomatic," the document is included in the search results responsive to a query that designated the noun form. The SQE may be configured to automatically extract the stem of the word and search for other forms. Document level queries are also allowed by specifying a keyword or phrase (even without a syntactic search component). For example:
germany AND france AND england
will cause the SQE to search for all documents containing these keywords.

Filter clauses (i.e., constraint components) can also be entered in a more abbreviated form, in which the terms "PREP CONTAINS", "DOCUMENT CONTAINS", and "METADATA CONTAINS" are replaced by a "^", ';' and a '#' character respectively, as in:
Syntactic query A Prep constraints; Document keyword constraints # Metadata constraints
The example relationship query described above regarding diplomatic trips that Bush took by plane can be rewritten in abbreviated form as follows:
Bush>visit>[Country] AND NOT China A plane; "foreign service" OR diplomat # Date>04/2002
Also note that multiple Metadata constraints can be used with complete Boolean expressions and that Boolean expressions can be nested. For example, the query
hamas>act>*METADATA CONTAINS Author="Andrew Jackson" OR price=300
and the query
england AND NOT (aerospace OR airways)>abandon>*
describe valid relationship queries.

RQL formulated queries can also be embedded within a scripting language to provide an ability to execute batch relationship queries, functions having multiple queries, and control flow statements. For example, it may be desirable to encode a query to be executed at certain times each day against a data set that is continually updated and incrementally ingested. One skilled in the art will recognize that many scripting languages could be defined to achieve control flow of multiple relationship queries, and that the scripting language could include conditional statements. Relationship queries formulated using RQL are submitted to the SQE for execution from a variety of interfaces. For example, a web-based interface, similar to that provided by default with the InFact® products, can be used to submit relationship queries. In addition, relationship queries can be submitted using a natural language interface to the SQE, which parses the natural language query into syntactic units that can be translated into an RQL formulated query and then executed. Alternatively, the SQE supports an API that allows the development of other code, such as other user interfaces, that can execute relationship queries by submitting RQL formulated query strings to the SQE. FIGS. 11A-11F described below exemplify one such interface that provides a more graphical use of relationship queries.

FIGS. 6A-6G, 7A-7F, and 8A-8F are example screen displays from an example embodiment of a user interface designed to provide relationship and event searching in accordance with the techniques of the present invention. These screen displays emphasize particular features of a query language that has been designed to take advantage of combining the attributes of keyword style searching with syntactic searching. Additional examples of this user interface, query language, and variants thereof are included in Appendices A and B, which are incorporated herein by reference in their entirety.

Figure 6A:
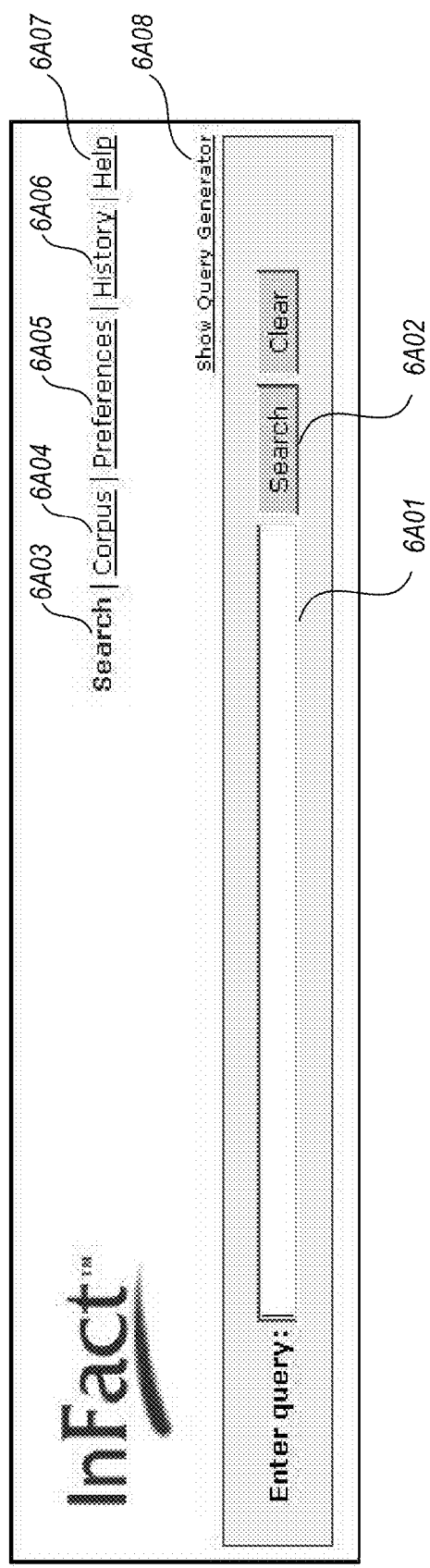

FIGS. 6A-6G are example screen displays that illustrate the general capabilities of the example user interface and the types of queries that can be executed by an example Syntactic Query Engine. FIG. 6A is an example initial screen display of a web-based interface for entering a relationship query to the SQE. There are five basic components of this example interface. Pressing the Search tab 6A03 displays (or generates) the page used to enter queries. The user enters an RQL formulated query into free text field 6A01. When ready, a search is initiated by pressing the Search button 6A02. Alternatively, users can enter RQL syntax using a "form" or template. The Show Query Generator link 6A08 navigates to this alternative interface to build an RQL formulated query. This interface is described further below with respect to Figure BF. Pressing the Corpus tab 604 displays a page used to browse available ontologies, find out more information for a particular ontology path, browse available metadata, and find synonyms that are configured in the system. These capabilities are described further below with respect to FIGS. 8A-8F. Pressing the Preferences tab 6A05 displays a page used to set search preferences. These capabilities are described further below with respect to FIG. 9. Pressing the History tab 6A06 displays a page that shows a history of prior relationship searches. The history page is described further below with respect to FIG. 10. Pressing the Help tab displays a web page(s) of tutorial information and assistance. An example help file is included as Appendix A.

FIG. 6B is an example screen display of the format for displaying results in response to a relationship query specified using the relationship query language. The query is entered in query input field 6B01, and in this case indicates a search for everything that China buys ("china>buy>*"). A summary of the results of the search is displayed in result area 6B00. Note that each "row", for example row 6B02, represents a particular relationship that is discovered in the corpus. Instances of this relationship may be actually located in more than one sentence or document. Thus, the Action field indicates a count of the number of times the particular relationship occurs in the data currently being displayed and summarized. For example, the first row 6B02 indicates that at least 2 instances of China buying (U.S.) wheat exist in the corpus. In one embodiment, the data is "chunked" prior to display. Thus, when used with chunked data, the number of instances of a particular event/relationship is valid only to what is being displayed. Other embodiments that calculate the entire result prior to display may indicate the number of instances a relationship appears over the entire corpus.

FIG. 6C is an example screen display of a more complex query that includes a Boolean operator and a document level filter. The query specified in query input field 6C01 includes two Boolean operators in a Boolean expression, "suicide AND (attack OR bombing)" as part of the syntactic search specification and includes a document level filter. Specifically, the user has specified a relationship search that will assist the user to discover all suicide attacks that have killed people in Israel. The results are shown summarized in result area 6C00. Clicking on any one of the actions, for example, "kill [5]" labeled as action 6C02, will cause the SQE to display the five instances in the clauses/sentences/documents in which the corresponding relationship is found.

Figure 6D:
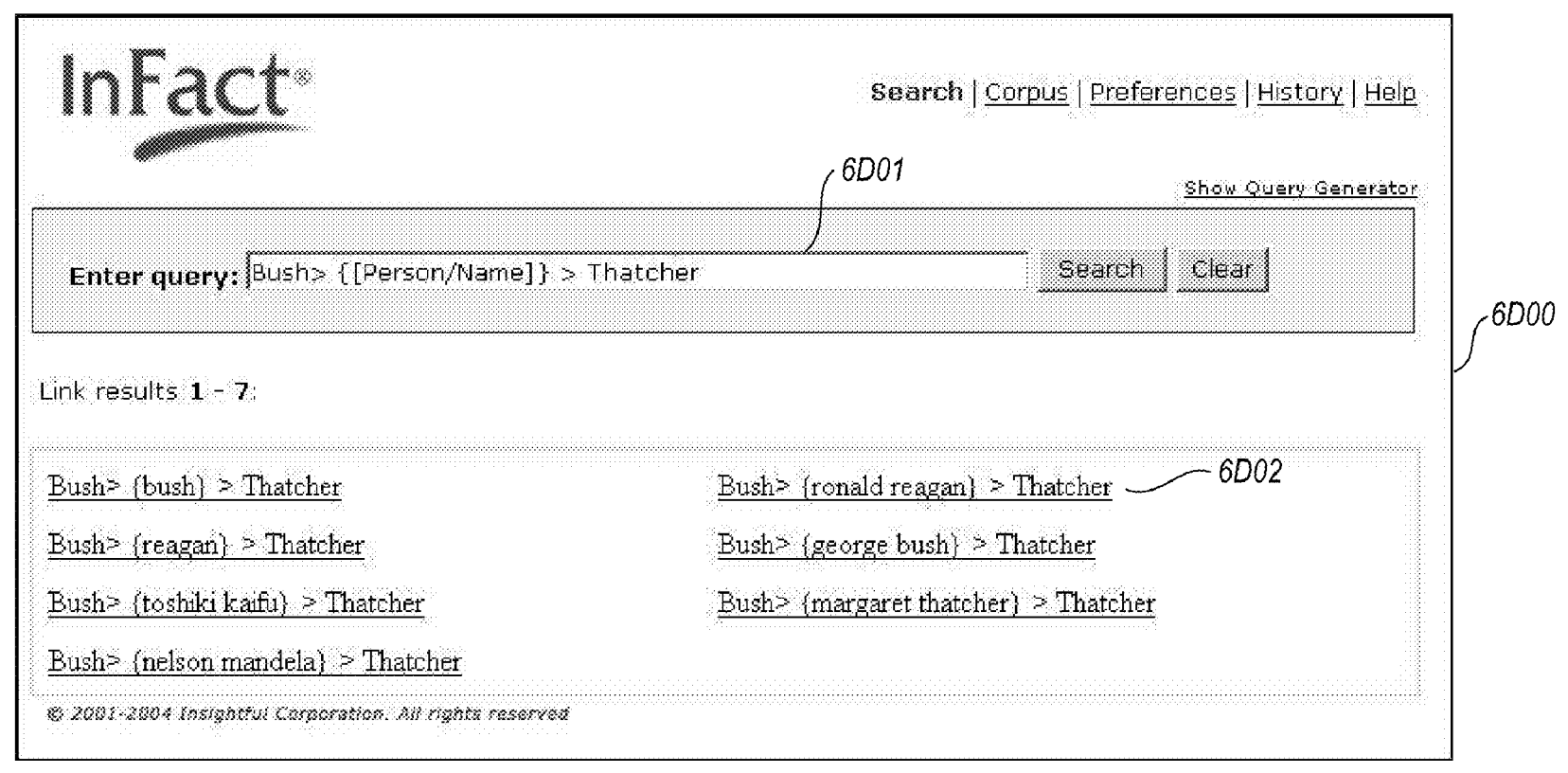

FIG. 6D is an example screen display of a link search using an entity type. The query specified in query input field 6D01 instructs the SQE to search for all people or named persons that link Bush and Thatcher. The results displayed in result area 6D00 show each $3^{rd}$ person that provides a link between Bush and Thatcher. That is, the $3^{rd}$ person has some relationship to Bush and has some (possibly separate) relationship to Thatcher. To discover the details of these relationships, the user navigates to one of the displayed links such as link 6D02 which indicates that Ronald Reagan is the person in common in the indicated (indirect) relationship.

FIG. 6E is an example screen display of a search that specifies an entity type and an action type. The query specified in query input field 6E01 instructs the SQE to search for all events in which the Pope took some action involving motion (e.g., driving) to some location. As can be seen in the results displayed in result area 6E00, a variety of actions, sorted by similarity using the sort button 6E02, are displayed. Note also, that a nested search button 6E03 can be pressed to cause the next query to be applied to the results from the prior query. This supports an iterative discovery process where a user progressively narrows a search based upon relationship information received at each search level.

Figure 6F:
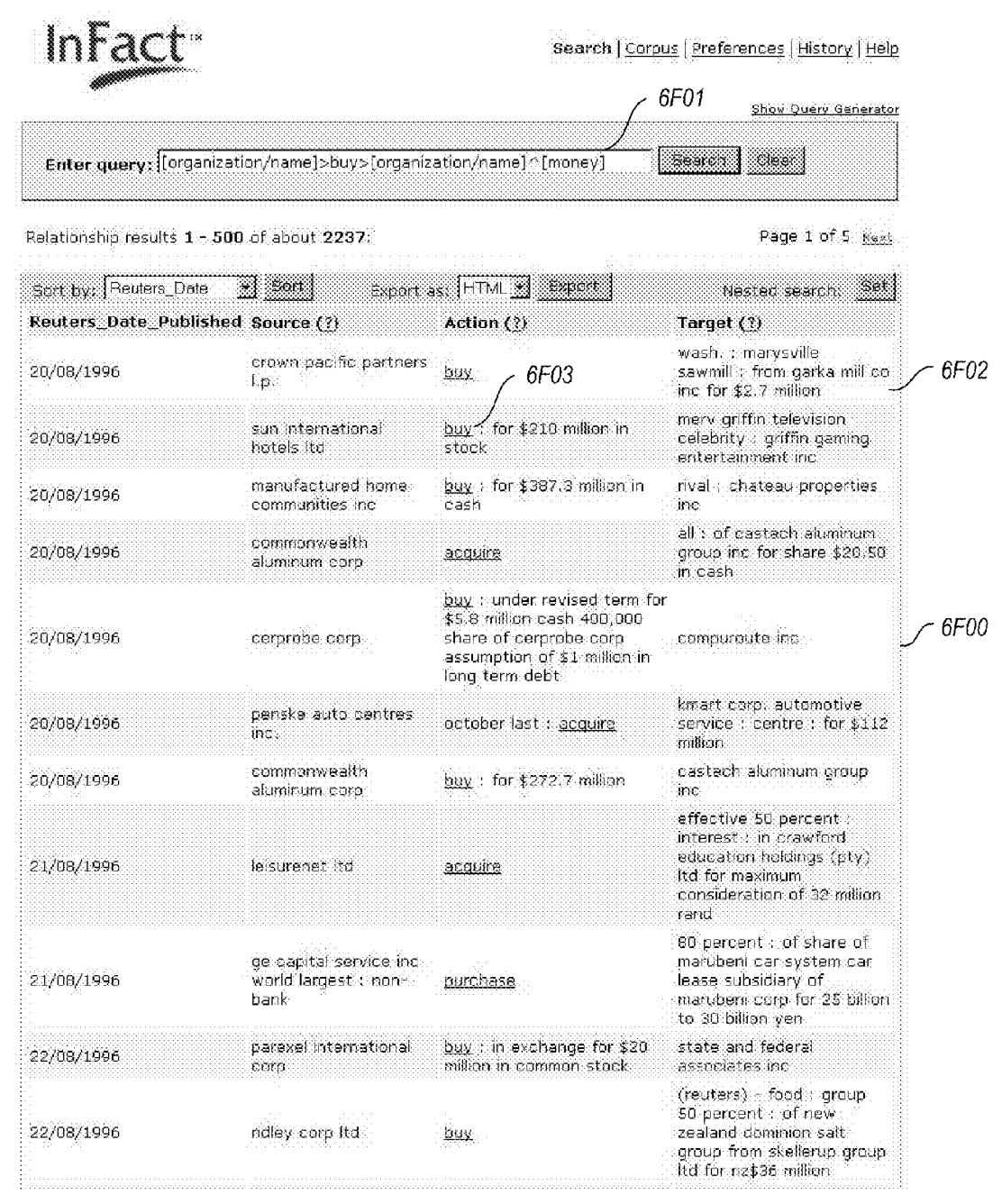

FIG. 6F is an example screen display of a search that specifies ontology paths in conjunction with a prepositional constraint. The query specified in query input field 6F01 instructs the SQE to search for all corporate acquisitions, specifically as they relate to the amount of money spent. The prepositional constraint specified by "A money" indicates that some amount of money needs be present in a prepositional phrase of each matching clause. For example, the results shown in result area 6F00 show a first relationship with a target entity 6F02 in which a sawmill was bought for $2.7 million. Similarly, the results show a second relationship where the preposition phrase that included the money is associated with the action "buy" labeled 6F03.

The ontology path specified in the query, "[organization/name]" is defined by an ontology associated with the system. Ontologies are typically associated with a corpus at system configuration time, although one skilled in the art will recognize that they can be dynamically changed and the portions of the corpus that are affected by the change, re-ingested. An ontology can be a default ontology associated with the SQE or a custom ontology generated for a specific corpus. Ontology paths are enclosed in brackets, as in [person] or [country]. If a bracketed term is found in a relationship query, the SQE searches the ontology[ies] for all paths matching the term. If there are multiple matches, all matches are included in the search and results are combined. For example, in a search query containing the type [person], the SQE will substitute with [IF/Entity/Person] to indicate use of the default ontology provided with the system. If another path exists in a custom ontology such as "MyOntology/People/Person," this path is also included in the query and the results are combined. Ontology paths can be browsed through an interface provided under the "Corpus" tab, as described further below with respect to FIGS. 8A-8F.

Figure 6G:
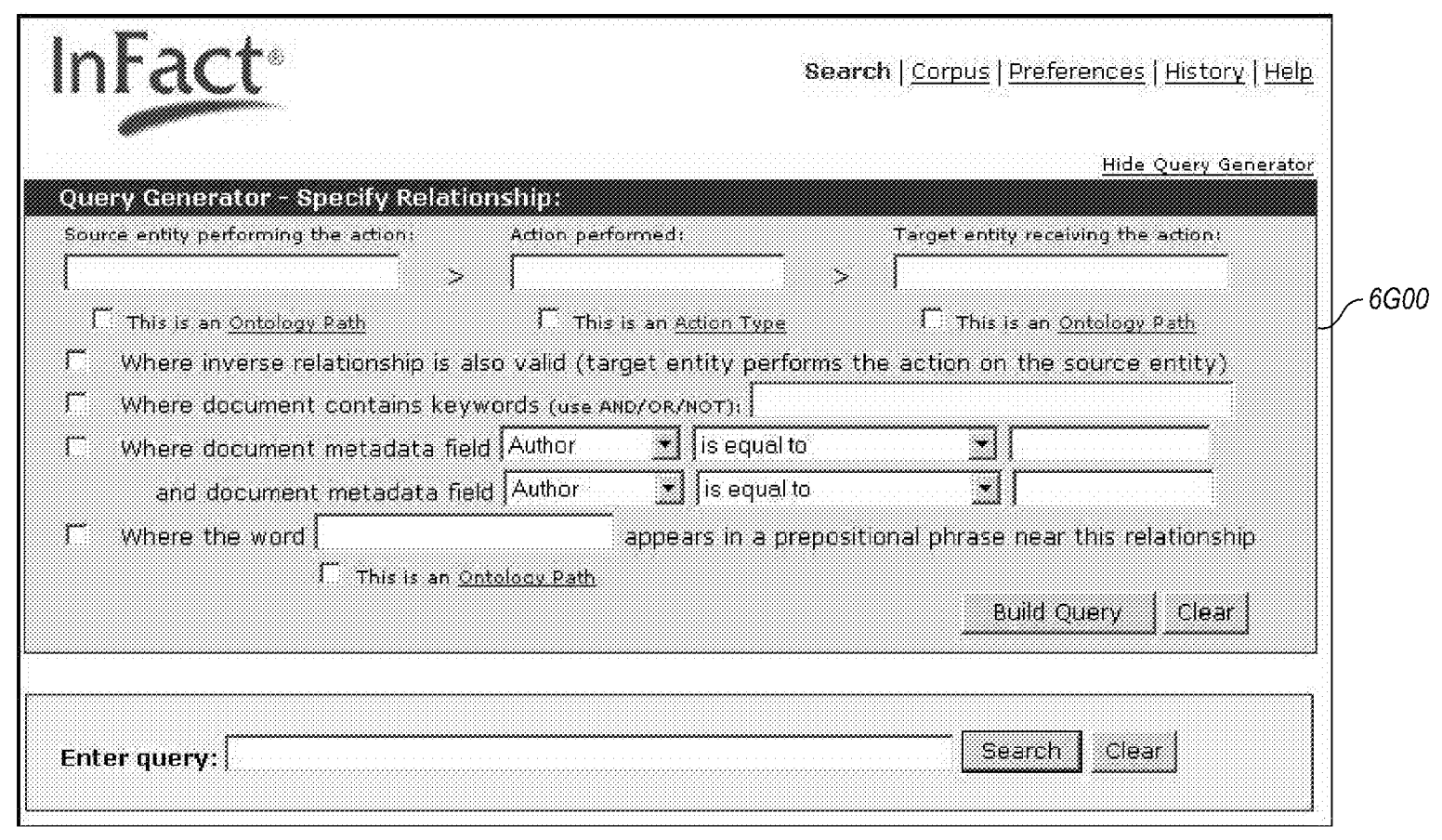

FIG. 6G is an example screen display of the query generator interface. The form displayed in display area 6G00 is provided to assist a user with specifying the components of a relationship query without needing intimate knowledge of the RQL syntax. The fields are labeled accordingly to explain what the user can enter to create a proper RQL formulated query.

Figure 7A:
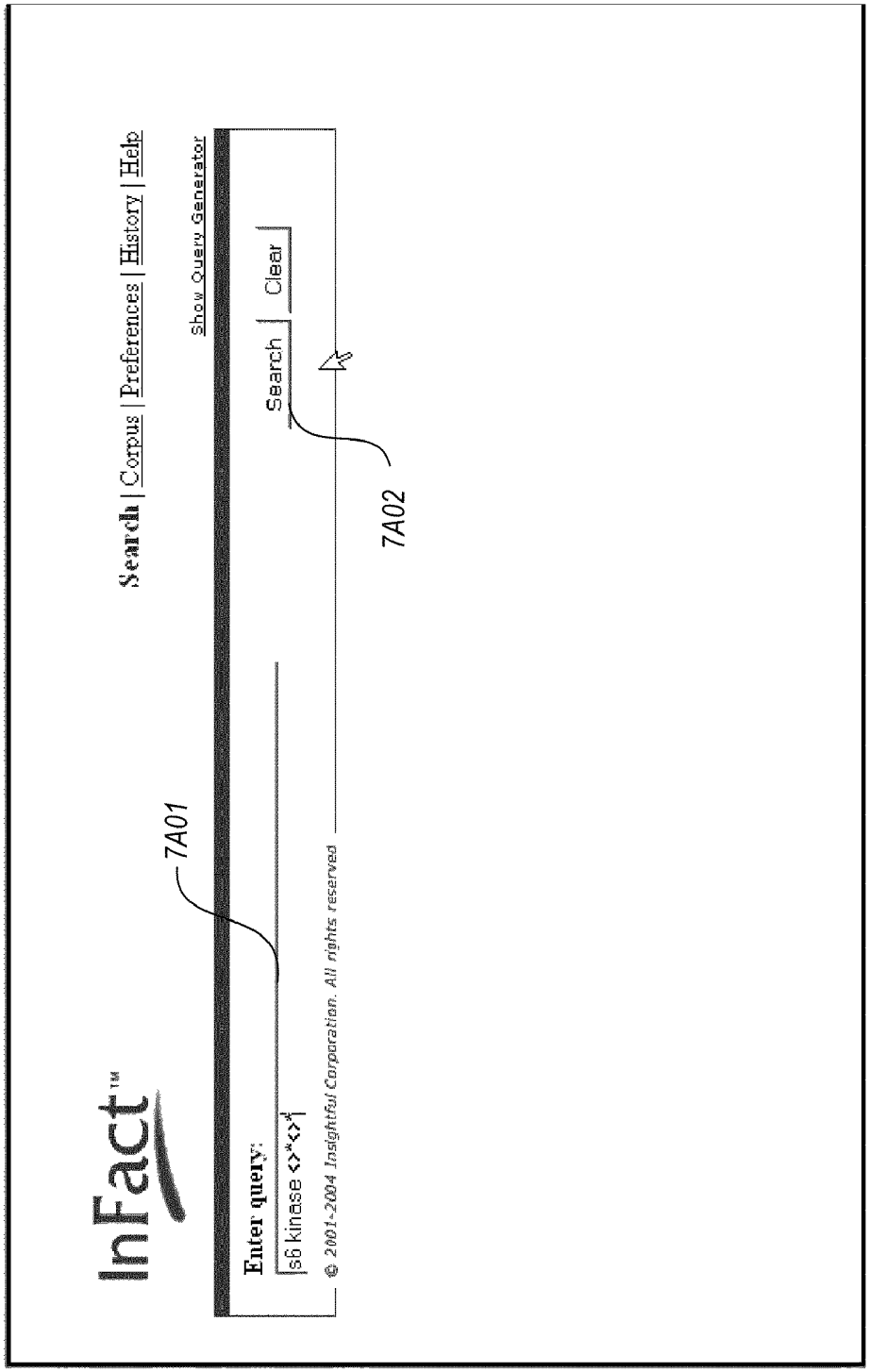

FIGS. 7A-7F are example display screens of the progression of an example RQL query submitted to a Syntactic Query Engine. In FIG. 7A, the user submits a query "s6 kinase <>*<

Figure 7B:
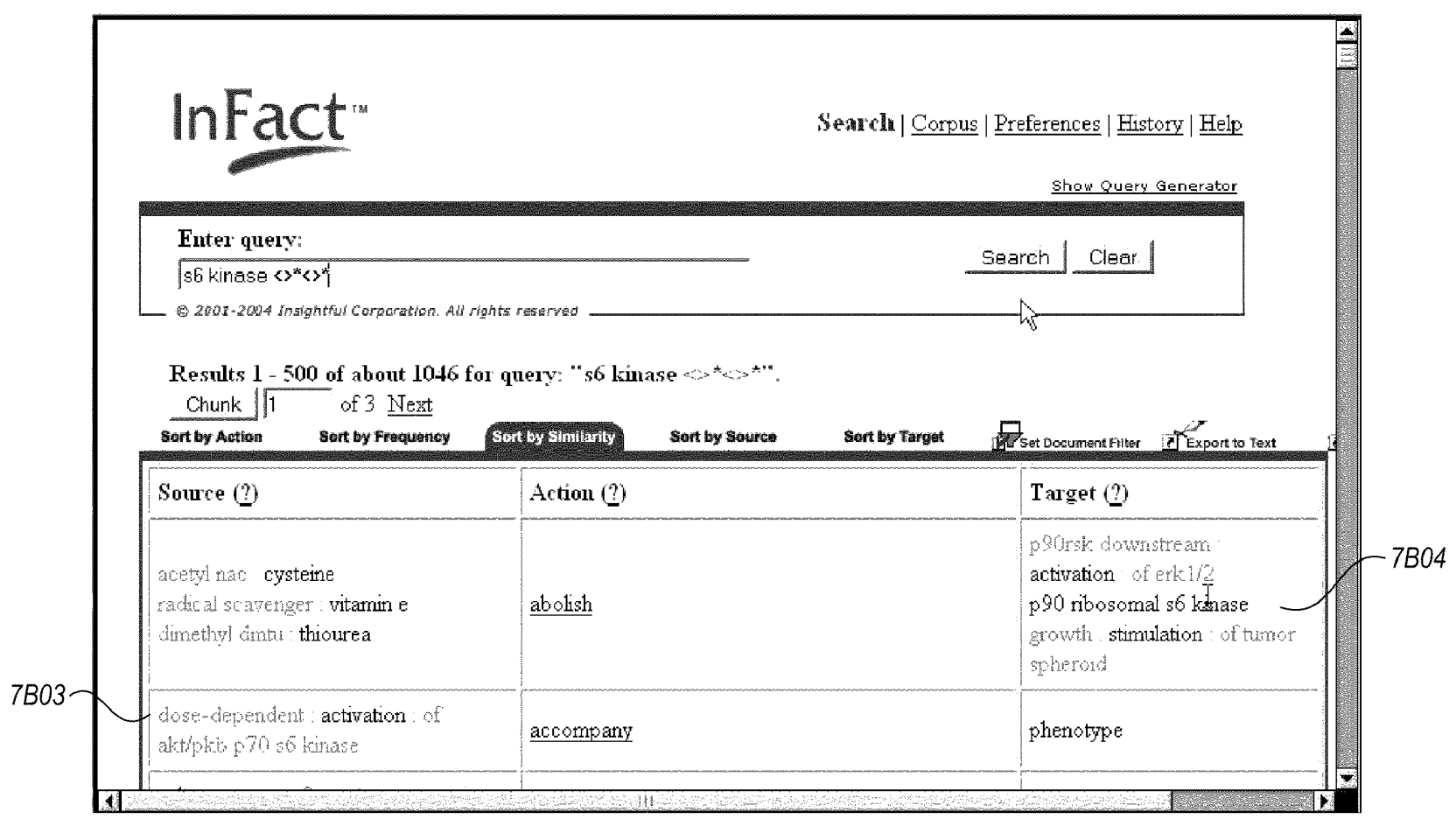
Figure 7E:
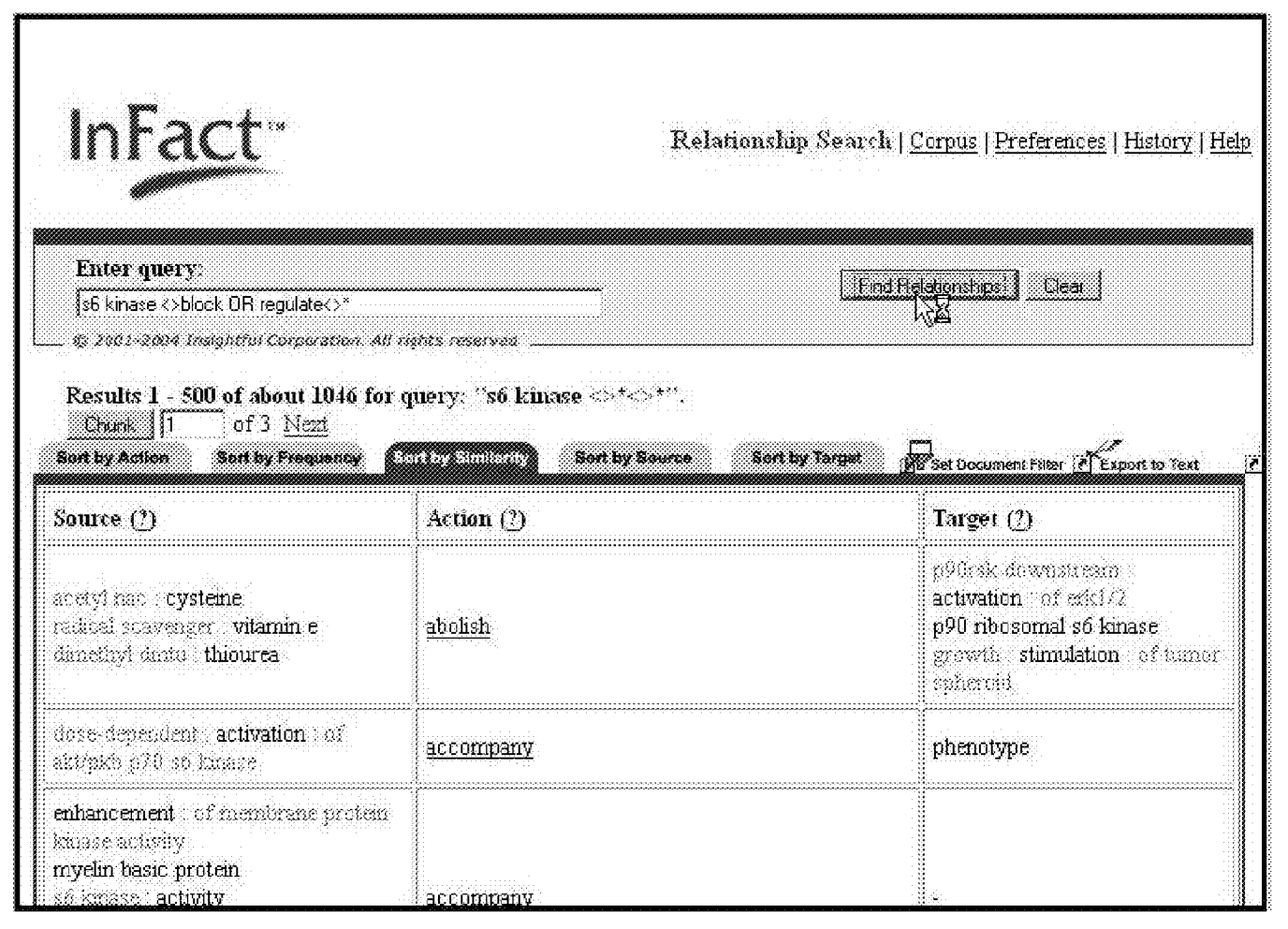

">*" in query input field 7A01. When the user presses the Search button 7A02, the SQE displays results in chunked pages of relationship summary information as shown in FIG. 7B. Note that the results shown in FIG. 7B include relationships that have "s6 kinase" as a subject, e.g., row 7B03, and relationships that have "s6 kinase" as an object, e.g., row 7B04. By clicking on one of the displayed actions, for example the "abolish" action 7C01 in FIG. 7C, the user can navigate to the document (sentence or clause) that shows that relationship. FIG. 7D is an example screen display of a document that has been navigated to by selecting an action link in a displayed relationship summary. The highlighted portion (i.e., shown as boxed herein) of the document text 7D01 is the information that has been summarized in the search results displayed in FIG. 7C. FIG. 7E is an example screen display that illustrates how the user might then go back and modify the query based upon information gleaned while drilling down a particular search. In this case, based upon the actions retrieved in the highest level search, the user has decided to drill down and look at "s6kinase" as it blocks or regulates some other entity. FIG. 7F is an example screen display that illustrates that the SQE retrieves relationships having similar verbs to the verb sense specified in the query. In this case, the verb "modulate" is searched for as a similar verb to the user specified verb "regulate."

Figure 8A:
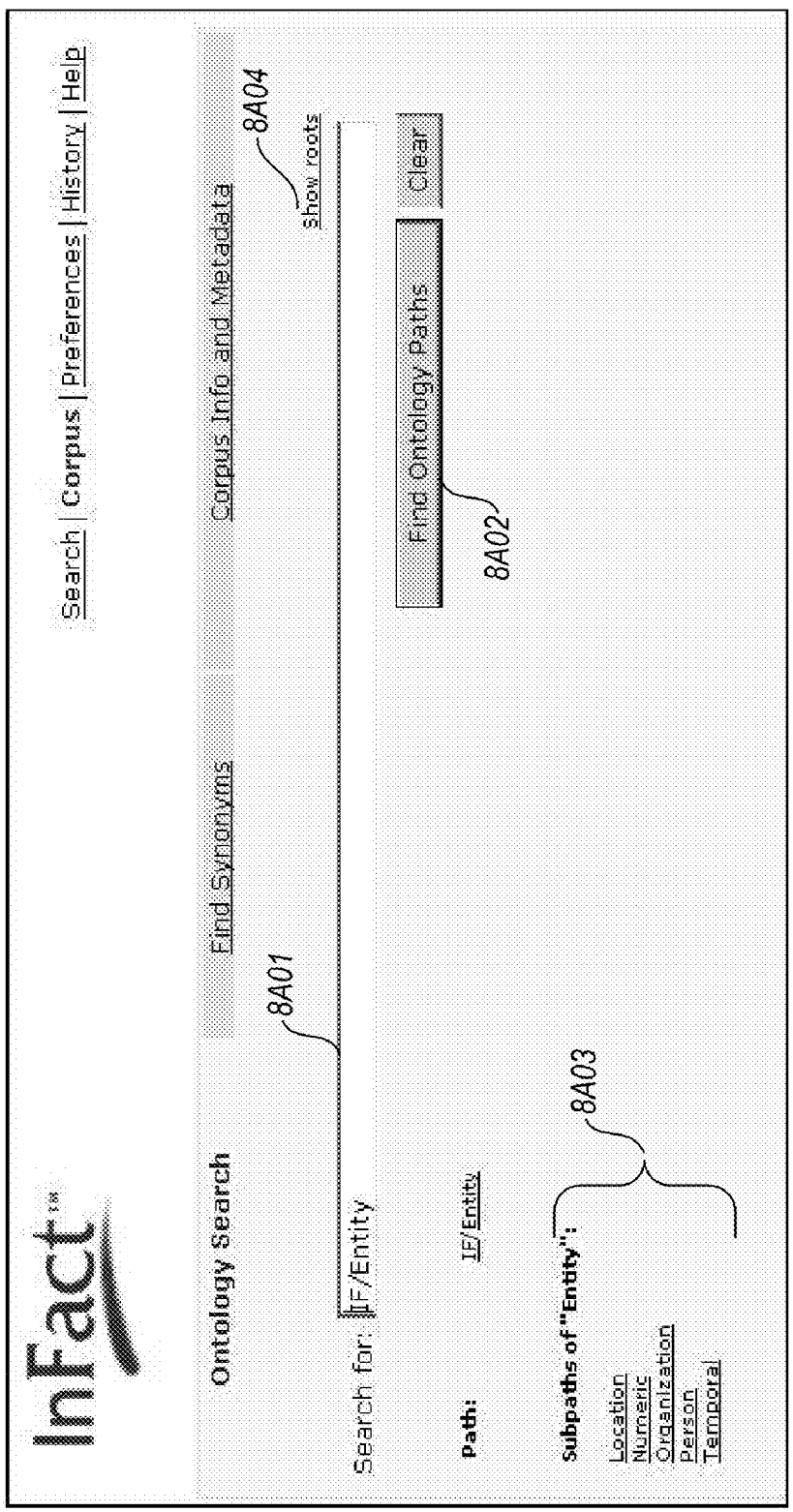

FIGS. 8A-8F are example screen displays of an interface associated with browsing ontology paths, viewing corpus metadata, and finding synonyms. FIG. 8A is an example screen display of navigation used to browse a default ontology path. When a user types a path specification into path input field 8A01 and presses the Find Ontology Paths button 8A02, then the corresponding additional subpaths are displayed in area 8A03. The user can select the "Show Roots" link 8A04 to show the roots of other ontologies available for that particular corpus. Note that an ontology typically includes a hierarchical classification system (a taxonomy) as well as properties associated with the nodes of the ontology and a dictionary.

Figure 8B:
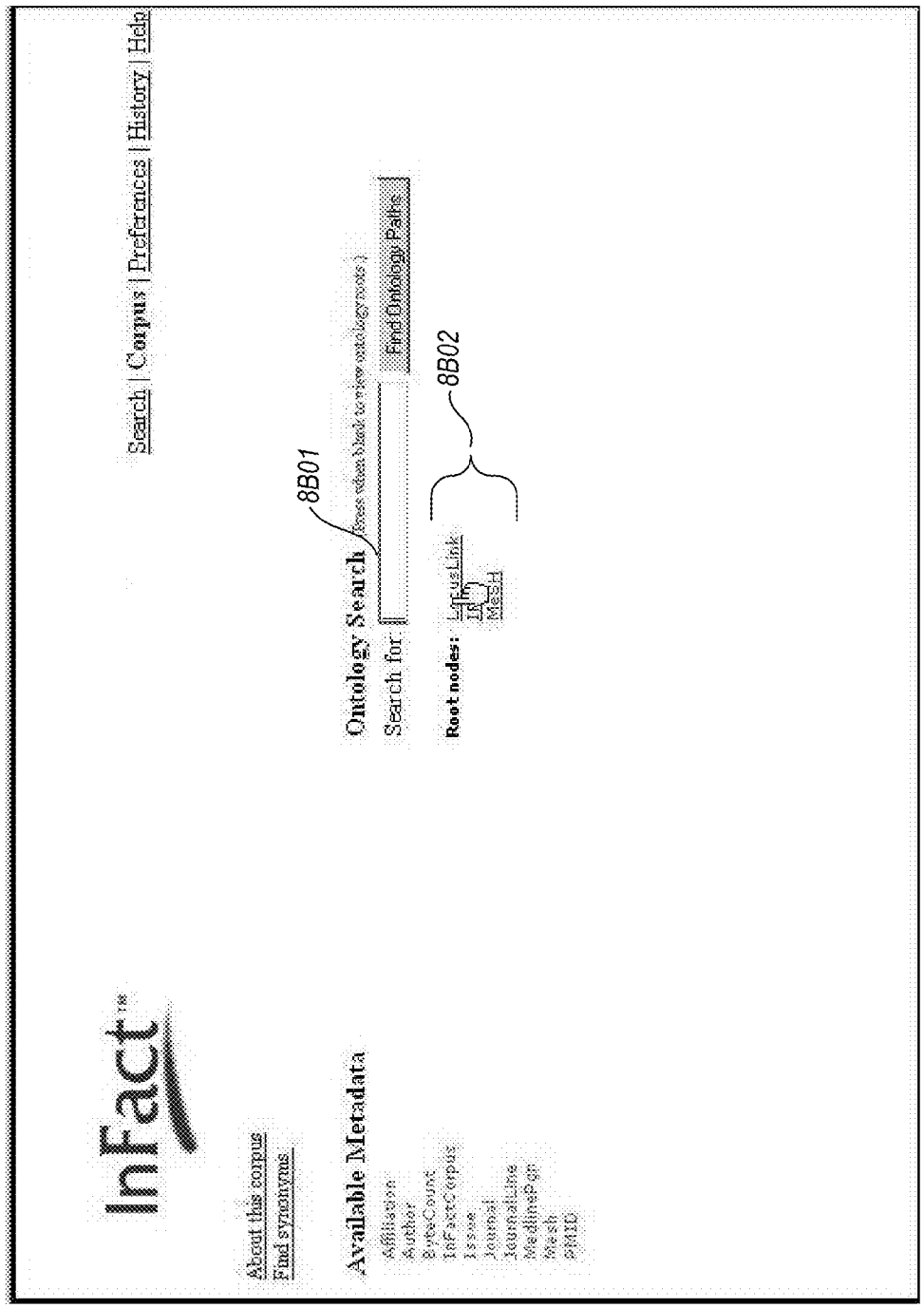
Figure 8C:
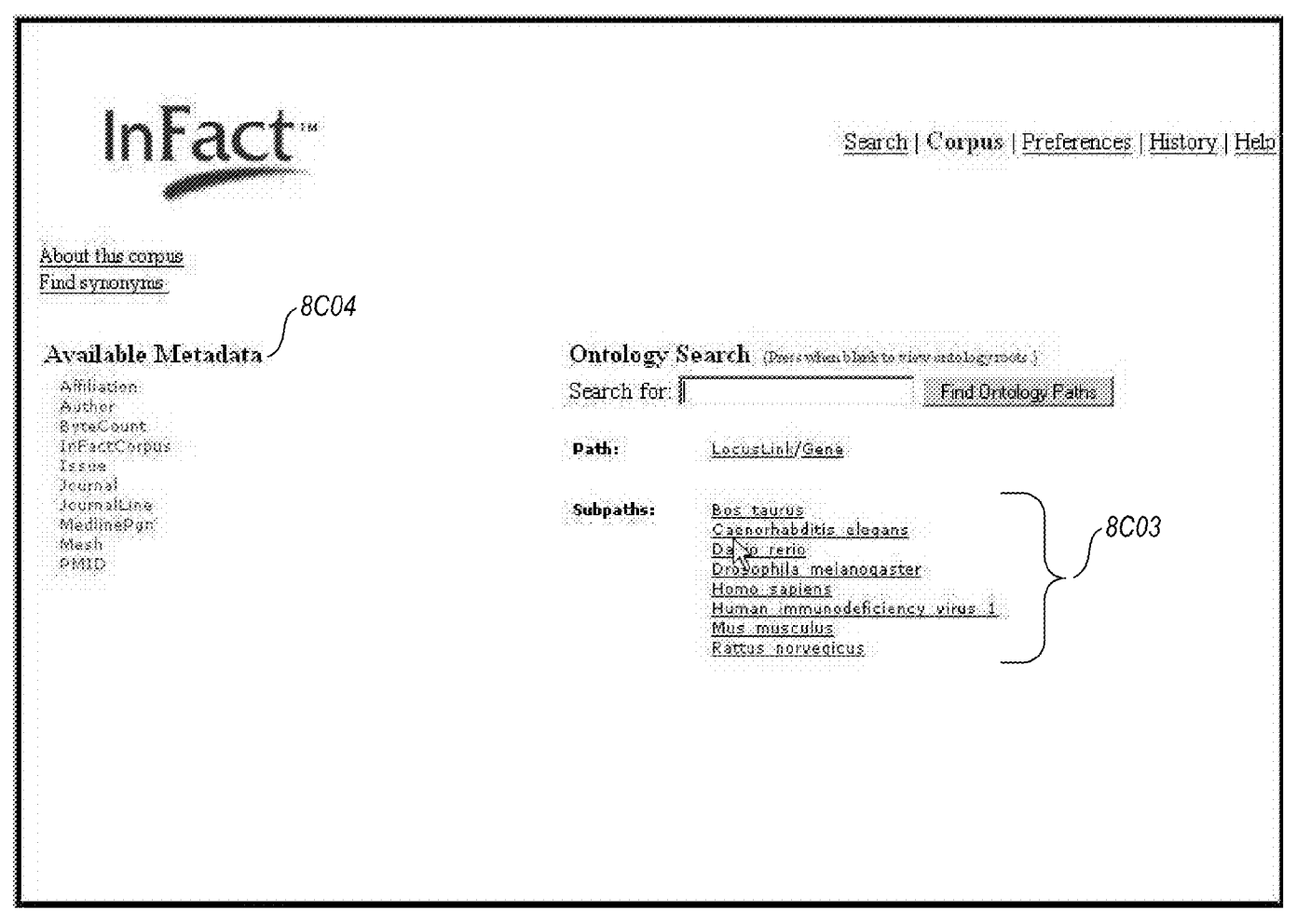
Figure 8D:
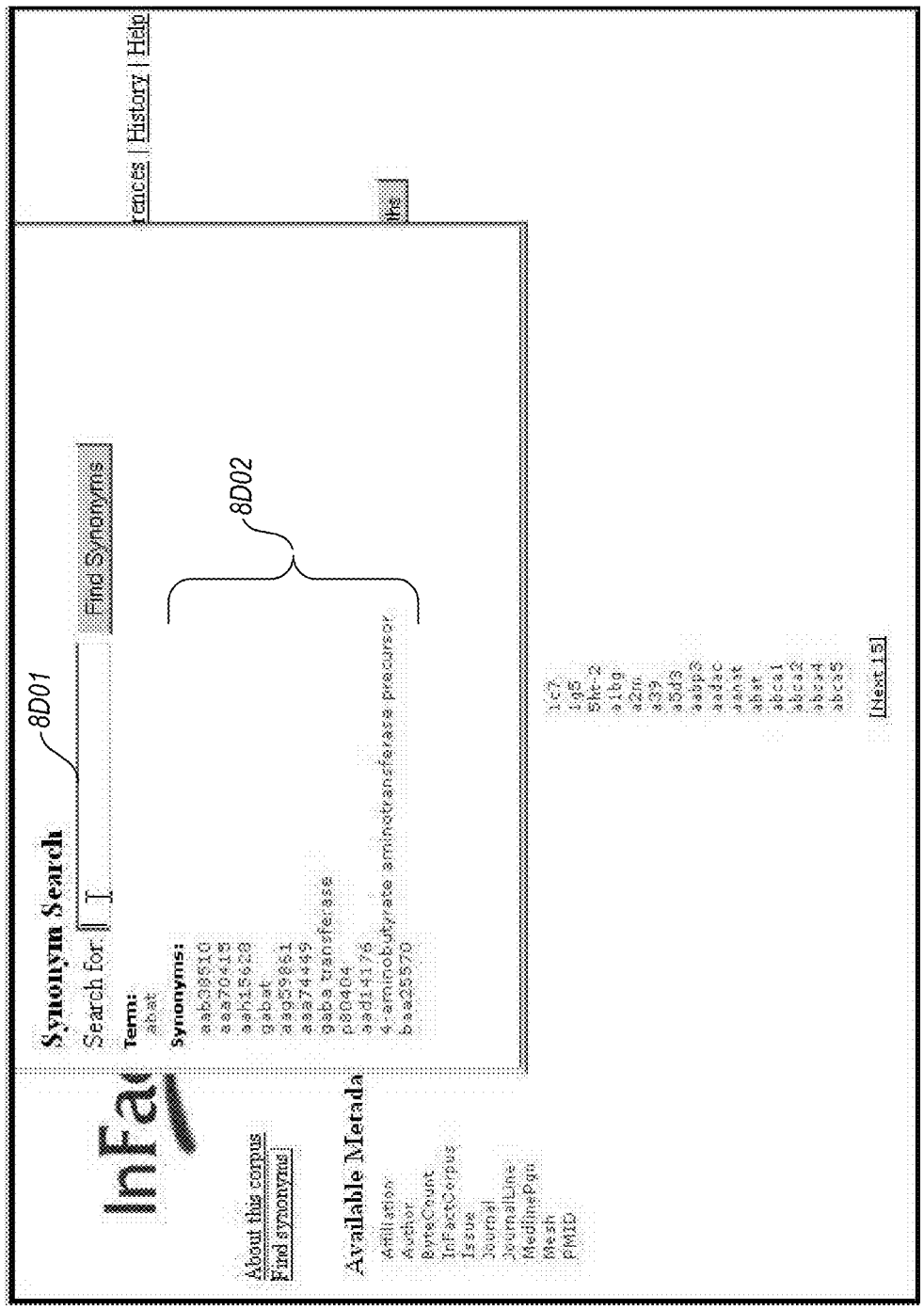
Figure 8E:
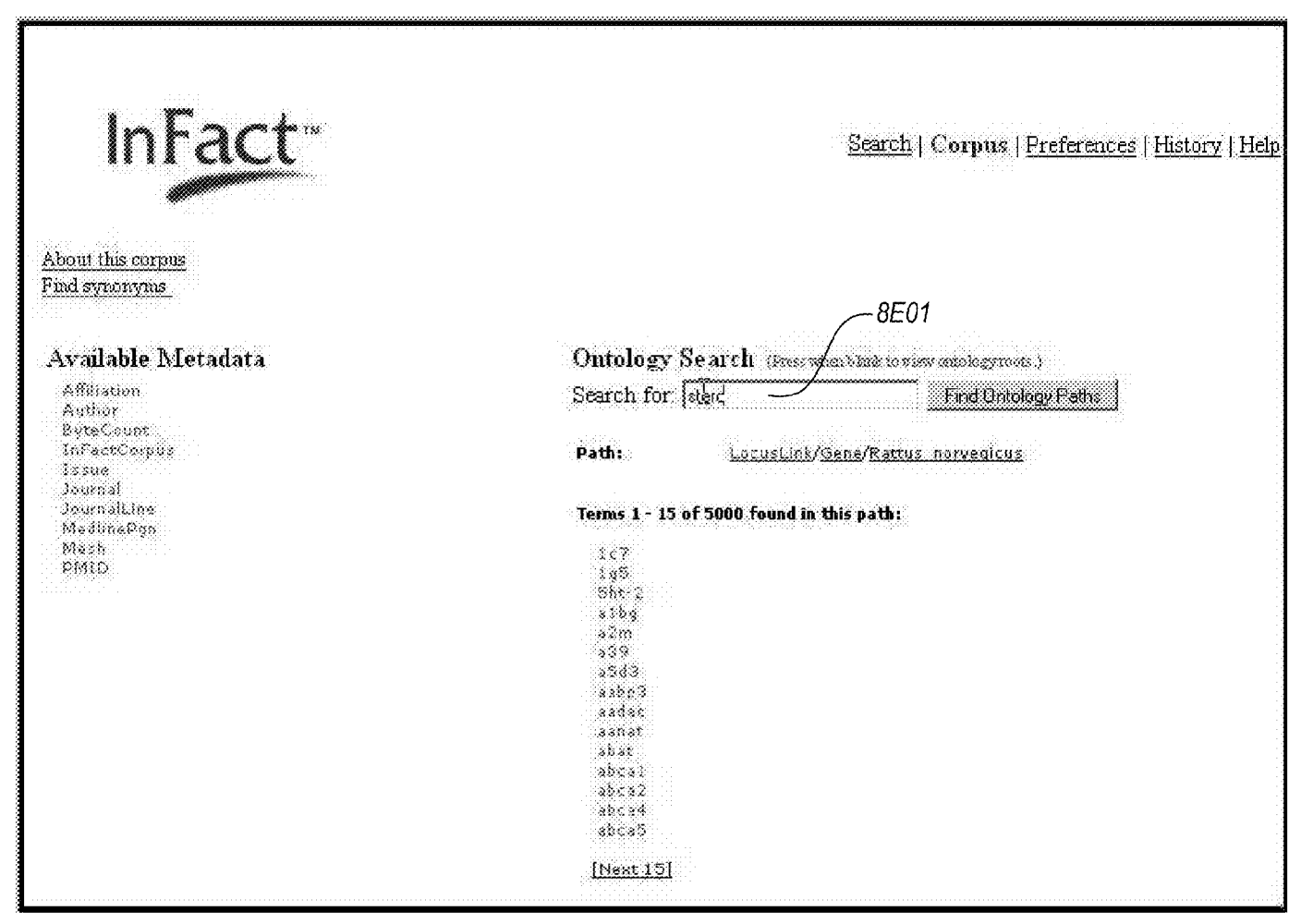
Figure 8F:
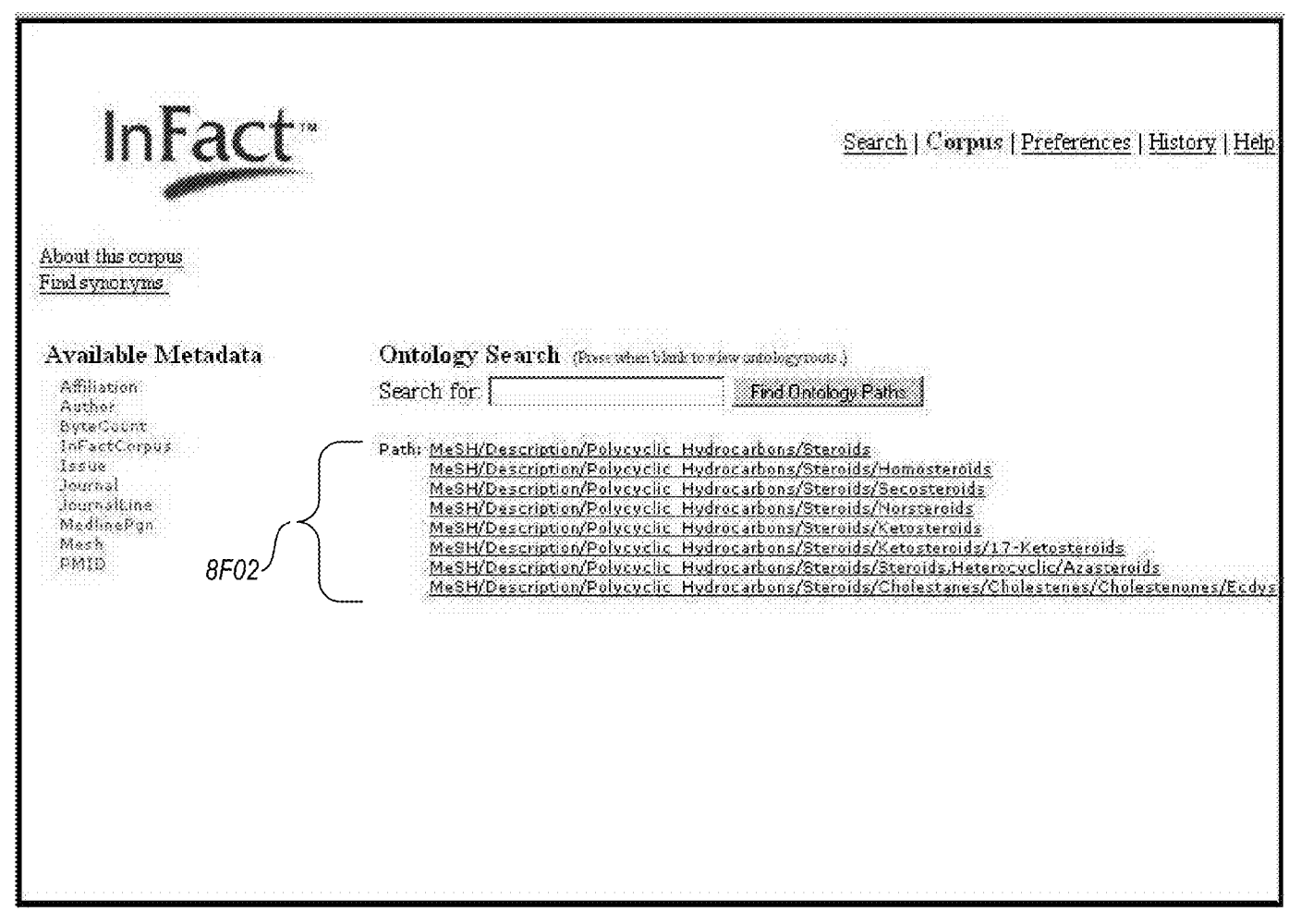

FIGS. 8B-8F are example screen displays from a different version of the user interface, and are provided herein to illustrate how different ontologies may be associated with a single corpus. In FIG. 8B, several links to root nodes 8B02 are displayed. The user can either select one of these nodes and begin browsing or type a specific path into path input field 8B01. In the example shown, the user selects the path "Locus-Link" and browses a hierarchy (not shown) by selecting a next node on the path labeled "Gene". The next ontology level below "Gene" is displayed in subpath area 8C03 of FIG. 8C. Note that according to this version of the interface, available metadata for the corpus is displayed in metadata display area 8C04. FIG. 8D is an example screen display of an interface used to search for synonyms. Synonyms for a word specified in input field 8D01 are displayed in synonym display area 8D02. Other interfaces may provide links or other user interface components for navigating to the metadata and synonym information. FIGS. 8E and 8F illustrate the behavior of the interface when the user inputs a specific entity classification into path input field 8E01. In this case, when the user types in the term "steroids," the SQE responds by displaying indications 8F02 of all ontology paths that contain the entity type "steroids."

Figure 9:
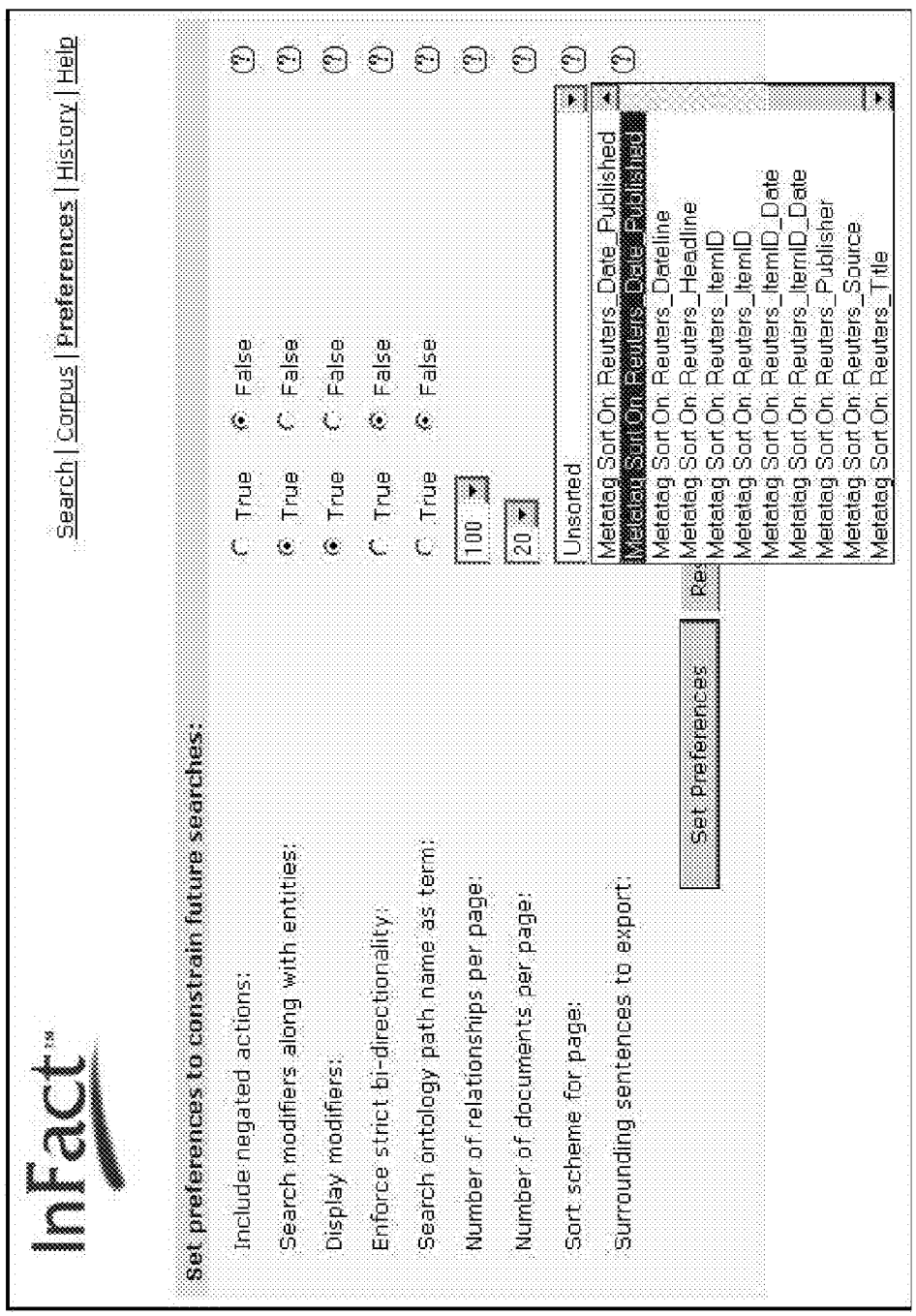
FIG. 9 is an example screen display of an interface associated with setting preferences for constraining relationship searches.

FIG. 9 is an example screen display of an interface associated with setting preferences for constraining relationship searches. There are a number of preference settings associated with a given search that may be customized to constrain search results or improve result display. The following options are illustrated on the Preferences page, and one skilled in the art will recognize that other options can be provided:

Include negated actions: When this option is enabled, relationships matching both the positive and negative sense of a verb are displayed. If a user performed a search such as "Clinton>visit>Russia", the sentence "Due to heath reasons Clinton did not visit Russia." would only be returned if this setting was set to true. By default Show Negated Actions is disabled, and only positive actions are displayed.

Search modifiers along with entities: This option specifies whether modifiers should be searched along with sources and/or targets (as subjects and/or objects). In the above example sentence "Bill visits beautiful, green pastures outside Seattle," if this property is set to true, then a search such as "Bill>visit>Seattle" will return the above relationship. If this property is false, then it will not, and only the query "Bill>visit>pasture" would still yield this result.

Display modifiers: In the sentence "Bill visits beautiful, green pastures outside Seattle," "beautiful, green" is the prefix modifier for pastures, and "outside Seattle" is the postfix modifier. In a search like "Bill>visit>*, with this property set to true the SQE will display modifiers along with pastures in the target entity summary. If this property is set to false, only the word 'pastures' will be displayed as the target in the tabular display.

Enforce strict bi-directionality: When doing searches with bi-directional arrows, such as "< >", the search can be interpreted in two different ways. For example, with the search query "Clinton< >*< >Bush", one might wish only to view results in which Bush did something to Clinton XOR Clinton did something to Bush. (XOR indicates an exclusive Boolean OR operation.) Enforcing strict bi-directionality provides this result. However, one might also wish to see instances in which Bush and Clinton both did something to some other target together. These additional results are displayed if strict bi-directionality is not enforced.

Search ontology path name as term: If a user includes an ontology path like "[city]" in a search query, then results with cities are returned. However, the word "city" is not an instance of an item in the ontology itself, and is not associated with the ontology path. Therefore, without setting this preference, one would not see results that contain the word "city." This preference is set to true to include results with the term "city" in them as well as any terms defined by the ontology path "city."

Number of relationships per page: The user can set the number of relationships to display on a single page of relationship results. The smaller this value, the faster results will be returned.

Number of documents per page: The user can set the number of documents to display on a single page of document results. The smaller this value, the faster results will be returned.

Sort scheme: This setting allows users to sort results in a given chunk or batch of results according to one of several sorting schemes, and to set the default sort scheme for all future searches. Note that an individual result set can also be sorted in the result display. If results are sorted using the drop-down selection box on the results page, the setting does not persist for subsequent searches.

Surrounding sentences to export: This option allows the user to vary how much contextual information from the document is included along with the sentences returned when the user exports a result set to HTML.

FIG. 10 is an example screen display of an interface associated with displaying SQE query history. The history page displays a history queue 1000 of all searches performed in the current browser session. If the browser dies, if you use another browser, or if you press the Clear button 1010, the history queue 1000 is reset. Clinking on one of links 1001-1002 for any query in the Query column will navigate to the results page for that particular query. Clinking on one of the links 1003-1004 in the Documents column will navigate to the set of documents that contain the results of that query. The "Depends On" column 1005 indicates whether a given query depends on a previous query, for example as a result of executing a nested search.

Figure 11A:
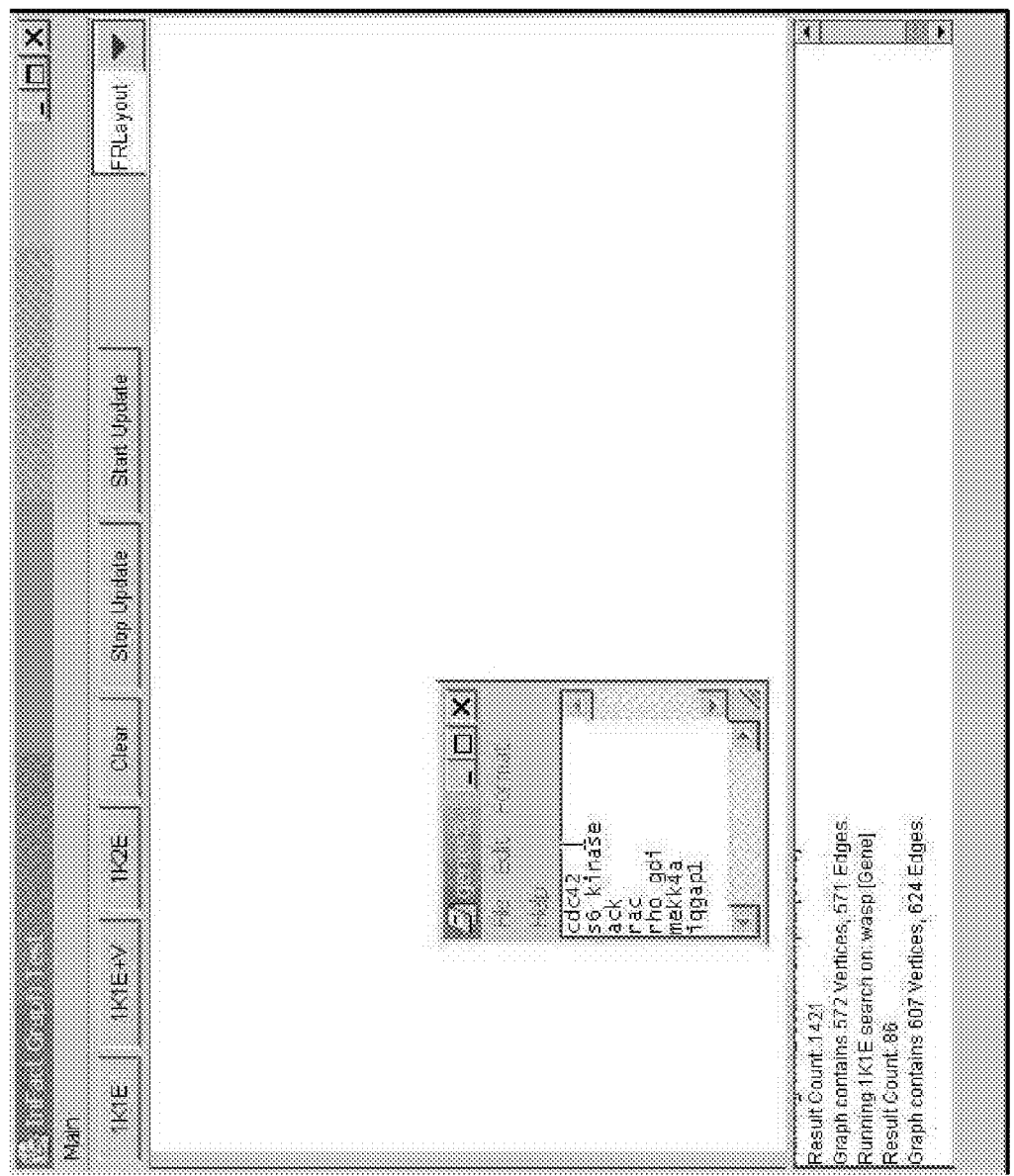
FIGS. 11A-11F are example screen displays from an alternate graphical based interface for displaying and discovering genetic relationships.
Figure 11B:
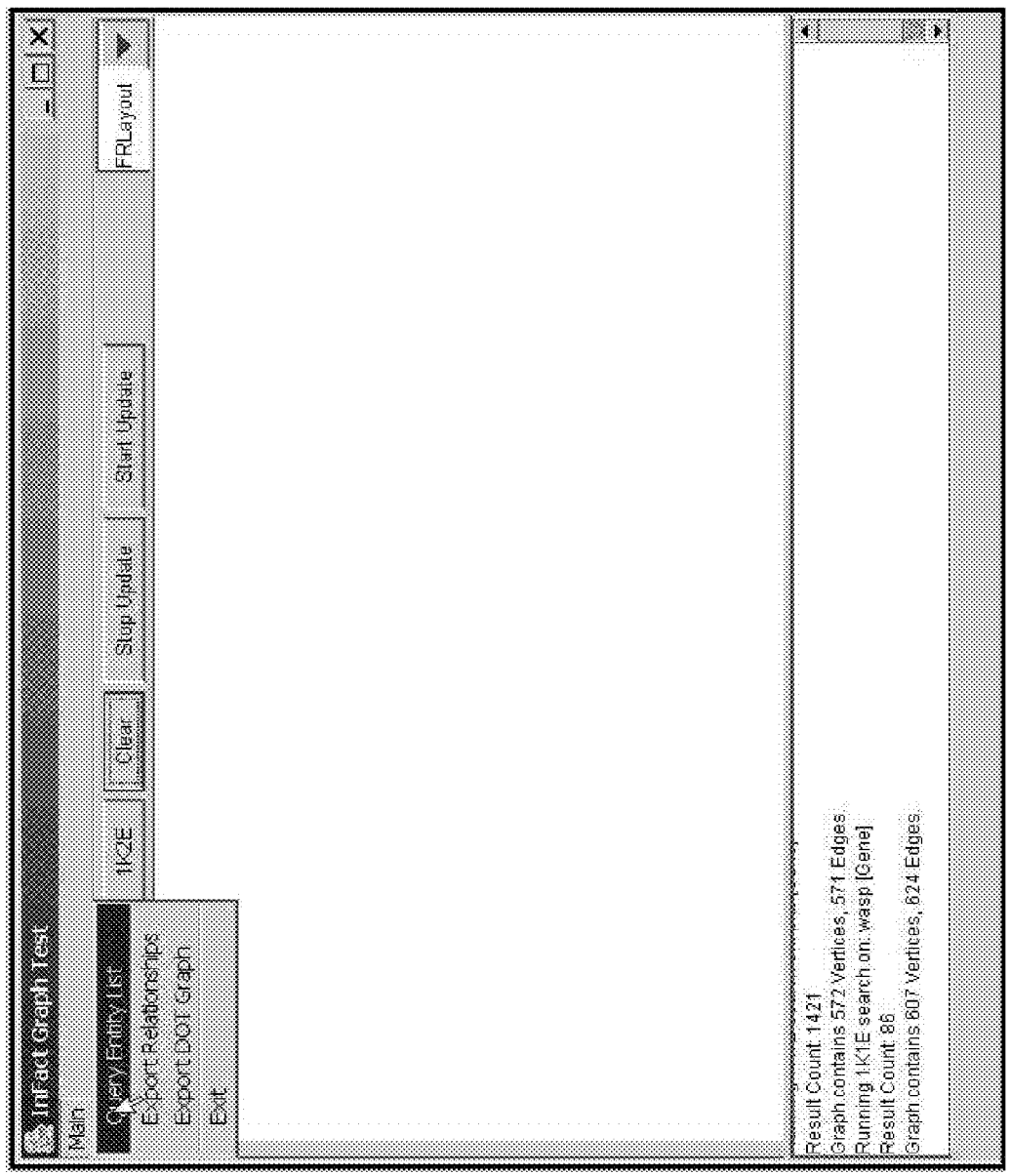
Figure 11C:
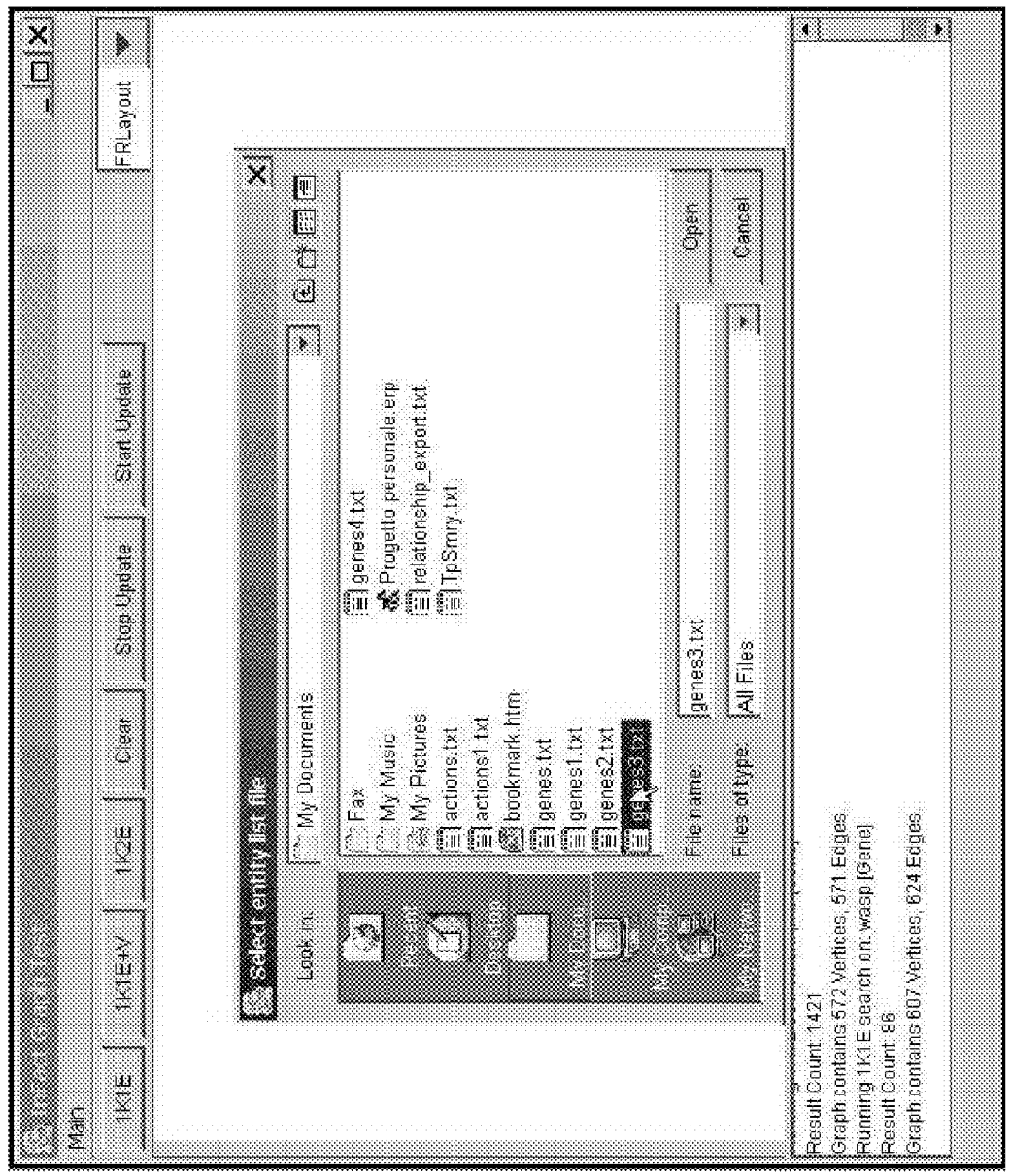
Figure 11D:
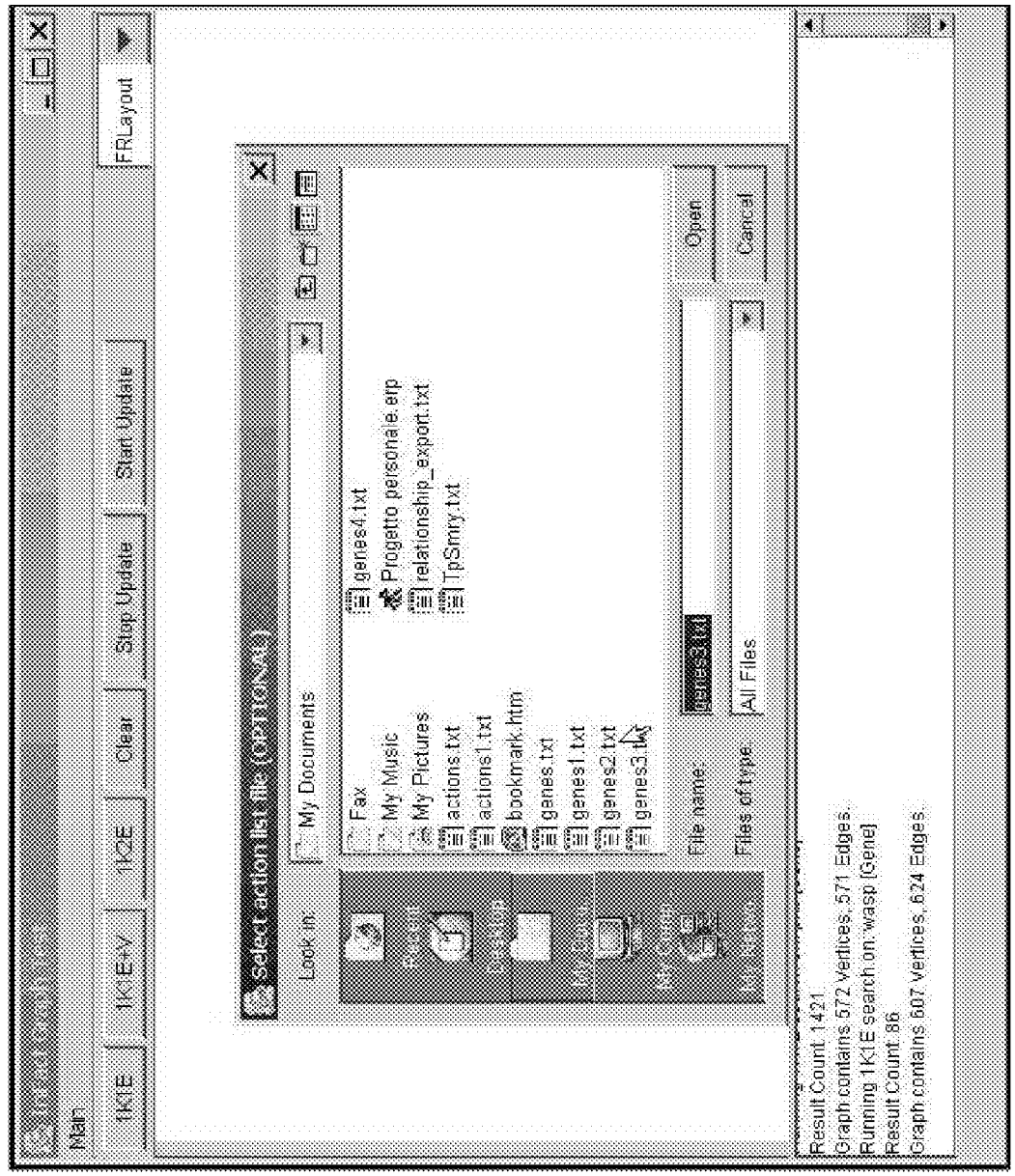
Figure 11E:
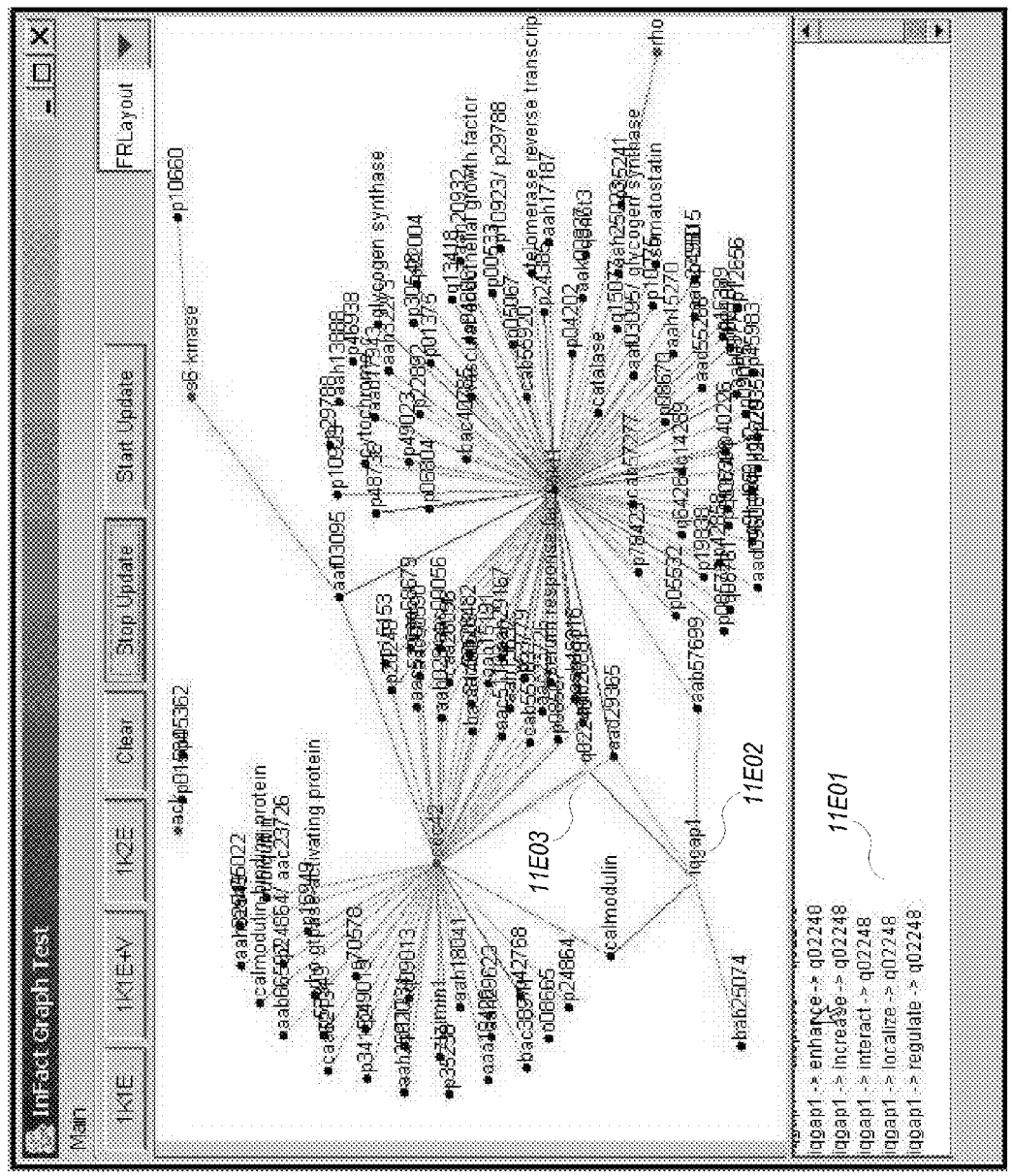
Figure 11F:
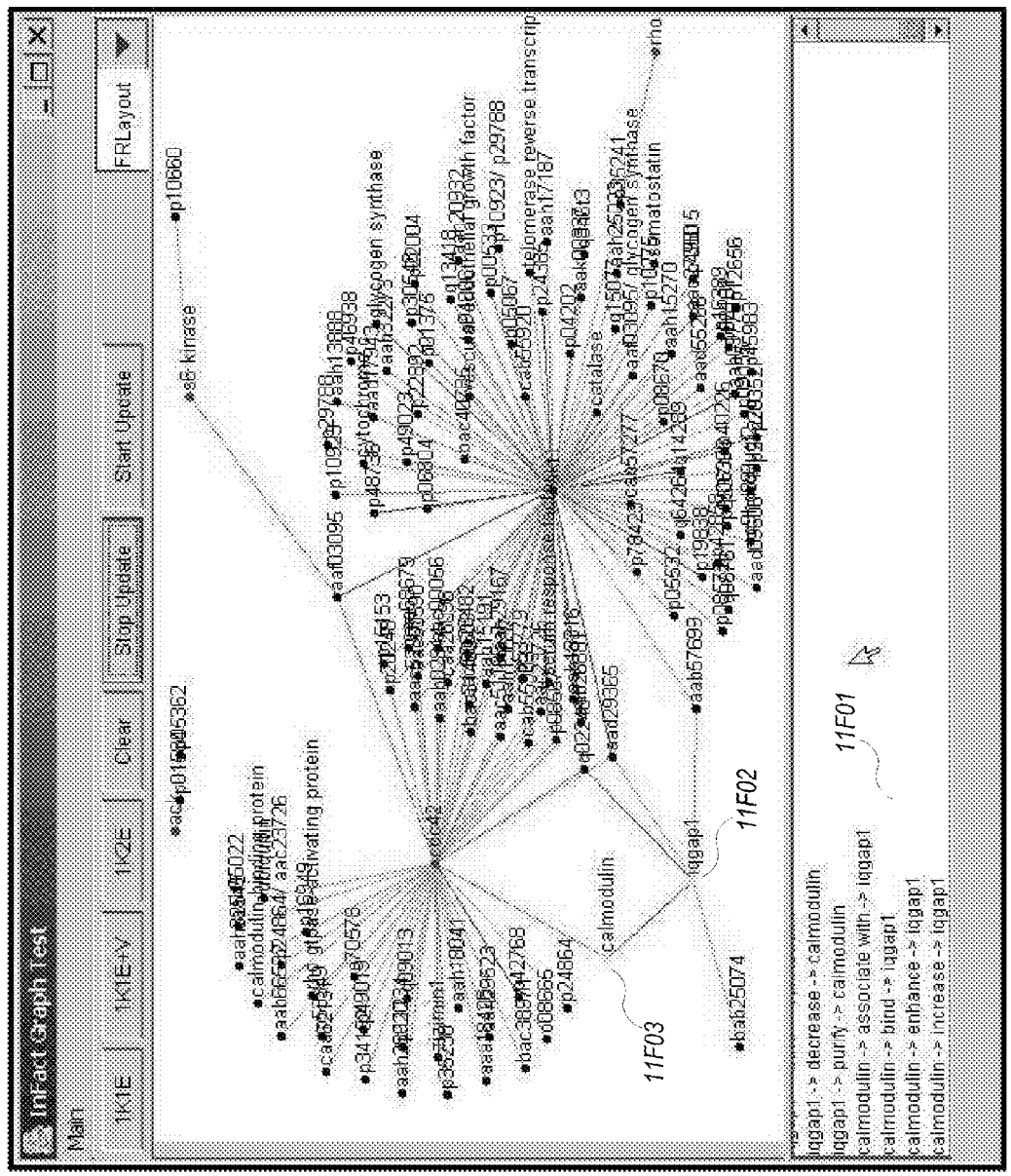

FIGS. 11A-11F are example screen displays from an alternate graphical based interface for displaying and discovering genetic relationships. This interface could be generated, for example, using an API supported by the SQE. Appendix C describes an example API that is supported by an example embodiment of an SQE, and is herein incorporated by reference in its entirety. One skilled in the art will recognize that many different APIs can be provided to support accessing the functions of an SQE from other code. In FIG. 11A, the user can select possible files that correspond to various sets of genes that can be studied to discover relationships between them. In FIG. 11B, the user indicates a desire to select the entity list to be displayed. In FIG. 11C, the user selects the "genes3.txt" file as the entity file to be displayed. In FIG. 11D, the user (optionally) selects an action list file, for displaying specific types of relationships (based upon verbs). FIGS. 11E and 11F show the results of the relationships between selected genes. Each dot represents a different gene and each line between two genes represents a relationship evidenced by the corpus. Selecting two genes in the graphical user interface results in the specification of an RQL formulated query to the SQE. FIG. 11E illustrates the results of selecting two of the genes in order to display the specific relationships between them. In this case the user has selected the iqgap1 gene 11E02 and the q02248 gene 11E03 and the possible "actions" between them are displayed in relationship results area 11E01. In this case, the relationships include "interactions," "regulation," and "localization." At this point, the user has gained information for further follow up. In FIG. 11F, two different genes (entities) 11F02 and 11F03 are selected to display relationships between them. The actions between them are displayed in relationship results area 11F01. Note that the relationship query invokes a search for both genes as source and target in this example.

Figure 12:
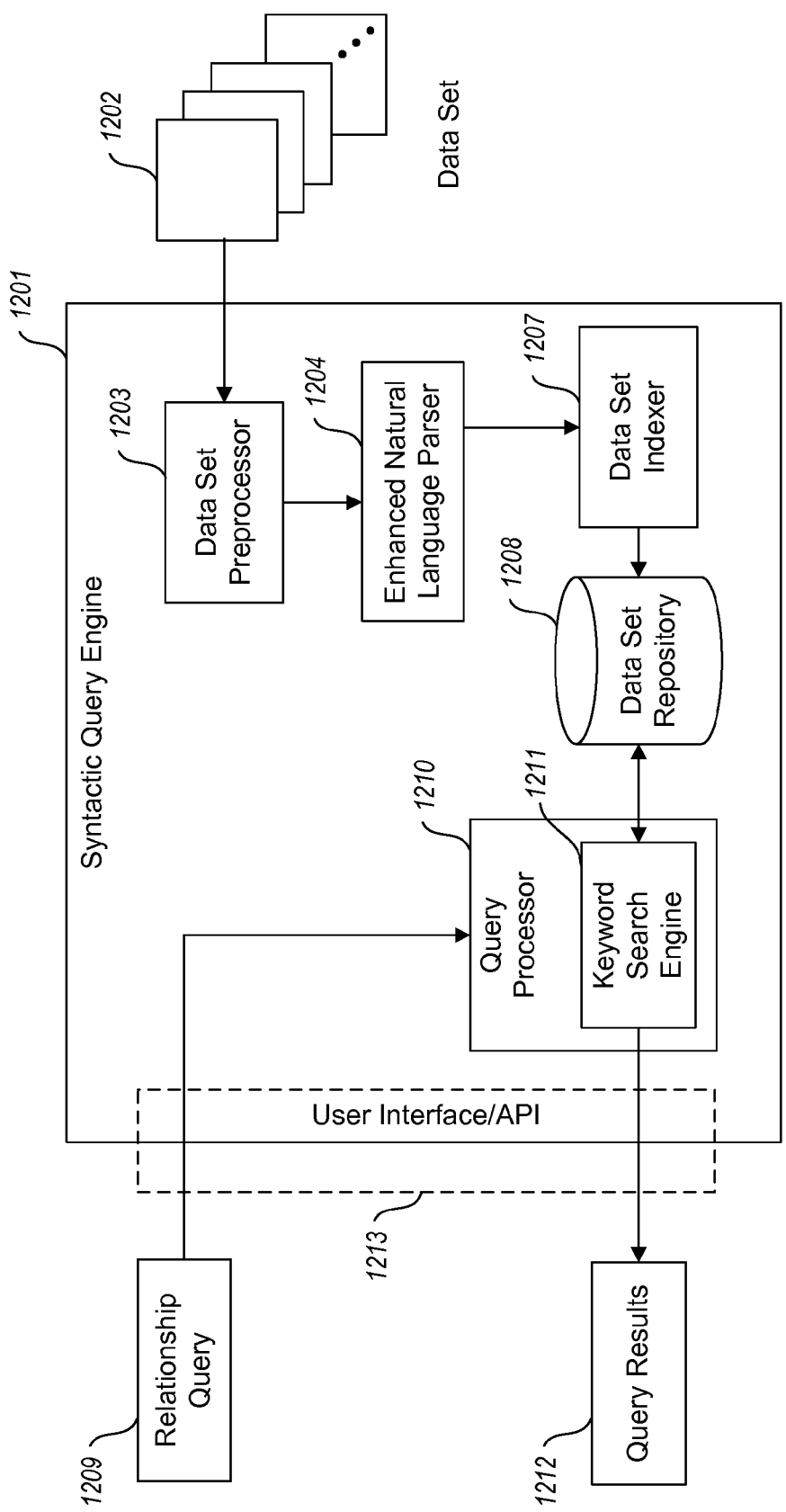
FIG. 12 is a conceptual block diagram of the components of an example embodiment of a Syntactic Query Engine.

An SQE as described may perform multiple functions (e.g., data set parsing, data set storage, query transformation and processing, and displaying results) and typically comprises a plurality of components. FIG. 12 is a conceptual block diagram of the components of an example embodiment of a Syntactic Query Engine. A Syntactic Query Engine 1201 comprises a Relationship Query Processor 1210, a Data Set Preprocessor 1203, a Data Set Indexer 1207, an Enhanced Natural Language Parser ("ENLP") 1204, a data set repository 1208, and, in some embodiments, a user interface (or an Applications Programming Interface "API") 1313. The Data Set Preprocessor 1203 converts received data sets 1202 to a format that the Enhanced Natural Language Parser 1204 recognizes. The Enhanced Natural Language Parser ("ENLP") 1204, parses the preprocessed sentences, identifying the syntax and grammatical role of each meaningful term in the sentence and the ways in which the terms are related to one another and/or identifies designated entity and other ontology tag types and their associated values, and transforms the sentences into a canonical form—a normalized data representation. The Data Set Indexer 1207 indexes the normalized data into the enhanced document indexes and stores them in the data set repository 1208. The Relationship Query Processor 1210 receives relationship queries and transforms them into a format that the Keyword Search Engine 1211 recognizes and can execute. (Recall that the Keyword Search Engine 1211 may be an external or $3^{rd}$ party keyword search engine that the SQE calls to execute queries.) The Keyword Search Engine 1211 generates and executes keyword searches (as Boolean expressions of keywords) against the data set that is indexed and stored in the data set repository 1208. The Keyword Search Engine 1211 returns the search results through the user interface/API 1213 to the requester as Query Results 1212.

In operation, the SQE 1201 receives as input a data set 1202 to be indexed and stored. The Data Set Preprocessor 1203 prepares the data set for parsing by assigning a Document ID to each document that is part of the received data set (and sentence and clause IDs as appropriate), performing OCR processing on any non-textual entities that are part of the received data set, and formatting each sentence according to the ENLP format requirements. The Enhanced Natural Language Parser ("ENLP") 1204 parses the data set, identifying for each sentence, a set of terms, each term's tags, including potentially part of speech and associated grammatical role tags and any associated entity tags or ontology path information, and transforms this data into normalized data. The Data Set Indexer 1207 indexes and stores the normalized data output from the ENLP in the data set repository 1208. The data set repository 1208 represents whatever type of storage along with the techniques used to store the enhanced document indexes. For example, the indexes may be stored as sparse matrix data structures, flat files, etc. and reflect whatever format corresponds to the input format expected by the keyword search engine. After a data set is indexed, a Relationship Query 1209 may be submitted to the SQE 1201 for processing. The Relationship Query Processor 1210 prepares the query for parsing, for example by splitting the Relationship Query 1209 into sub-queries that are executable directly by the Keyword Search Engine 1211. As explained above, a Relationship Query 1209 is typically comprised of a syntactic search along with optional constraint expressions. Also, different system configuration parameters can be defined that influence and instruct the SQE to search using particular rules, for example, to include synonyms, related verbs, etc. Thus, the Relationship Query Processor 1210 is responsible for augmenting the specified Relationship Query 1209 in accordance with the current SQE configured parameters. To do so, the Relationship Query Processor 1210 may access the ontology information which may be stored in Data Set Repository 1208 or some other data repository. The Relationship Query Processor 1210 splits up the query into a set of Boolean expression searches that are executed by the Keyword Search engine 1211 and causes the searches to be executed. The Relationship Query Processor 1210 then receives the result of each search from the Keyword Search Engine 1211 and combines them as indicated in the original Relationship Query 1209 (for example, using Boolean operators). One skilled in the art will recognize that the Relationship Query Processor 1210 may be comprised of multiple subcomponents that each execute a portion of the work required to preprocess and execute a relationship query and combine the results for presentation. The results (in portions or as required) are sent to the User Interface/API component 1213 to produce the overall Query Result 1212. The User Interface Component 1213 may interface to a user in a manner similar to that shown in the display screens of FIGS. 6A-6G and 7A-7F.

Figure 13:
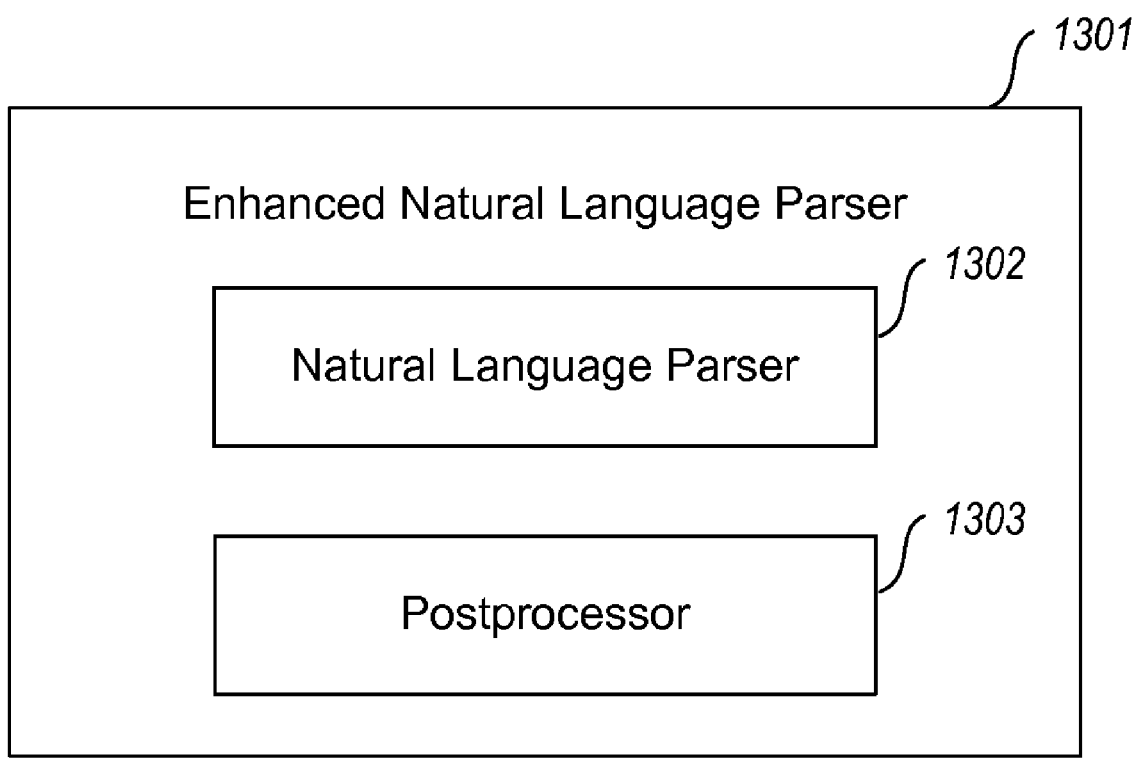
FIG. 13 is a block diagram of the components of an Enhanced Natural Language Parser of an example embodiment of a Syntactic Query Engine.

FIG. 13 is a block diagram of the components of an Enhanced Natural Language Parser of an example embodiment of a Syntactic Query Engine. The Enhanced Natural Language Parser ("ENLP") 1301 comprises a natural language parser 1302 and a postprocessor 1303. The natural language parser 1302 identifies, for each sentence it receives as input, the part of speech for each term in the sentence and syntactic relationships between the terms each clause of the sentence. An SQE may be implemented by integrating a proprietary natural language parser into the ENLP, or by integrating an existing off-the-shelf natural language parser. The postprocessor 1303 examines the natural language parser 1302 output and, from the identified parts of speech and syntactic relationships, determines the grammatical role played by each term in the sentence and the grammatical relationships between those terms. When entity tags or other types of semantic tags (indicating nodes in an ontology path) are used in addition to or in lieu of the grammatical relationships, the postprocessor 1303 (or the natural language parser 1302 if capable of recognizing such tags) identifies, for each sentence (or clause where relevant), each semantic tag type and its value. For example, the term "China" could be recognized as an entity type of "COUNTRY" having the (fully specified) ontology path indicator of "IF/ENTITY/LOCATION/COUNTRY." The postprocessor 1303 then generates an enhanced data representation from the determined tags, including the entity tags, other ontology node tags, grammatical roles, and syntactic and grammatical relationships.

Figure 14:
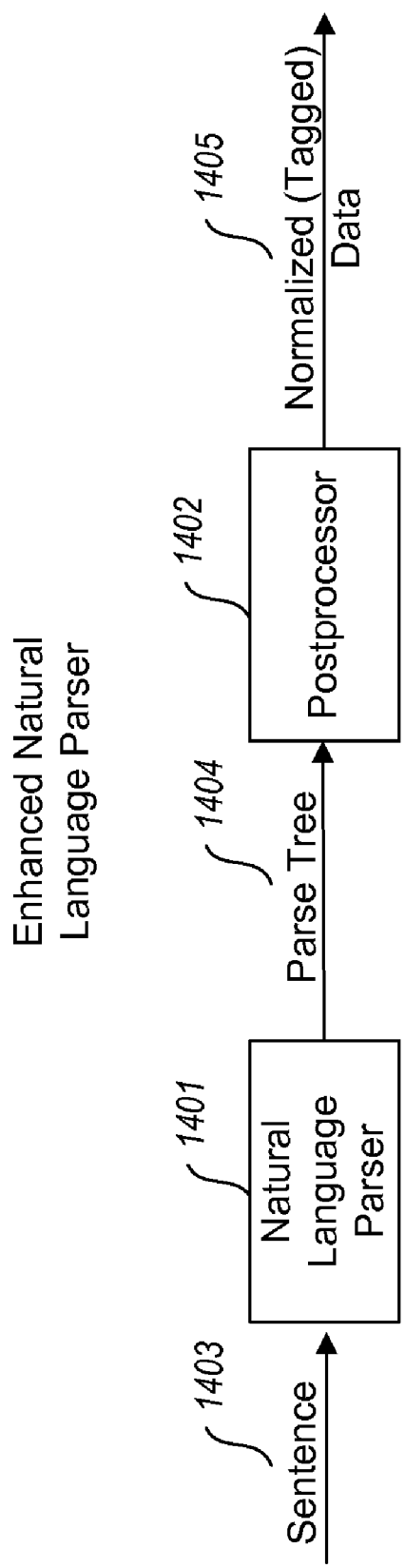
FIG. 14 is a block diagram of the processing performed by an example Enhanced Natural Language Parser.

FIG. 14 is a block diagram of the processing performed by an example Enhanced Natural Language Parser. During document ingestion, the natural language parser 1401 receives a sentence 1403 (or portion thereof) as input, and generates a syntactic structure, such as parse tree 1404. The generated parse tree 1404 identifies the part of speech for each term in each clause of the sentence and describes the relative positions of the terms within the clause. In embodiments that support the recognition of entity tags or other types of ontology path information, the parser 1401 (or postprocessor 1402 if the parser is not capable) also identifies in the parse tree (not shown) the semantic tag type for each corresponding term in the sentence. The postprocessor 1402 receives the generated parse tree 1404 as input, determines the grammatical role of each term in the clause and relationships between terms in the clause, and generates a normalized version of the sentence data annotated with the grammatical role tags (syntactic tags) and semantic tags 1405.

Figure 15:
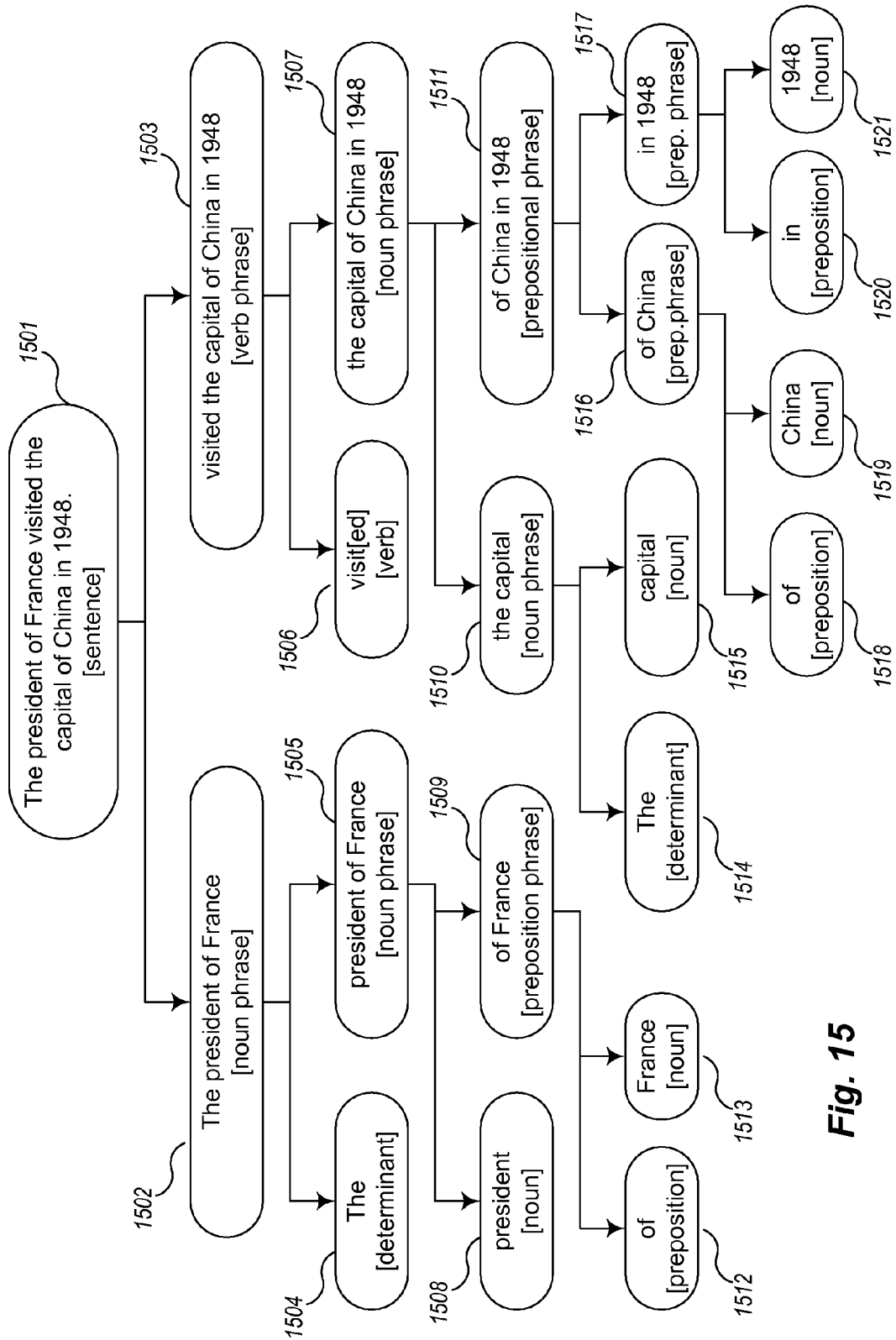
FIG. 15 is a block diagram illustrating a graphical representation of an example syntactic structure generated by the natural language parser component of an Enhanced Natural Language Parser.

FIG. 15 is a block diagram illustrating a graphical representation of an example syntactic structure generated by the natural language parser component of an Enhanced Natural Language Parser. The parse tree shown is one example of a representation that may be generated by a natural language parser. The techniques of the methods and systems of the present invention, implemented in this example in the postprocessor component of the ENLP, enhance the representation generated by the natural language processor by determining the grammatical role of each meaningful term, associating these terms with their determined roles and determining relationships between terms. In embodiments in which the natural language parser cannot support the recognition of semantic tags, one skilled in the art will recognize that the postprocessor component (such as Postprocessor 1303 in FIG. 13) can be programmed to enhance the representation with such tags. In FIG. 15, the top node 1501 represents the entire sentence, "The president of France visited the capital of China in 1948." Nodes 1502 and 1503 identify the noun phrase of the sentence, "The president of France," and the verb phrase of the sentence, "visited the capital of China in 1948," respectively. The branches of nodes or leaves in the parse tree represent the parts of the sentence further divided until, at each leaf level, each term is singled out and associated with a part of speech. A configurable list of words are ignored by the parser as "stopwords." The stopword list comprises words that are deemed not indicative of the information being sought. Example stopwords are "a," "the," "and," "or," and "but." In one embodiment, question words (e.g., "who," "what," "where," "when," "why," "how," and "does") are also ignored by the parser. In this example, after ignoring the determinant "The" (node 1504), nodes 1508 and 1509 identify the noun phrase 1505 as comprising a noun, "president" and a prepositional phrase, "of France." Nodes 1512 and 1513 divide the prepositional phrase 1509 into a preposition, "of," and a noun, "France." Nodes 1506 and 1507 divide the verb phrase 1503 into a verb, "visit," (morphological form of "visited") and a noun phrase, "the capital of China in 1948." Nodes 1510 and 1511 divide the noun phrase 1507 ultimately after several additional steps into a determinant "The" (node 1514), which may be ignored as a stopword; a noun "capital" (node 1515); a preposition "of" (node 1518); a noun "China" (node 1519); a preposition "in" (node 1520); and a noun "1948" (node 1521).

FIG. 16 is a table that conceptually illustrates normalized data that has been annotated with syntactic and semantic tags by the postprocessor component of an Enhanced Natural Language Parser. Depending upon the implementation of the ENLP, the normalized data may or may not be stored in an intermediate data structure prior to being indexed and stored in the enhanced document indexes, such as the term-clause index. The example normalized data representation illustrates annotations applied to the sentence that was illustrated in the parse tree of FIG. 15. The annotations are of course dependent upon the ontology root node specified (which in this case is a default ontology root node called "IF") and whether the SQE has been configured to parse with semantic tags. Also, one skilled in the art will recognize that the selected roles and relationship information to be stored may be programmatically determined. In the example shown, row 1601 shows the indexing information for the term "president" and specifies that the term is associated with a grammatical role of "subject" and has been tagged as a type of person (relative to the ontology being used). The SQE also recognizes and maintains information that the subject of this clause is associated with a (suffix) modifier term "France," which has been tagged as a type of country. The SQE maintains modifier information for subjects, objects, and prepositional phrases, because, in some configurations, the SQE can search for specified subject, object, and/or prepositional constraint terms in addition as modifiers, thereby returning documents that potentially may be relevant even though the sentence clauses didn't include the specified terms precisely as subjects, objects, or complement of a preposition. Row 1602 shows the indexing information for the term "visited" and specifies that the term is associated with the grammatical role of "verb." Note that the SQE stores the stemmed form of the verb "visit" so as to potentially match more forms of the verb. Other heuristics could be similarly incorporated. Row 1603 shows the indexing information for the term "capital," including that the term is tagged with a grammatical role of "object" and is associated with two suffix modifiers "China" and "1948," the first of which is tagged as a country (and a location and an entity) and the second of which is tagged as a date (and a numeric value and an entity). Note that these terms are maintained by the SQE as modifiers even though they are also maintained as prepositional complements for use in relationship queries that filter based upon prepositional constraints. Row 1604 shows the indexing information for the term "China," including that the term is tagged with a grammatical role of "prepositional complement" and a semantic tag that specifies that the term is a kind of date. Similarly, row 1605 shows the indexing information for the term "1948," including that the term is tagged with a grammatical role of "prepositional complement" and a semantic tag that specifies that the term is a kind of country (and location and entity). Row 1606 shows the additional sentence/clause information, which in this case is an indication that the clause is a "temporal" one. Clause and sentence information may indicate, for example, that the clause relative to other clauses in the sentence is a conditional clause, a causal clause, a prepositional clause, or a temporal clause or that the sentence is a question, a definition, or contains temporal or numerical information. One skilled in the art will recognize that other classifications of interclause relationships and of sentences may also be incorporated. Also, other linguistic heuristics can be used to generate enhanced indexing information indicated by the normalized data produced by the ENLP. For example, in some implementations, the ENLP provides "co-referencing" analysis, which allows the ENLP to replace pronouns with nouns, or nouns, pronoun phrases, noun phrases, aliases, abbreviations, acronyms, etc. with a corresponding identifying noun. This capability allows greater search accuracy, especially when searching for specific entity names.

Note that the normalized data shown in FIG. 16 supports many different types of relationship queries. For example, all of the following relationship queries will cause the SQE to return an indicator to the sentence that has been normalized to the data of FIG. 16 (assuming modifiers are searched):

| | |
|---|---|
| * > visits > [country] | (Query for information on all visits of all countries.) |
| president <> * | (Query for anything a president does.) |
| * > * > China | (Query for any relationship with China.) |
| (Note that the SQE returns the sentence because it searches for "China" as a modifier instead of just as an object of the sentence.) | |
| * > * > [country] | (Query for any relationship with any country.) |
| France <> * <> China | (Query for any relationship b/n France & China.) |
| (Note that the SQE returns the sentence because it searches for "France" and "China" as modifiers instead of just as subjects and/or objects of the sentence.) | |

Thus, the normalized data demonstrated by FIG. 16 is supportive of and responsive to a very flexible style of specifying relationship queries.

The Syntactic Query Engine performs two functions to accomplish effective relationship query processing with syntactic searching capabilities. The first is the parsing, indexing, and storage of a data set (sometimes termed corpus ingestion). The second is the query processing, which according to the example embodiment described herein, results in the execution of keyword searches. These two functions are outlined with reference to FIGS. 17-19.

Figure 17:
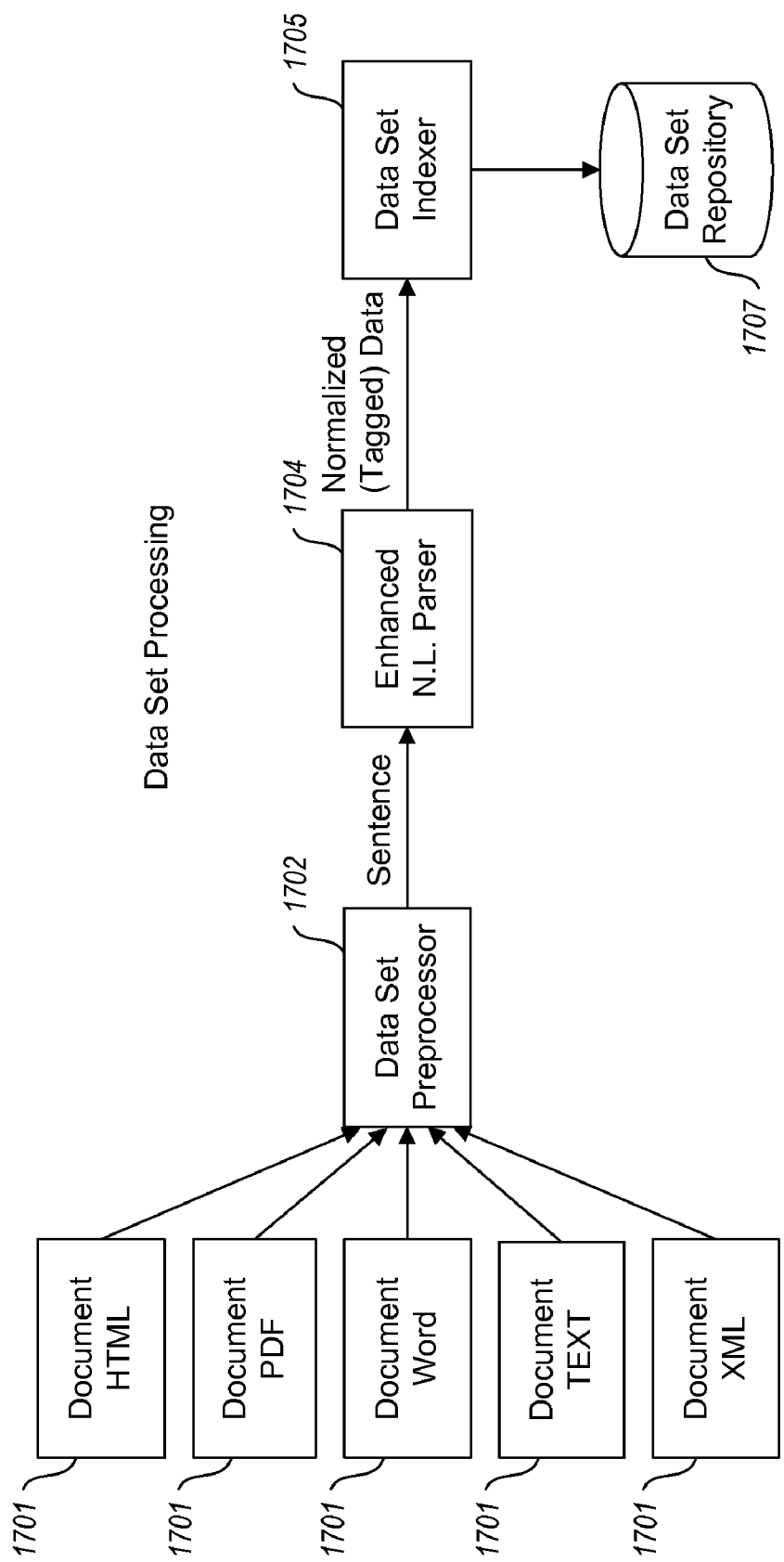
FIG. 17 is an example block diagram of data set processing performed by a Syntactic Query Engine.

FIG. 17 is an example block diagram of data set processing performed by a Syntactic Query Engine. As an example, documents that make up a data set 1701 are submitted to the Data Set Preprocessor 1702 (e.g., component 1203 in FIG. 12). If the data set comprises multiple files, as shown in FIG. 17, in one embodiment the Data Set Preprocessor 1702 creates one tagged file containing the document set. The Data Set Preprocessor 1702 then dissects that file into individual sentences and sends each sentence to the ENLP 1704 (e.g., component 1204 in FIG. 12). After the ENLP 1704 parses each received sentence, it sends the generated normalized data that corresponds to each clause of each sentence (e.g., data such as that represented by FIG. 16) to the Data Set Indexer 1705 (e.g., component 1207 in FIG. 12). The Data Set Indexer 1705 processes the ENLP output, indexing and storing the information in a format that is dependent upon the storage representation of the enhanced document indexes (for example, the term-clause, term-sentence, and term-document indexes). One skilled in the art will recognize that other methods of data set preprocessing, indexing, and storing may be implemented in place of the methods described herein, and that such modifications are contemplated by the methods and systems of the present invention. For example, the data may be indexed according to a variety of schemes and distributed across a plurality of repositories.

In addition to indexing and storing a data set prior initially, in some embodiments, the SQE can incrementally index and store new documents, updating the relevant enhanced document indexes as necessary. In addition, in embodiments that support dynamic changes to an existing ontology, the SQE can determine a set of affected documents and "re-ingest" a portion of the corpus as needed. Other variations can be similarly accommodated.

Figure 18:
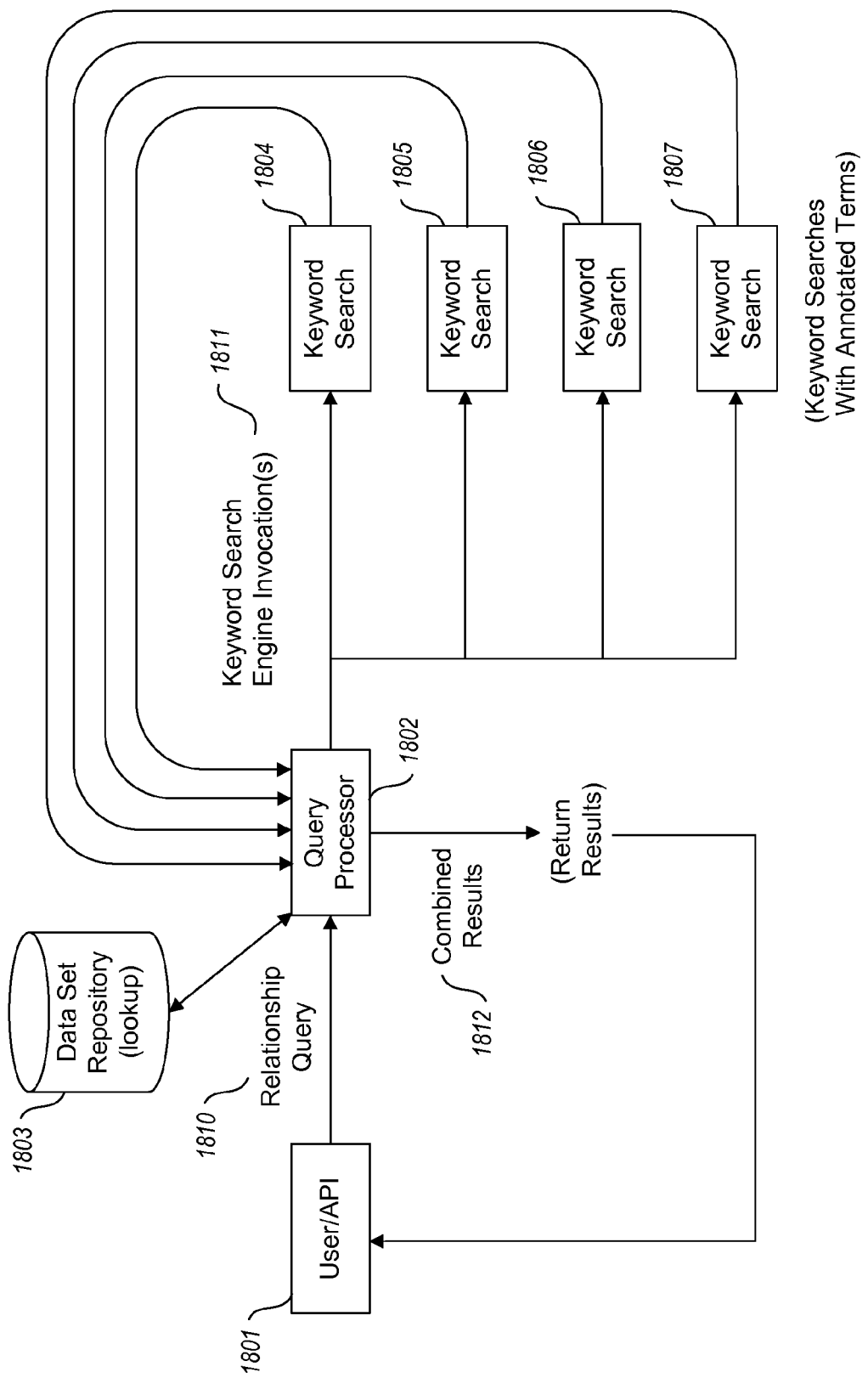
FIG. 18 is a block diagram of query processing performed by an Syntactic Query Engine.

After indexing and storing a data set, the SQE may perform its second function, processing relationship queries against the stored data set. FIG. 18 is a block diagram of query processing performed by an Syntactic Query Engine. A user 1801 (or program through an API) submits a relationship query 1810 to the SQE. The Query Processor 1802 component of the SQE transforms the query into one or more keyword searches 1811 with appropriate syntactic and semantic annotation information included and executes the keyword searches 1811 by invoking one or more keyword search engine processes, for example, keyword search engines 1804-1807. The results of each keyword search 1811 are subsequently returned back to the invoking Query Processor 1802, which then combines the results 1812 as specified in the relationship query 1810 and returns them to the user/program.

Figure 19:
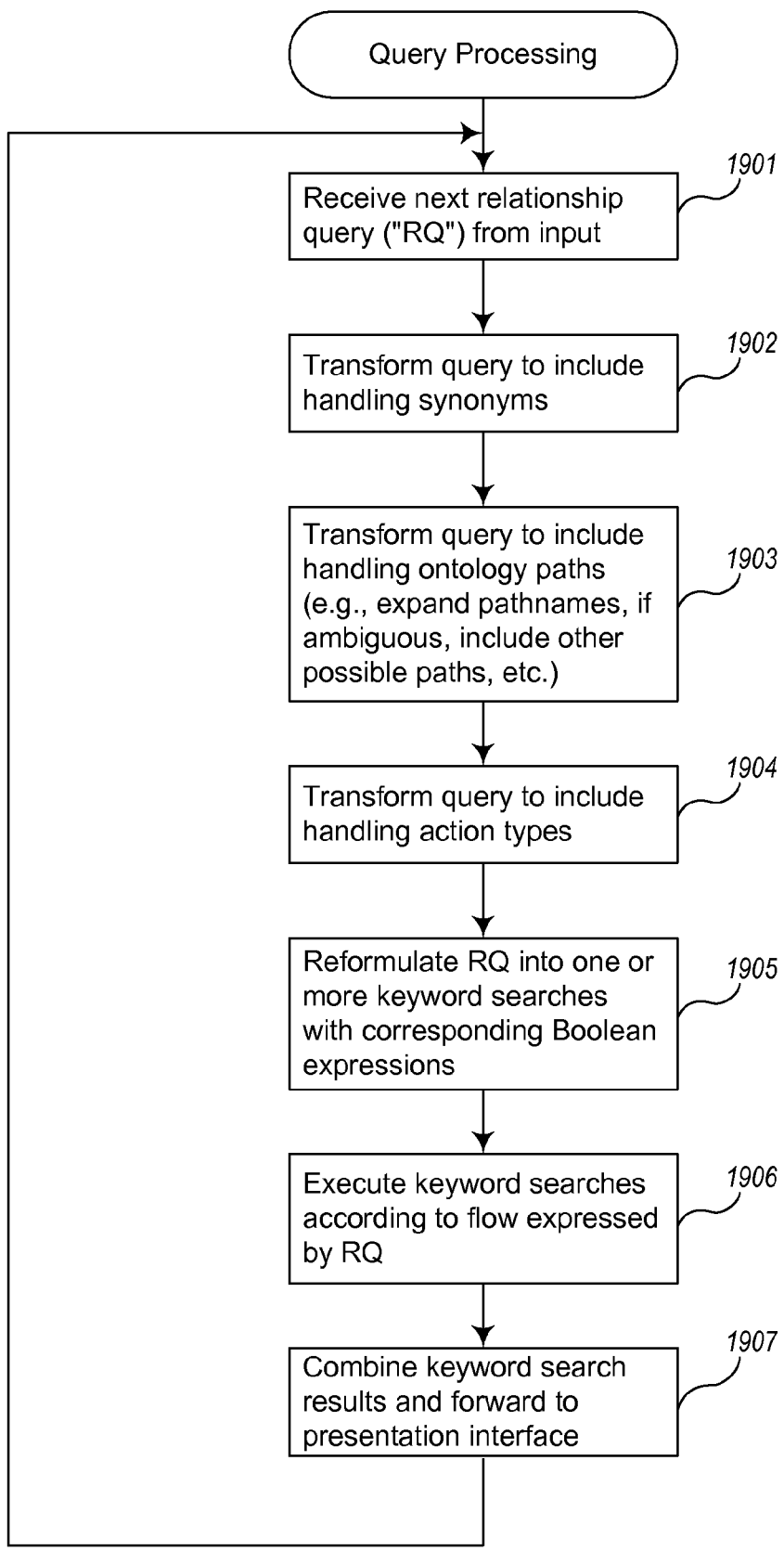
FIG. 19 is an example flow diagram of relationship query processing steps performed by an example Query Processor of Syntactic Query Engine.

FIG. 19 is an example flow diagram of relationship query processing steps performed by an example query processor of Syntactic Query Engine. The query processor executes one or more of steps example 1901-1907 for each query that is forwarded from the user interface/API support modules. One skilled in the art will recognize that the precise behaviors of each step depend upon the heuristics and other rules that are encoded, the preferences set for search parameters, and the way the normalized data is actually stored in the term-clause, term-sentence, and term-document indexes. In step 1901, the query processor receives a relationship query. Recall that the relationship query of the example syntax described above specifies a syntactic search portion (which may be empty), prepositional constraints, document level keyword filters, and meta-data filters. Also, it is possible to specify values for any one of the relationship query components without the others. Depending upon the implementation, the query processor may include a relationship query interpreter or parser (not shown) to parse the received query into its constituent parts and to produce some form of code (internally specified, using a standard programming language, or otherwise) that controls the flow of the keyword searches that are invoked and the combining of the results. This approach is especially useful with a syntax as described that follows a prescribed grammar.

The relationship query is than transformed as necessary in example steps 1902-1907 in accordance with the implementation.

In step 1902, the query is transformed to handle synonyms of any specified subjects and/or objects. In one embodiment, synonyms are handled by searching the ontology structure for synonyms of a specified term, and, if they are present, adding keyword searches for each synonym found. In an alternative embodiment, terms having synonyms are mapped (e.g., at SQE configuration time) to a common indicator, such as a "concept identifier" (concept ID). During ingestion, terms are looked up in the map to determine whether they have corresponding synonyms (hence concept IDs), and, if so, the concept IDs are stored as part of the indexing information. Upon receiving a query, a look up is performed to find a corresponding concept ID (if one exists) to a received term. The query is then transformed so that the resultant keyword searches contain the corresponding concept ID as appropriate. One skilled in the art will recognize that, using either mechanism (or any other implementation), the formatting of the invoked keyword searches needs to correspond to the way the data has been indexed.

In step 1903, the query processor transforms the query to handle ontology path specifications or "types" if provided in the received query string. For example, a relationship query may provide a subject and/or object list as [entity] or [person] or [location/country], etc., which is interpreted as a type of node in an ontology hierarchy. The amount of the pathname that is specified is matched to the ontology. Thus, the entity specification "[location/country]" is matched to any ontology path containing that sub-path. Keyword searches are thus specified for each of the matching ontology paths. Similarly, heuristics may be applied that include as additional keyword searches also searches for related terms, such as hypernyms and hyponyms (more generic and more specific classification terms, respectively), if not already accounted for using available synonym logic.

In step 1904, the query processor transforms the query to handle action types (types of verbs) if specified in the relationship query. For example, a query that specifies "president < >[communication]" instructs the SQE to find all relationships that involve a president doing something by any verb that is considered to be a communication verb. Like the implementations for synonyms described above, the query processor can handle this by including additional keyword searches for each verb of that action type, or can use some kind of verb concept identifier. Again, the query processor needs to match whatever form the indexed data is stored.

In step 1905, based upon the additional transformations from steps 1902-1904, the query processor reformulates the relationship query into one or more keyword searches that can be executed by a keyword search engine. In step 1906, the one or more keyword searches are accordingly invoked and executed. If the enhanced document index is stored as one data structure, then it is possible to execute one keyword search. Alternatively, if the indexed data is actually split between several matrices, then a keyword search is executed on each index as appropriate. For example, searches for matching "keywords" as subjects (or modifiers of subjects) are executed on the subject term-clause index. In step 1907, the results of the keyword searches are combined as expressed in the flow of control logic parsed from the relationship query, and then forwarded to an interface for presentation to the user or program that invoked the relationship query. The query processor then returns to the beginning of the loop in step 1901.

The functions of data set processing (data object ingestion) and relationship query processing can be practiced in any number of centralized and/or distributed configurations of client—server systems. Parallel processing techniques can be applied in performing indexing and query processing to substantial increase throughput and responsiveness. Representative configurations and architectures are described below with respect to FIGS. 20-25; however, one skilled in the art will recognize that a variety of other configurations could equivalently perform the functions and capabilities identified herein.

Figure 20:
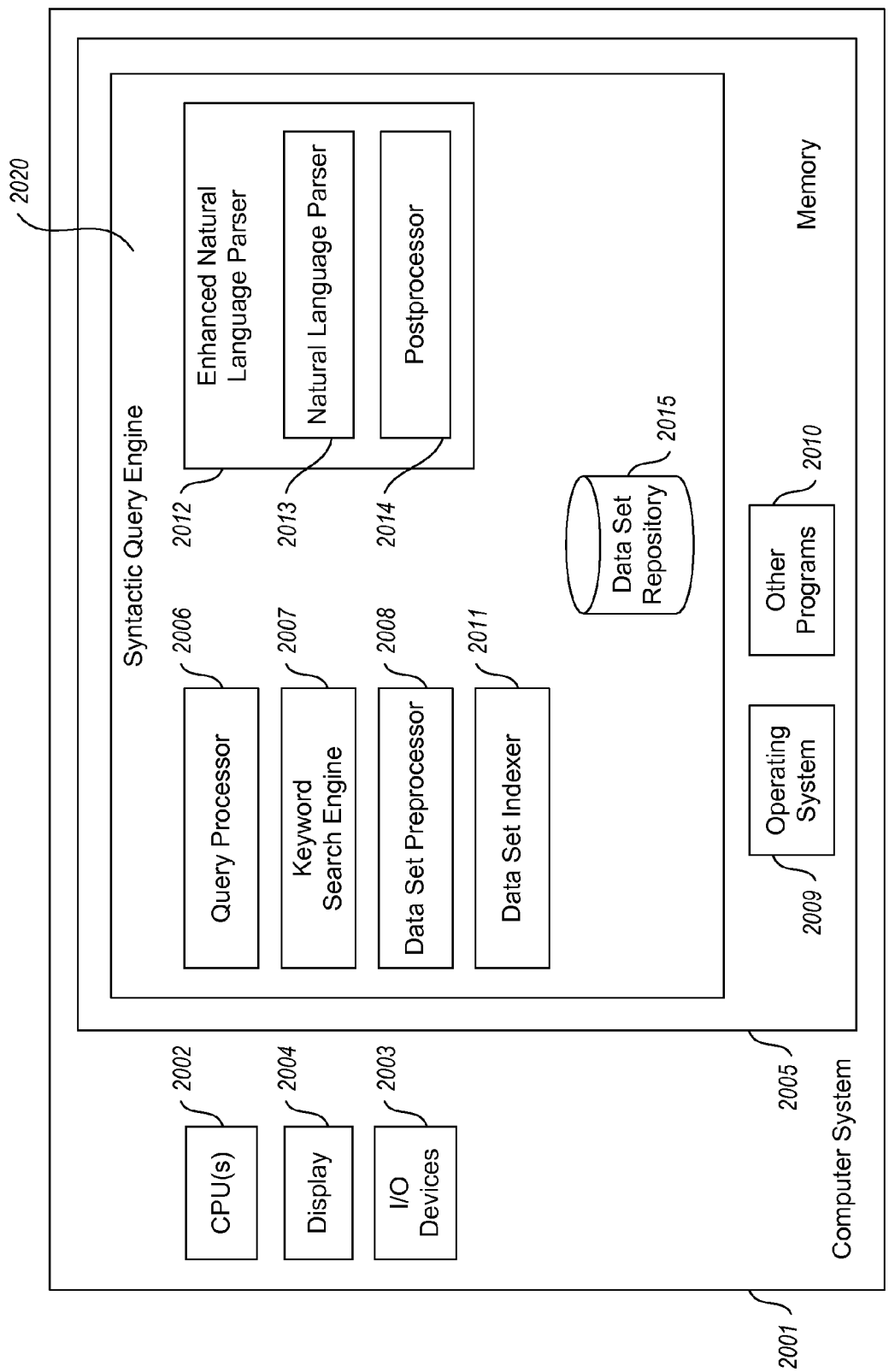
FIG. 20 is an example block diagram of a general purpose computer system for practicing embodiments of a Syntactic Query Engine.

FIG. 20 is an example block diagram of a general purpose computer system for practicing embodiments of a Syntactic Query Engine. The computer system 2001 contains one or more central processing units (CPUs) 2002, Input/Output devices 2003, a display device 2004, and a computer memory (memory) 2005. The Syntactic Query Engine 2020, including the Query Processor 2006, Keyword Search Engine 2007, Data Set Preprocessor 2008, Data Set Indexer 2011, Enhanced Natural Language Parser 2012, and data set repository 2015, preferably resides in memory 2005, with the operating system 2009 and other programs 2010 and executes on the one or more CPUs 2002. One skilled in the art will recognize that the SQE may be implemented using various configurations. For example, the data set repository may be implemented as one or more data repositories stored on one or more local or remote data storage devices. Furthermore, the various components comprising the SQE may be distributed across one or more computer systems including handheld devices, for example, cell phones or PDAs. Additionally, the components of the SQE may be combined differently in one or more different modules. The SQE may also be implemented across a network, for example, the Internet or may be embedded in another device.

Figure 21:
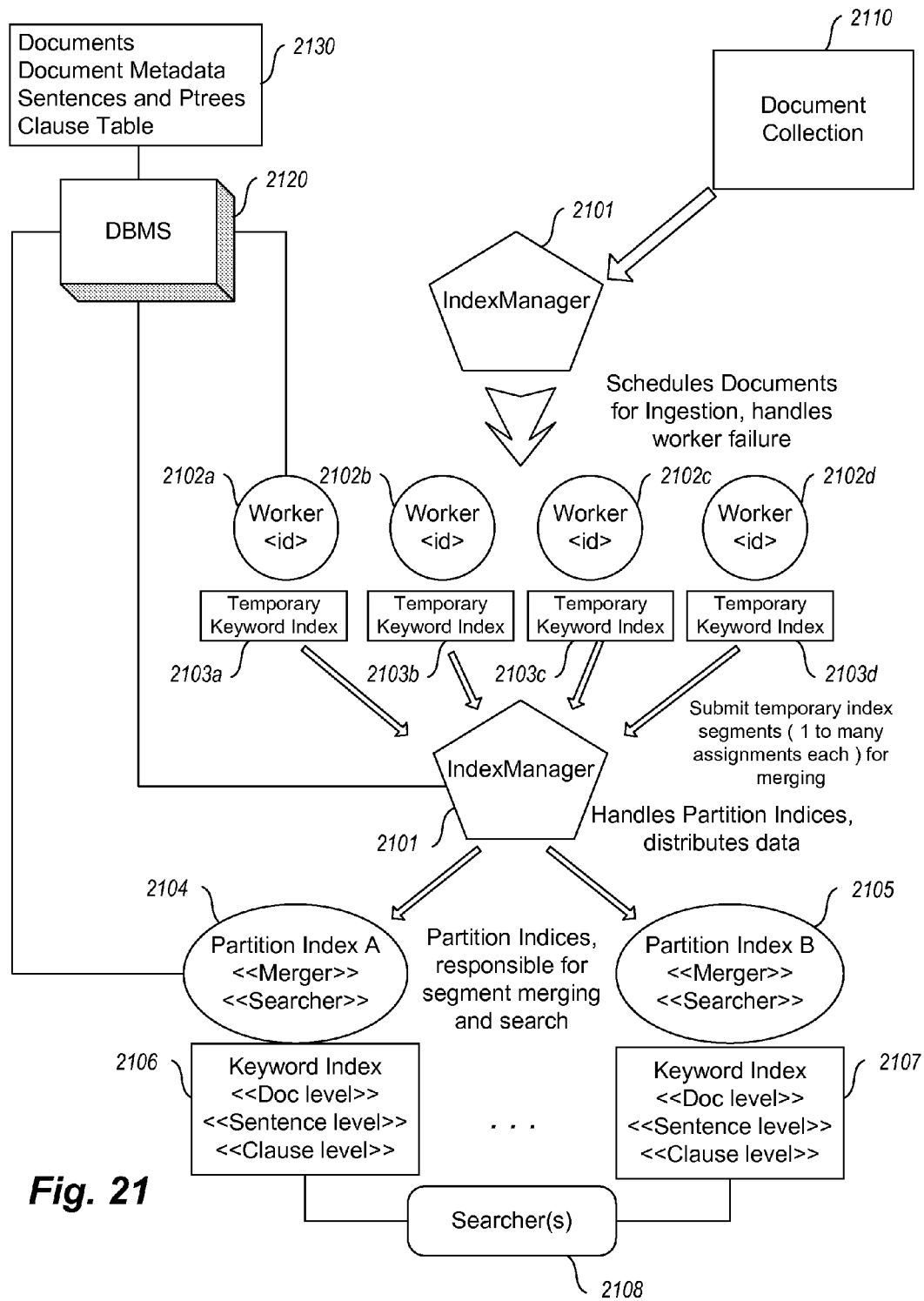
FIG. 21 is an example block diagram of a distributed architecture for practicing embodiments of a Syntactic Query Engine.

FIG. 21 is an example block diagram of a distributed architecture for practicing embodiments of a Syntactic Query Engine. This architecture supports parallel processing of the indexing (ingestion) of each document as well as parallel query processing. The basic organization involves storing a portion of each (term-clause, sentence, and document) index on multiple machines (e.g., servers), with potentially multiple CPUs, in order to achieve greater throughput and accommodate the extensive storage requirements of a very large corpus. For example, typically a large corpus will easily exceed the CPU and storage limits of a single server machine. Moreover, to provide commercially viable search solutions, the SQE needs to respond to queries in a timely fashion. Thus, the number of servers and CPUs is typically determined by the expected size of the data set and the desired query response time, and is typically set up during SQE configuration.

The unit of organization used to support indexing and searching is termed a "partition." Thus, an enhanced document index (labeled here as a "keyword index") comprises typically a plurality of "partition indexes," each of which stores some portion of the total keyword index. To perform a search on the entire corpus, then, it is necessary to search each of the partition indexes (with the same keyword search string) and thereafter to combine the results as if the search were performed on a single index. Note that the keyword index may be partitioned according to a variety of schemes, including, for example, a percentage of the index based upon the size of the documents indexed, documents that somehow related together by concept or other classification, schemes based upon storing portions of the index based upon a type supported by the ontology, etc. Any such scheme may be implemented by the servers and may be optimized for the application for which the SQE is being deployed.

A variety of servers and services are employed to process the ingestion and searching on the backend so as to present a unified view of the term-clause, sentence, and document indexes. FIG. 21 presents one such embodiment, although one skilled in the art will recognize that a variety of other organizations and components can equivalently support and provide the functions and techniques of the SQE. In FIG. 21, an index manager 2101 schedules document ingestion for a collection of document 2110 between a plurality of workers 2102a-2102d, each responsible for indexing a portion of the corpus. The work could be divided at a variety of levels including by document, by sentence, etc., and allows the ingestion workload to be processed in parallel, thus decreasing the amount of time required to ingest a corpus. Each worker 2102a-2102d contains an instance of the SQE data set processing components (and others if necessary), including the preprocessor and an instance of the ENLP. Upon parsing a sentence and annotating it with syntactic and semantic tags, the worker 2102a-2102d creates a corresponding temporary keyword index 2103a-2103d, which represents the portion of the corpus that it has processed until stored in the partition indexes 2104-2105. The index manager 2101 is responsible for distributing the temporary keyword indexes 2103a-2103d to the partition indexes 2104 and 2105 to be merged into their respective keyword indexes 2106 and 2107. Note that the index manager 2101 and the workers 2102a-2102d may in some embodiments utilize an additional data base management system 2120 to store recovery information, such as copies of documents, document metadata, sentences, parse trees and a copy of the clause tables, 2130 although this is a convenience and not necessitated by the functions of the SQE.

Figure 22:
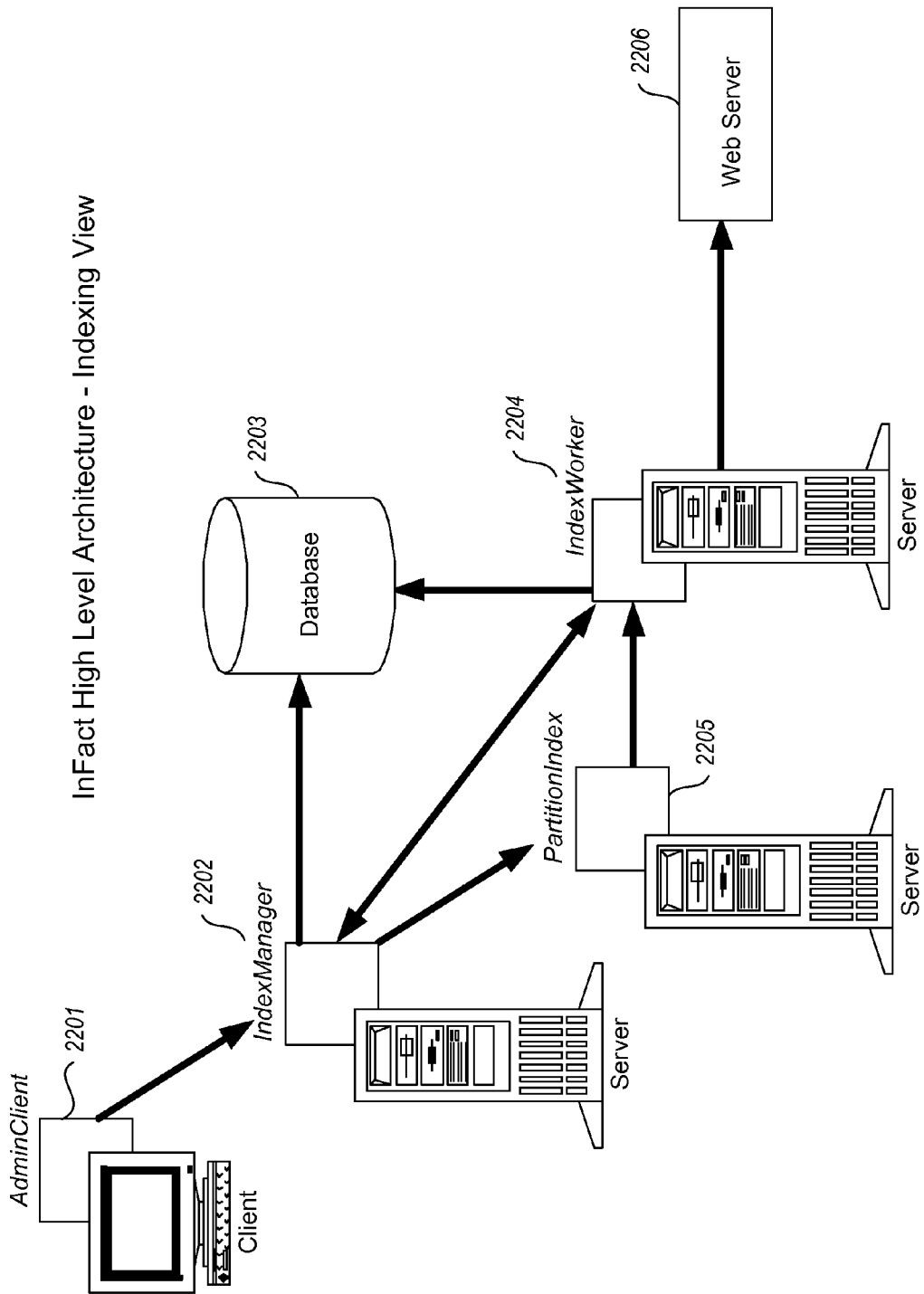
FIG. 22 is a block diagram overview of parallel processing architecture that supports indexing a corpus of documents.

FIG. 22 is a block diagram overview of parallel processing architecture that supports indexing a corpus of documents. This figure shows one arrangement of servers that can be used to effect the parallel processing architecture of FIG. 21. Specifically, AdminClient 2201 controls invocation of an IndexManager (server) 2202 which stores working and recovery information in a database 2203 (if part of a particular implementation) and distributes indexing work to one or more IndexWorkers (servers) 2204. When an IndexWorker 2204 completes indexing of an object (document, sentence, etc.), notification is returned to the IndexWorker 2202, which at appropriate times instructs a corresponding Partitionindex (server) 2205 to store the indexing information in the appropriate clause, sentence, and document indexes. Each IndexWorker 2202 may also communicate with a WebServer 2206 to deliver status and error information.

Figure 23:
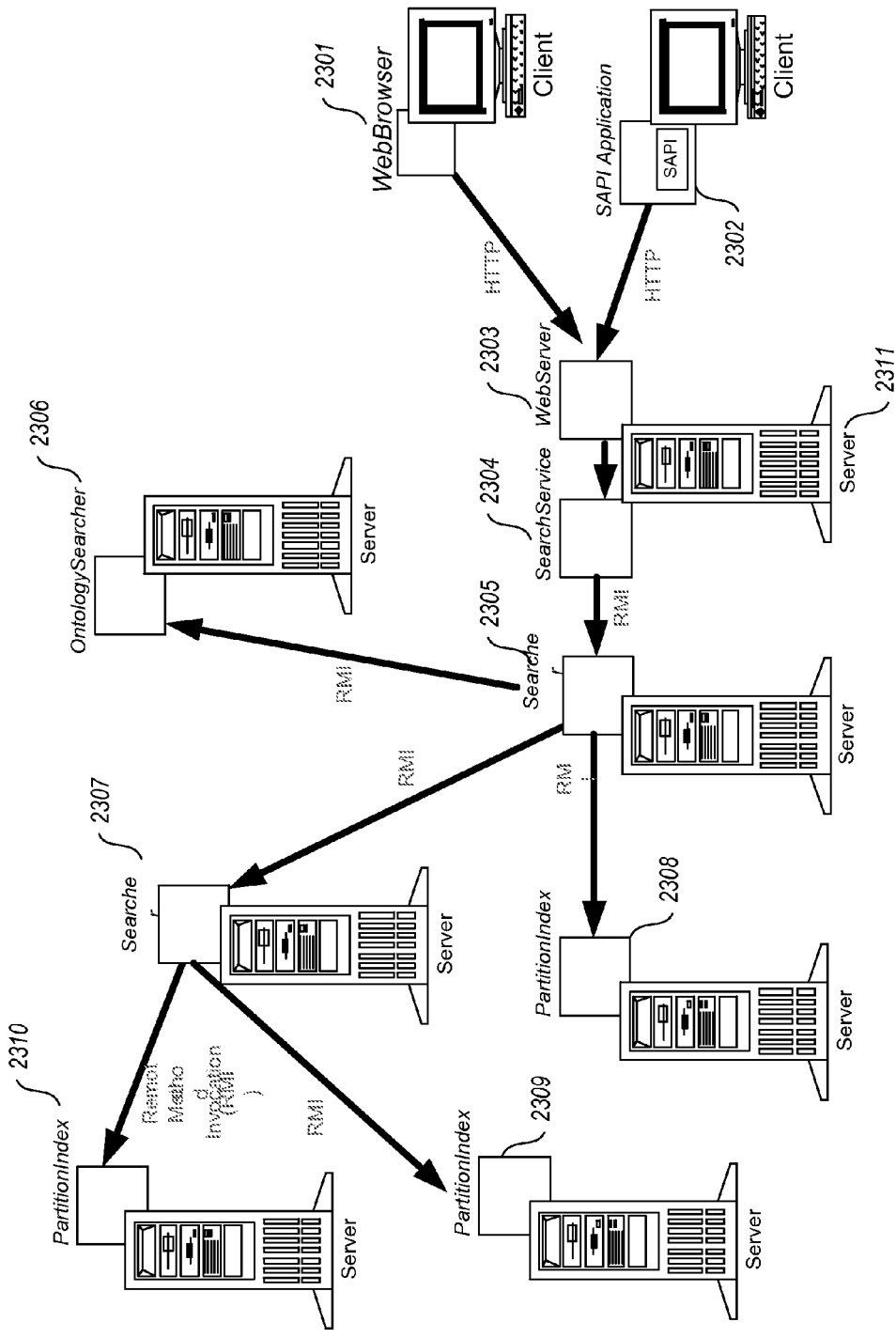
FIG. 23 is a block diagram overview of parallel processing architecture that supports relationship queries.

FIG. 23 is a block diagram overview of parallel processing architecture that supports relationship queries. The partition indexes, such as Partition Index A 2104 and Partition Index B 2105 (in FIG. 21), may be arranged in a hierarchy of searcher (servers), and more than one partition index may be managed by a single searcher. Typically, it is advised to have a separate partition index for each CPU present in a server machine to take advantage of inherent parallel processing opportunities in a multiple CPU/parallel processor, machine; however, other arrangements are also possible. In FIG. 23, a user such as a researcher using a web browser user interface 2301 or an application using the SQE APIL 2302 issues a relationship query to the SQE as described in detail in the other figures via some supported communications protocol, such as HTTP. (Note also that a server side application that resides on the search service server 2311 could also issue a direct request to the search service 2304.) WebServer 2303 receives the relationship query and issues appropriate search requests to the SearchService 2304. Note that depending upon the particular implementation, the various functional components described by FIG. 12 and multiple instances of the same components could reside upon one or more of these servers. The query is preferably organized into a plurality of keyword and ontology searches that are distributed to be processed in parallel and then combined before returning a result to the WebServer 2303. (The returned result flow is not shown.) Thus, search service 2304 invokes a "top" level search 2305 which is responsible for conducting the parallel searches to effectuate a search of the entire keyword index. Searcher 2305 is shown communicating via a remote method invocation protocol to a single partition index server 2308. Searcher 2305 instructs (sub)searcher 2307 to also perform part of the search. Searcher 2307 is shown communicating with two partition indexes, 2309 and 2310. The searcher 2305 also communicates with a (possibly hierarchy of) ontology searchers 2306 as needed to search for pathnames in the ontology (and for browsing the ontology as supported by other aspects of an example SQE user interface).

Figure 24:
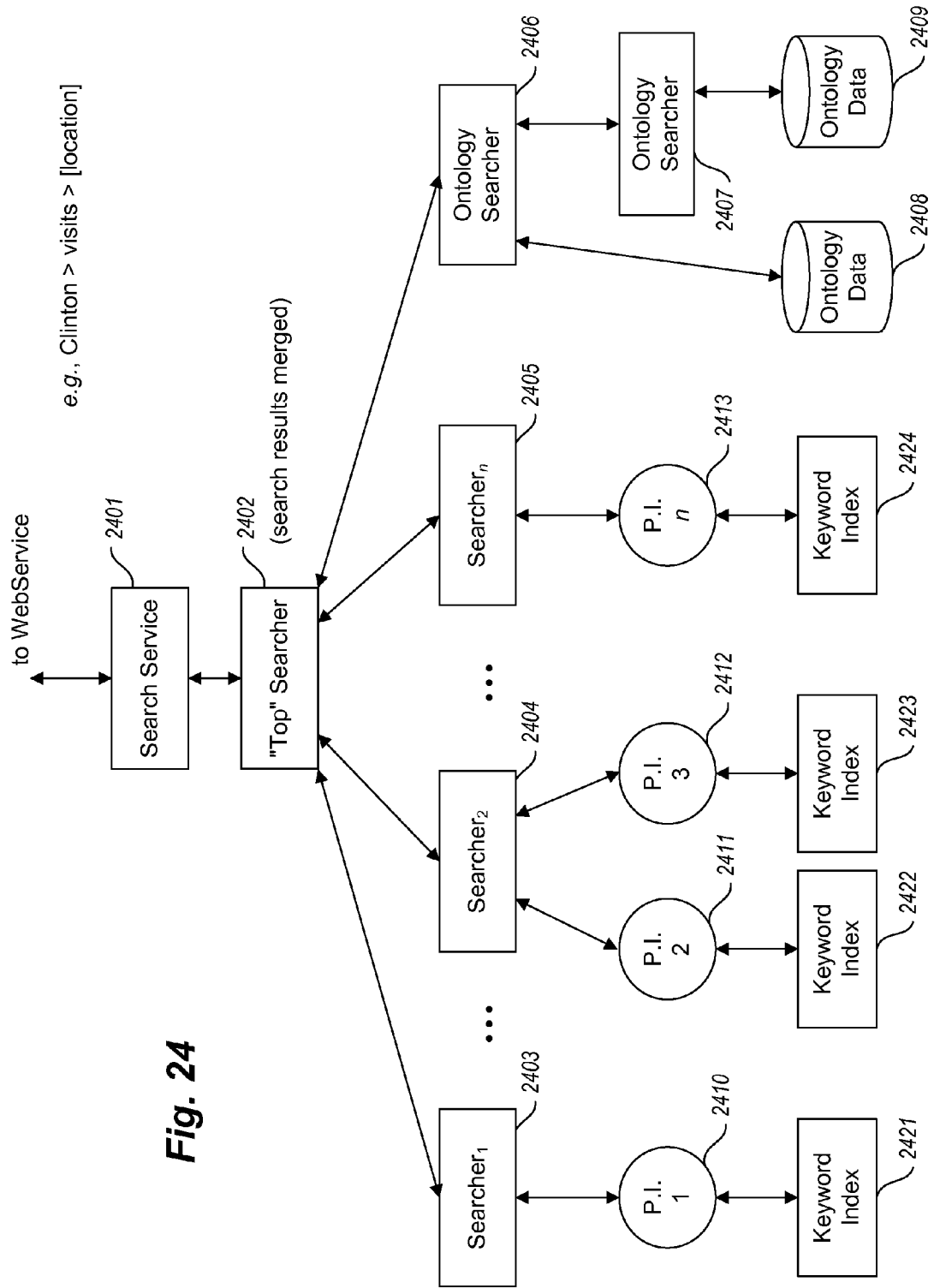
FIG. 24 is an example block diagram that shows parallel searching of an enhanced document index.

FIG. 24 is an example block diagram that shows parallel searching of an enhanced document index. In FIG. 24, a search service 2401 receives a search and distributes the requested relationship search to a top level searcher 2402. The top level searcher 2402 then, in parallel, invokes the same relationship search on a plurality of searchers 2403-2405, depending upon the organization of the partition indexes and whether it is required to search all of them for a particular relationship query. For example, if the partition indexes are organized such that a percentage of the corpus is indexed on each (not by entity type or some other organization), then all of the partition indexes are searched in parallel. Searcher 2403 performs the relationship search on partition index 2410, searcher 2404 performs the relationship search on partition indexes 2422 and 2423, up through searcher 2405 performs the relationship search on partition index 2424. Also, if an ontology search (for synonyms, pathnames, etc.) is required, then the top searcher 2402 invokes a top level ontology searcher 2406 to perform (in parallel as required) an ontology search using one or more ontology searchers such as searcher 2407 to search one or more ontology data repositories 2408 and 2409.

Figure 25:
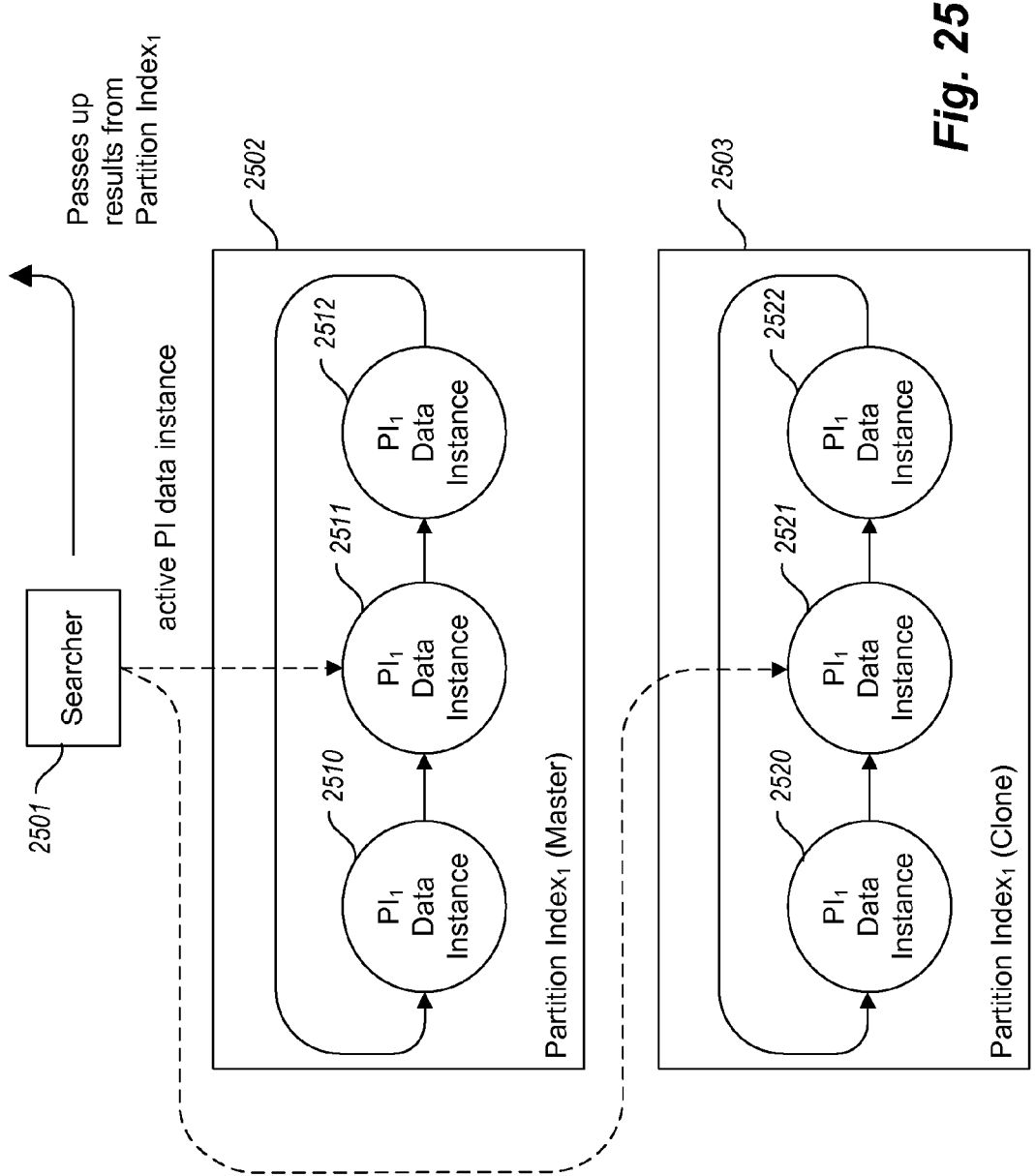
FIG. 25 is an example block diagram of an architecture of the partition indexes that supports incremental updates and data redundancy.

As mentioned, it is sometimes desirable to support the indexing of additional corpus information even when the corpus is being searched. This provides the ability to support incremental indexing of data. It is also sometimes desirable to provide fault tolerance, especially in mission critical applications. FIG. 25 is an example block diagram of an architecture of the partition indexes that supports incremental updates and data redundancy. The underlying organization involves maintaining several data instances of the partition index, only one of which is "active" for searching at any one time and maintaining a redundant copy of the data instances that comprise the partition index. The "active" partition index data instance provides the view of the data that the initiator of a query believes is current. To update a partition index, the searcher redirects the indicator of the active partition index data instance to a different data instance. In FIG. 25, the searcher 2501 maintains a master partition index 2502 and a clone partition index 1203, which is a replica of the master partition index. Each of the partition indexes 2502 and 2503 in turn maintain a plurality of data instances, for example data instances 2510-2512 and 2520-2522. In the diagram, partition index data instance 2511 is indicated as the "active" partition index data instance. While instance 2511 is active, the searcher 2501 can update other data instances 2510 and 2512 thus providing another type of parallelism. Since clone partition index 2503 is a replica of the master partition index 2502, the data instances 2520-2522 are replicas of the information and state of data instance 2510-2512. One skilled in the art will recognize that there are other ways to provide incremental updating and that FIG. 25 illustrates one of them.

Figure 26:
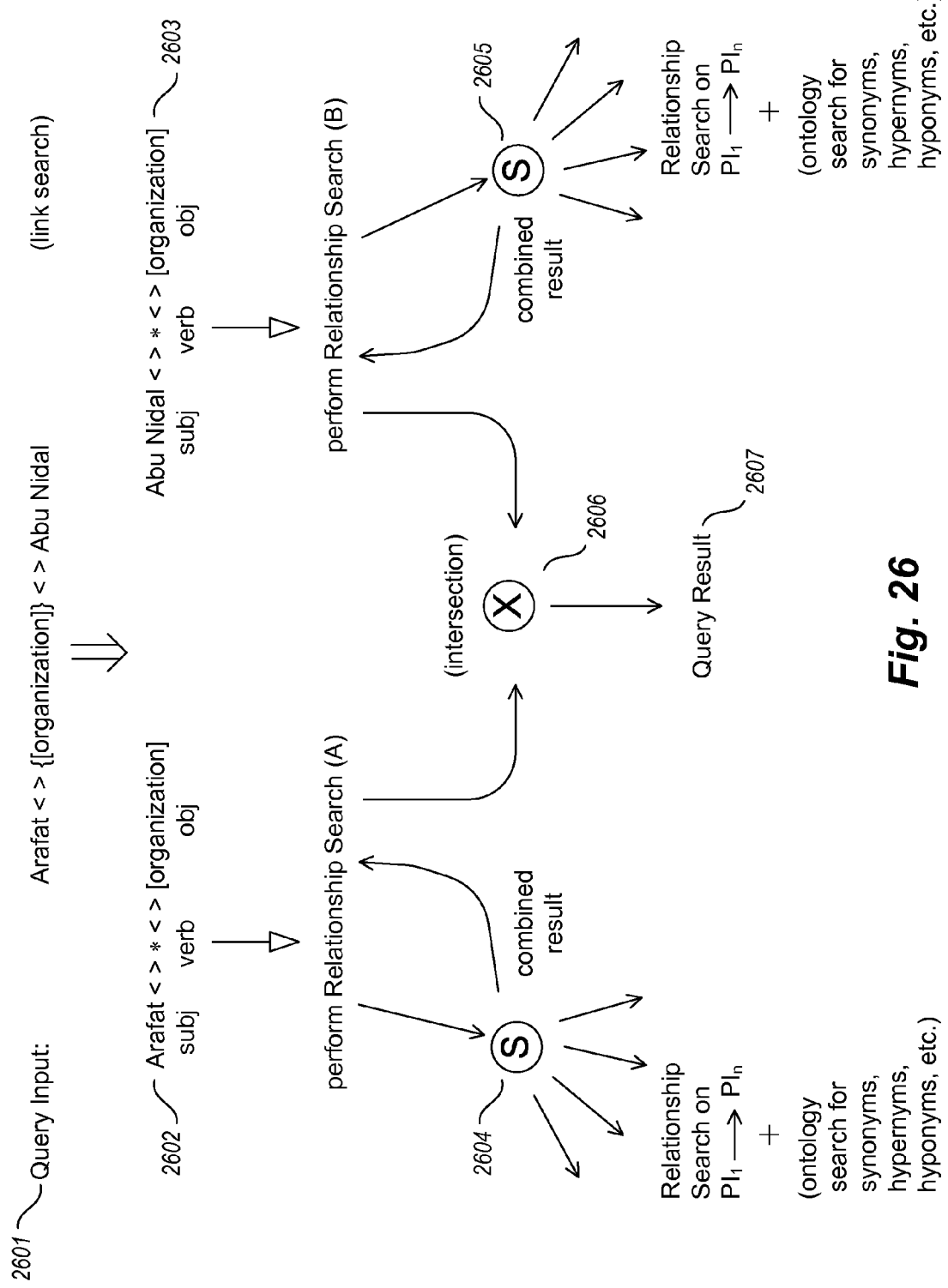
FIG. 26 is an example conceptual diagram of the transformation of a relationship search into component portions that are executed using a parallel architecture.

The architectures described (and others) can be used to support the indexing and searching functions of an example SQE. FIG. 26 is an example conceptual diagram of the transformation of a relationship search into component portions that are executed using a parallel architecture. In the example illustrated, the relationship query 2601 is a link search, however one skilled in the art will recognize that the technique described can be applied and extended to a variety of searches including a plurality of relationship searches that are combined by a scripting language or other means of controlling flow. The query being processed:

Arafat < >{[organization]}< >Abu Nidal

Instructs the SQE to find all relationship where there is a $3^{rd}$ entity that is an organization linking Arafat and Abu Nidal. In this case, the SQE transforms the query into two syntactic sub-searches 2602 and 2603:

Arafat < >*< >[organization]

which will locate all organizations with which Arafat has any kind of relationship; and Abu Nidal < >*< >[organization]

which will locate all organizations with which Abu Nidal has any kind of relationship. Each of these syntactic searches 2602 and 2603 are executed using, for example, the parallel architecture described with reference to FIGS. 22-25. The syntactic search 2602 is distributed to a top searcher 2604 to perform one or more syntactic searches on the partition indexes that make up the corpus and one or more ontology searches as required. Note that as part of this process, the various searchers invoke one or more keyword search engines to perform the actual keyword search on the annotated indexes. Similarly, the syntactic search 2603 is distributed to a top searcher 2605 to perform one or more syntactic searches on the partition indexes that make up the corpus and one or more ontology searches as required. Again, keyword search engines are invoked as part of this process. Once results from the sub-searches are determined, the query processor, for example, one residing in a search service (such as search service 2401 in FIG. 24) determines based upon the initial query 2601 how to combine the results. In the example described, the intersection of the resulting clauses provides the overall query result 2607 desired. One skilled in the art will recognize that similar combinations of sub-searches can be accommodated. Those that indicated a desired intersection (as from a Boolean AND operation) are easily specified. However, to support other types of control flow operations, such as those that require a union of the resultant data, needs to be defined as to what aspects are desired to be combined especially if the sub-searches yield different types of results.

Figure 27:
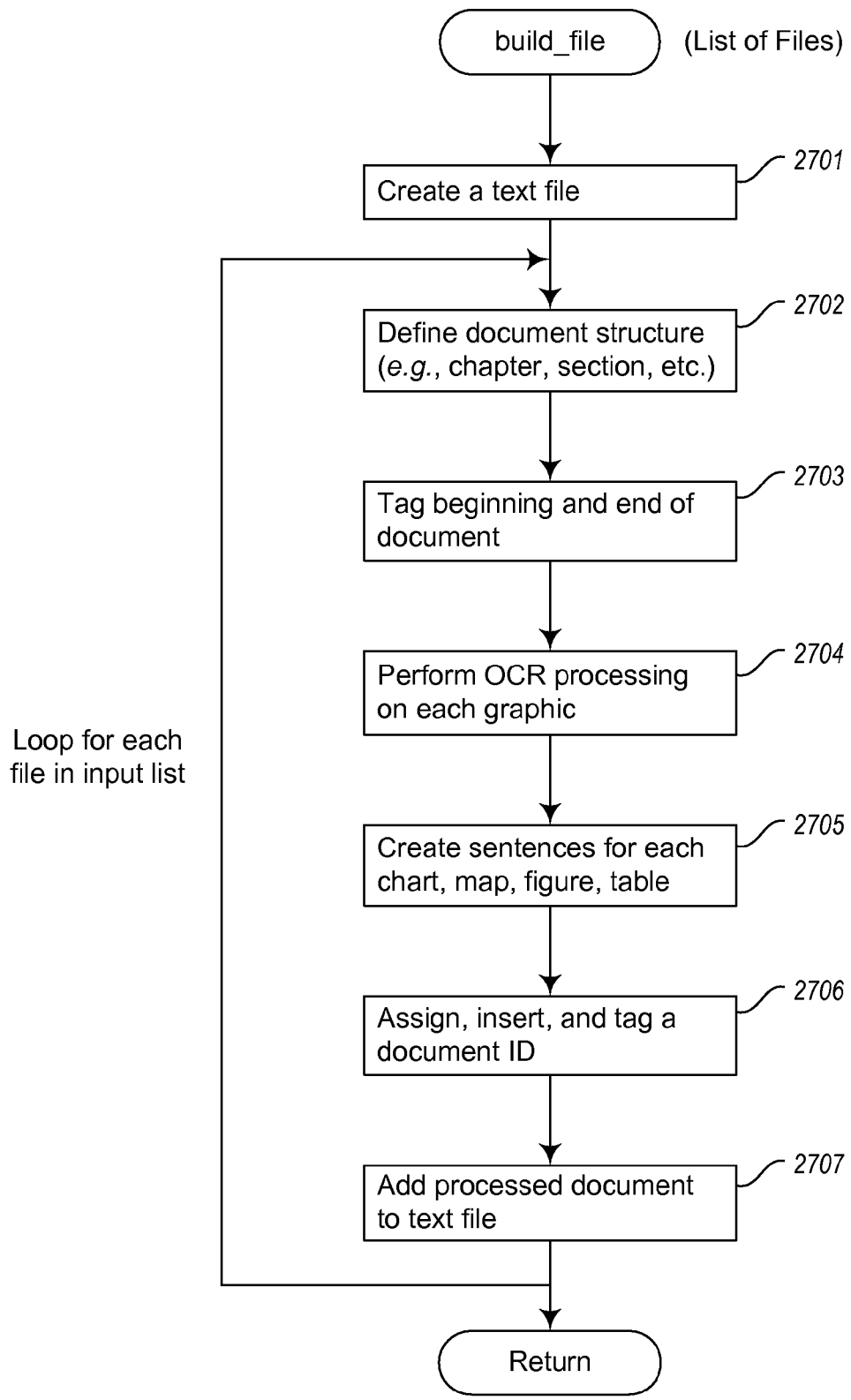
FIG. 27 is an example flow diagram of the steps performed by a build_file routine within the Data Set Preprocessor component of a Syntactic Query Engine.
Figure 28:
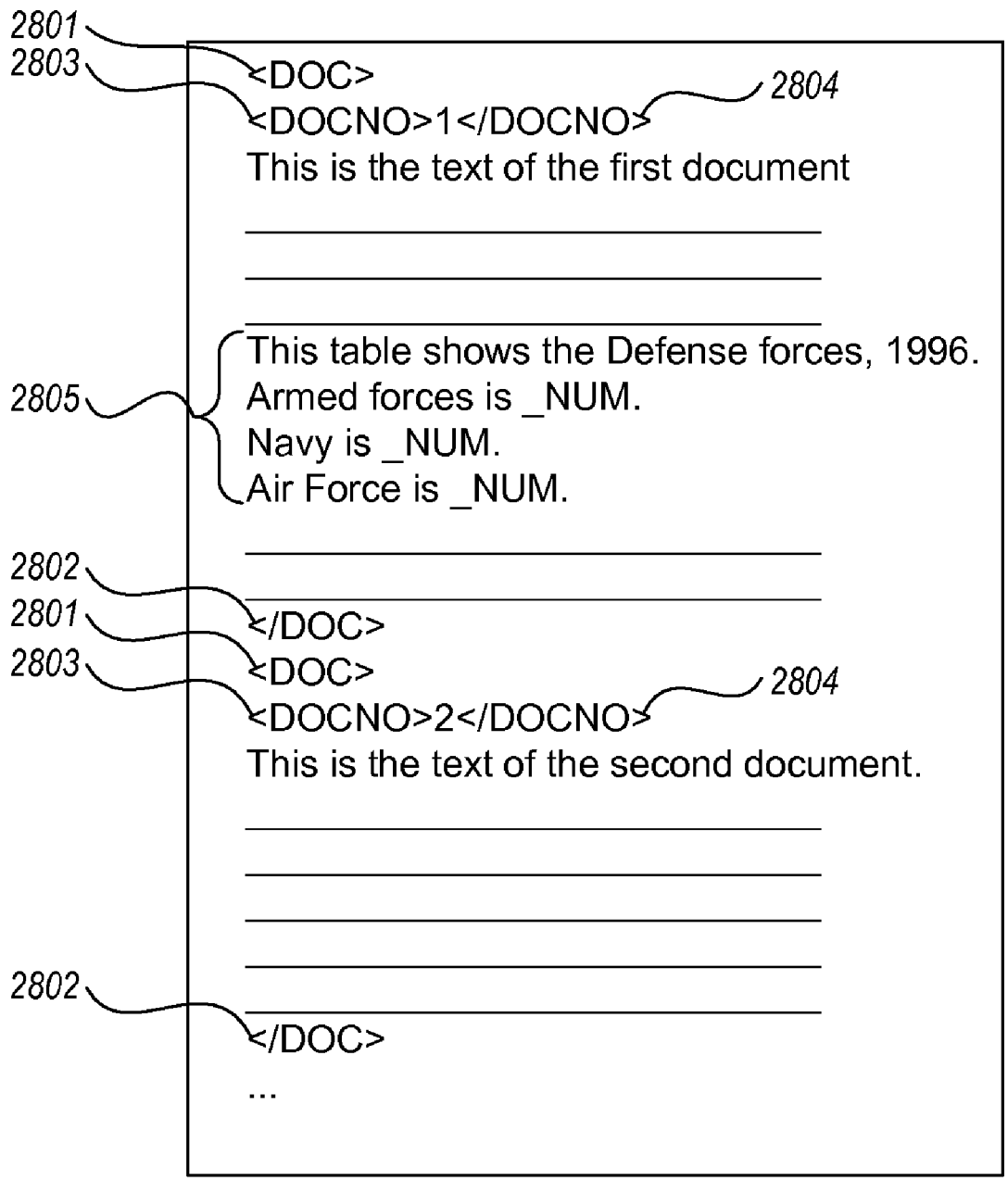
FIG. 28 illustrates an example format of a tagged file built by the build_file routine of the Data Set Preprocessor component of a Syntactic Query Engine.
Figure 29:
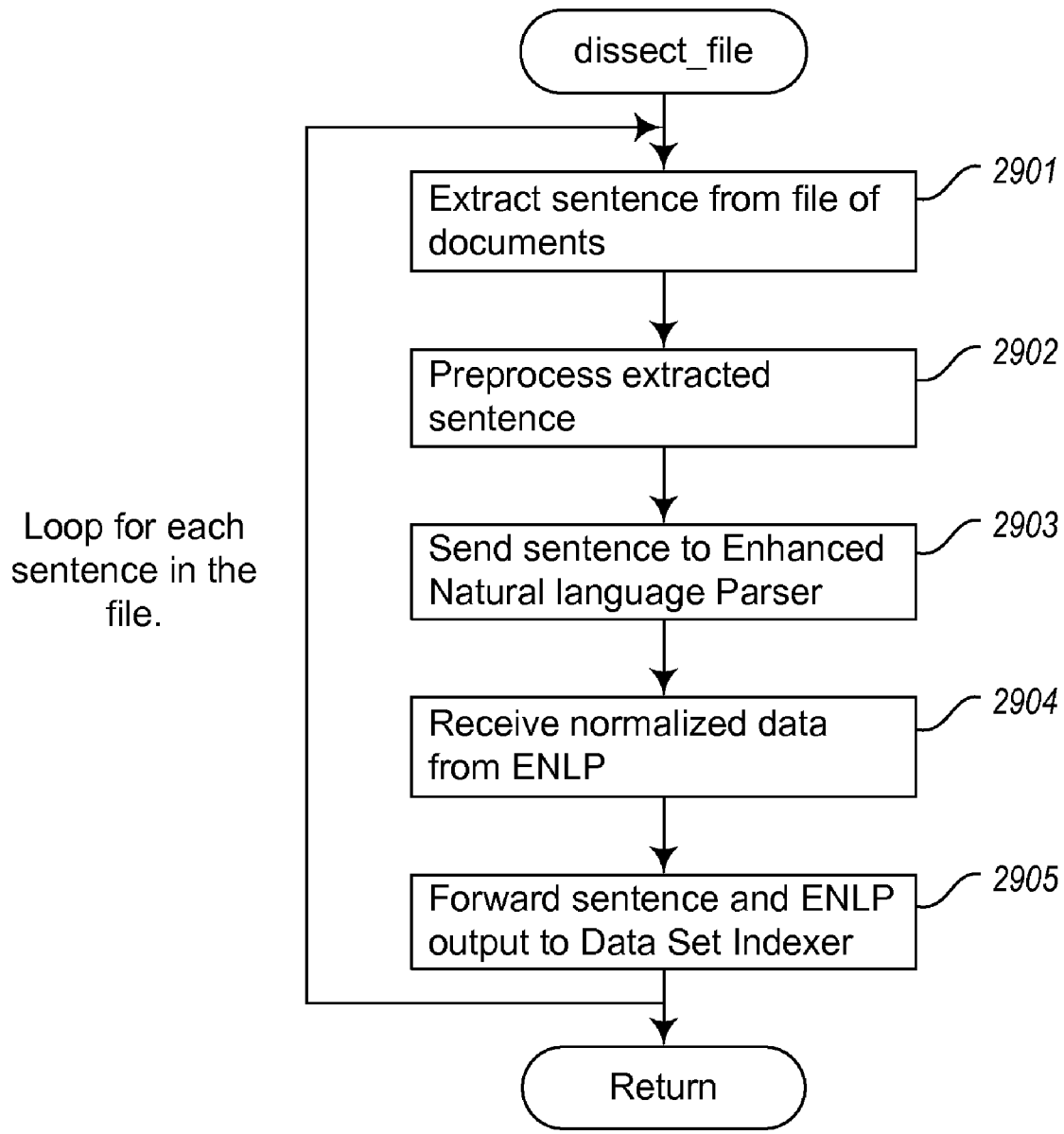
FIG. 29 is an example flow diagram of the steps performed by the dissect_file routine of the Data Set Preprocessor component of a Syntactic Query Engine.

The architectures illustrated (and others) can also support the preprocessing and data storage functions of an example SQE. As described with reference to FIG. 17, the Data Set Preprocessor 1702 performs two overall functions—building one or more tagged files from the received data set files and dissecting the data set into individual objects, for example, sentences. These functions are described in detail below with respect to FIGS. 27-29. Although FIGS. 27-29 present a particular ordering of steps and are oriented to a data set of objects comprising documents, one skilled in the art will recognize that these flow diagrams, as well as all others described herein, are examples of one embodiment. Other sequences, orderings and groupings of steps, and other steps that achieve similar functions, are equivalent to and contemplated by the methods and systems of the present invention. These include steps and ordering modifications oriented toward non-textual objects in a data set, such as audio or video objects.

FIG. 27 is an example flow diagram of the steps performed by a build_file routine within the Data Set Preprocessor component of a Syntactic Query Engine. The build_file routine generates text for any non-textual entities within the dataset, identifies document structures (e.g., chapters or sections in a book), and generates one or more tagged files for the data set. In one embodiment, the build_file routine generates one tagged file containing the entire data set. In alternate embodiments, multiple files may be generated, for example, one file for each object (e.g., document) in the data set. In step 2701, the build_file routine creates a text file. In step 2702, the build_file routine determines the structure of the individual elements that make up the data set. This structure can be previously determined, for example, by a system administrator and indicated within the data set using, for example, HTML tags. For example, if the data set is a book, the defined structure may identify each section or chapter of the book. These HTML tags can be used to define document level attributes for each document in the data set. In step 2703, the build_file routine tags the beginning and end of each document (or section, as defined by the structure of the data set). In step 2704, the routine performs OCR processing on any images so that it can create searchable text (lexical units) associated with each image. In step 2705, the build_file routine creates one or more sentences for each chart, map, figure, table, or other non-textual entity. For example, for a map of China, the routine may insert a sentence of the form, This is a map of China.

In step 2706, the build_file routine generates an object identifier (e.g., (a Document ID) and inserts a tag with the generated identifier. In step 2707, the build_file routine writes the processed document to the created text file. Steps 2702 through 2707 are repeated for each file that is submitted as part of the data set. When there are no more files to process, the build_file routine returns.

FIG. 28 illustrates an example format of a tagged file built by the build_file routine of the Data Set Preprocessor component of a Syntactic Query Engine. The beginning and end of each document in the file is marked, respectively, with a <DOC> tag 2801 and a </DOC> tag 2802. The build_file routine generates a Document ID for each document in the file. The Document ID is marked by and between a <DOCNO> tag 2803 and a </DOCNO> tag 2804. Table section 2805 shows example sentences created by the build_file routine to represent lexical units for a table embedded within the document. The first sentence for Table 2805, This table shows the Defense forces, 1996, is generated from the title of the actual table in the document. The remaining sentences shown in Table 2805, are generated from the rows in the actual table in the document. One skilled in the art will recognize that various processes and techniques may be used to identify documents within the data set and to identify entities (e.g., tables) within each document. The use of equivalent and/or alternative processes and markup techniques and formats, including HTML, XML, and SGML and non-tagged techniques are contemplated and may be incorporated in methods and systems of the present invention.

The second function performed by the Data Set Preprocessor component of the SQE is dissecting the data set into individual objects (e.g., sentences) to be processed. FIG. 29 is an example flow diagram of the steps performed by the dissect_file routine of the Data Set Preprocessor component of a Syntactic Query Engine. In step 2901, the routine extracts a sentence from the tagged text file containing the data set. In step 2902, the dissect_file routine preprocesses the extracted sentence, preparing the sentence for parsing. The preprocessing step may comprise any functions necessary to prepare a sentence according to the requirements of the natural language parser component of the ENLP. These functions may include, for example, spell checking, removing excessive white space, removing extraneous punctuation, and/or converting terms to lowercase, uppercase, or proper case. One skilled in the art will recognize that any preprocessing performed to put a sentence into a form that is acceptable to the natural language parser can be used with techniques of the present invention. In step 2903, the routine sends the preprocessed sentence to the ENLP. In step 2904, the routine receives as output from the ENLP a normalized data representation of the sentence. In step 2905, the dissect_file routine forwards the original sentence and the normalized data representation to the Data Set Indexer for further processing. Steps 2901-2905 are repeated for each sentence in the file. When no more sentences remain, the dissect_file routine returns.

The Data Set Indexer (e.g., component 1705 in FIG. 17) prepares the normalized data generated from the data set (e.g., as illustrated in FIG. 16) to be indexed and stored in the data set repository. One skilled in the art will recognize that the normalized data can be stored in a variety of ways and data structures, yet still achieve the abstraction of maintaining a term-clause matrix, a term-sentence matrix or a term-document matrix. Any data structure that can be understood by the target keyword search engine being used is operable with the techniques of the present invention. In one embodiment, separate indexes exist for each enhanced document (term-clause, term-sentence, and term-document) matrix. In addition, in some embodiments the term-clause index is further divided into a separate index for each grammatical role, so as to allow more efficient keyword searches. The indexes are cross referenced by an internal identifier, which can be used to decipher a document id, sentence id, or a clause id. The tuple (document id, sentence id, clause id) that uniquely identifies each clause in the document corpus. Other divisions and distributions of the data can be accommodated. Table 1 below conceptually illustrates the information that is maintained in an example term-clause index of the present invention.

TABLE 1

| Field Name | Type | Description |
|---|---|---|
| Id (internal) | Indexed, stored | document id, sentence id, clause id concatenated separated by '_' |
| subject | tokenized, indexed | contains subjects(s), subject modifiers and entity type(s) for subjects and modifiers. The modifiers are preferably separated into prefix and suffix. If subject has entity type, the data indexer also stores t_entity (just once). If any modifier has entity type, the data indexer also stores tm_entity (just once). Noun phrases that were recognized by NL parser are also stored with spaces replaced by '\.' The subject field order is: prefix_subject_mod subject suffix_subject_mod Entity_types NLP_noun_phrases. |
| object | tokenized, indexed | contains objects(s), object modifiers and entity type(s) for objects and modifiers The modifiers are preferably separated into prefix and suffix. If object has entity type, the data indexer stores t_entity (just once). If any modifier has entity type, the data indexer also stores tm_entity (just once). Noun phrases that were recognized by NL parser are also stored with spaces replaced by '\.' The object field order is: prefix_object_mod object suffix_object_mod Entity_types NLP_noun_phrases. |
| pcomp | tokenized, indexed | contains pcomp(s), preposition(s), pcomp modifiers and entity type(s) for pcomp, modifiers. The modifiers are preferably separated into prefix and suffix. If pcomp has entity type, the data indexer also store t_entity (just once). If any modifier has entity type, the data indexer also stores tm_entity (just once). Noun phrases that were recognized by NL parser are also stored with spaces replaced by '\.' The pcomp field order is: preposition pcomp modifiers, pcomp Entity_types NLP_noun_phrases |
| verb | tokenized, indexed | contains verbs(s), verb modifiers and entity type(s) for verbs and modifiers. Noun phrases that were recognized by NL parser are also stored with spaces replaced by '\.' The verb field order is: prefix_verb_mod verb suffix_verb_mod |

TABLE 1-continued

| Field Name | Type | Description |
|---|---|---|
| parent_id | indexed, stored | Entity_types NLP_noun_phrases. clause id(10) |
| clause_rel_sent_class | tokenized, indexed | Contains inter-clause relationships such as: conditional_c causal_c prepositional_c temporal_c and Sentence Attributes such as: question_s definition_s temporal_s numerical_s. |
| relationship | stored | (Encoded clause for display) |

As can be observed from Table 1, a variety of information is indexed to correspond to the term-clause index. "Entity_types" includes whatever types are supported by the ontology. In a default system, several types of entities are supported; however, one skilled in the art will recognize that other categorizations of types could also be supported. Similarly, particular exemplary sentence and inter-clause relationship types are listed, however other classifications are supported as well.

FIG. 30 is an example conceptual block diagram of a sentence that has been indexed and stored in a term-clause index of a Syntactic Query Engine. The example sentence illustrated is "Jane admires sunny Seattle on a busy June 3rd." The id field 3001 is an internal string that can cross-reference to the corresponding clause, sentence, and document. The subject field 3002 includes the term "Jane" (the subject), which has no modifiers, but is a member of two classifications in the ontology: an individual (t_entity/person/any/individual) and a female (t_entity/person/female). The field also stores that the subject has an entity type (indicated as t_entity). The verb field 3003 includes the stemmed form of the verb term "admires" (the verb), followed by a series of suffix modifiers of the verb, which appear also as parts of prepositional phrases in pcomp field 3005. The modifiers (m_on, m_busy, m_June, m_3rd) are stored in the verb field along with the information that at least one of the modifiers has an entity type (indicated by a tm_entity tag) and that the entity type in the modifier list includes a date (tm_entity/temporal/date). As illustrated, the object field 3004 includes the term "Seattle," along with annotations that it has an entity type (t_entity) of city (t_entity/location/city) and has a series of prefix and suffix modifiers (m_sunny, m_on, m_busy, m_June, m_3rd) that have entity types (tm_entity) including a date (tm_entity/temporal/date). The pcomp (prepositional complement) field 3005 includes the terms in the prepositional phrase "on a busy June 3rd" stored with the phrase "June $3^{rd}$" as the prepositional complement and the other terms as modifiers. The phrase is recognized as an entity, hence the pcomp field includes an entity type (t_entity) of date (t_entity/temporal/date). The parent_id field 3006 indicated the clause id of the parent clause in the sentence if there are multiple clauses. The clause_rel_sent_class field 3007 indicates any inter-clause relationships, such as whether the clause is a conditional phrase, and any sentence attributes such as an annotation that the sentence is, as in this case, a temporal statement. Such classifications enable keyword searching based upon classifications of sentences as well as other syntactic and semantic tags. The relationship field 3008 is used for displaying the clause and is implementation specific.

Table 2 below conceptually illustrates the information that is maintained in an example sentence index of the present invention. Since the terms with syntactic and semantic annotations are stored in the term-clause index, the enhanced indexing information can be identified by the sentence index, but is not typically stored as part of it.

TABLE 2

| Field Name | Type | Description |
|---|---|---|
| sentid | indexed | Document id sentence id separated by '_' |
| sent_text | Stored | String content of the sentence |

Table 2 includes an indicator to the entire content of the sentence, and an identifier that will enable cross referencing to the internal clause ids of the clauses that constitute the sentences. The identifier also cross-references to the document that contains the sentence.

Table 3 below conceptually illustrates the information that is maintained in an example document index of the present invention. Since the terms with syntactic and semantic annotations are stored in the term-clause index, the enhanced indexing information can be identified by the document index, but is not typically stored as part of it.

TABLE 3

| Field Name | Type | Description |
|---|---|---|
| doc_id | Indexed, stored | Document id |
| dhs_doc_id | stored | DHS_doc_id (URL in one embodiment) |
| title | Tokenized, Indexed, stored | Document title |
| creationDate | Indexed, stored | Document creation date; format: yyyy.MM.dd-HH:mm:ss |
| metatag | Tokenized, Indexed, stored | MetatagName#MetatagValue |
| content | Tokenized, Indexed, Not Stored | String content of the document |
| document_type | stored | Document type (HTML, MSWORD) |

The document index stores document tag information that is created typically during the data set preprocessing stage as well the meta-data tags and (an indicator to) the full document content. The type of the document is also maintained.

FIG. 31 is an example conceptual block diagram of sample contents of a document index of a Syntactic Query Engine.

The doc_id field 3101 contains a document identifier; the title filed 3102 contains a string representing the title, the creation-Date field 3103 indicates the date the document was created if known. The metadata field 3104 includes a series of meta data tags, each with the metadata name followed by its value. The content field 3105 contains an indicator to the string content of the document. The document_type field 3106 is an indicator of the format of document (such as an HTML file) determined typically during the data set preprocessing stage.

Although specific embodiments of, and examples for, methods and systems of the present invention are described herein for illustrative purposes, it is not intended that the invention be limited to these embodiments. Equivalent methods, structures, processes, steps, and other modifications within the spirit of the invention fall within the scope of the invention. The various embodiments described above can be combined to provide further embodiments. Also, all of the above U.S. patents and patent publications referred to in this specification, including U.S. patent application Ser. No. 10/007,299, filed on Nov. 8, 2001, entitled "Method and System for Enhanced Data Searching," and issued as U.S. Pat. No. 7,283,951 on Oct. 16, 2007; U.S. patent application Ser. No. 10/371,399, filed on Nov. 8, 2001, entitled "Method and System for Enhanced Data Searching", and issued as U.S. Pat. No. 7,398,201 on Jul. 8, 2008; and U.S. patent application Ser. No. 11/012,089, filed on Dec. 13, 2004, entitled "Method and System for Extending Keyword Searching to Syntactically and Semantically Annotated Data," and published as U.S. Patent Application No. 2005/0267871; are incorporated herein by reference, in their entirety.

Aspects of the invention can be modified, if necessary, to employ methods, systems and concepts of these various patents, applications and publications to provide yet further embodiments of the invention. In addition, those skilled in the art will understand how to make changes and modifications to the methods and systems described to meet their specific requirements or conditions. For example, the methods and systems described herein can be applied to any type of search tool or indexing of a data set, and not just the SQE described. In addition, the techniques described may be applied to other types of methods and systems where large data sets must be efficiently reviewed. For example, these techniques may be applied to Internet search tools implemented on a PDA, web-enabled cellular phones, or embedded in other devices. Furthermore, the data sets may comprise data in any language or in any combination of languages. In addition, the user interface and API components described may be implemented to effectively support wireless and handheld devices, for example, PDAs, and other similar devices, with limited screen real estate. These and other changes may be made to the invention in light of the above-detailed description. Accordingly, the invention is not limited by the disclosure.

The invention claimed is:

1. A computer-readable memory medium containing structured data that stores a relationship query, the query configured to be executed by a computer processor under control of a search engine to search a corpus of objects for objects that match the query, comprising:
   a base component that specifies one or more values for desired relationship parameters, the relationship parameters comprising one or more entity parameters, at least one action parameter, and at least one directional operator parameter that specifies a direction of relationship between one of the one or more entity parameters and the at least one action parameter;
   a prepositional constraint component that specifies a desired value for a prepositional phrase;
   a keyword constraint component that specifies one or more desired keyword values separately from and in addition to the values for the desired relationship parameters; and
   a metadata constraint component that specifies one or more desired values of metadata associated with each matching object;
   whereby, when the search engine causes the search to be executed, objects that match constraints specified by the base component, the prepositional constraint component, the keyword constraint component, and the metadata constraint component are determined to satisfy the query.

2. The memory medium of claim 1 wherein the corpus of objects is a corpus of documents.

3. The memory medium of claim 1 wherein one or more of the components of the relationship query are optional.

4. The memory medium of claim 1 wherein at least one of the components of the relationship query is specified.

5. The memory medium of claim 1 wherein at least one of the components of the relationship query contains a Boolean expression.

6. The memory medium of claim 1 wherein the base component specifies values for the desired relationship parameters in a general relationship form of:

Entity1 Directional-operator 1 Action Directional-operator2 Entity2 wherein at least one of Entity1, Entity2, and Action parameters contains a non null value that indicates a search term, the Directional-operator1 parameter specifies the direction of the relationship between the Entity1 and the Action parameters, and the Directional-operator2 parameter specifies the direction of the relationship between the Entity2 and the Action parameters.

7. The memory medium of claim 6 wherein a value of the Directional-operator1 and Directional-operator2 parameters is one of a greater-than symbol (">"), a right arrow symbol ("->"), a less-than symbol ("<"), a left arrow symbol ("<-") or a combination indicating a bi-directional relationship ("<>" or "<->").

8. The memory medium of claim 6 wherein a specification of a value of ">" or "->" for the Directional-operator1 parameter indicates that the value indicated by the Entity1 parameter is a subject of the value indicated by the Action parameter.

9. The memory medium of claim 6 wherein a specification of a value of "<" or "<-" for Directional-operator1 parameter indicates that the value indicated by the Entity1 parameter is an object of the value indicated by the Action parameter.

10. The memory medium of claim 6 wherein a specification of a value of ">" or "->" for Directional-operator2 parameter indicates that the value indicated by the Entity2 parameter is an object of the value indicated by the Action parameter.

11. The memory medium of claim 6 wherein a specification of a value of "<" or "<-" for Directional-operator2 parameter indicates that that the value indicated by the Entity2 parameter is a subject of the value indicated by the Action parameter.

12. The memory medium of claim 6 wherein a value for the Action parameter indicates a search term that represents at least one of a particular verb, similar verbs, or an action type.

13. The memory medium of claim 6 wherein a value for the Action parameter that is in the form of a quoted verb indicates a particular verb; a value for the Action parameter that in the form of an unquoted verb indicates similar verbs to that which is specified; and a value for the Action parameter that is in the form of a bracketed verb indicates an action type.

14. The memory medium of claim 6 wherein a value for the Entity1 or the Entity2 parameter is a noun or noun phrase.

15. The memory medium of claim 6 wherein a value for the Entity1 or the Entity2 parameter is a modifier.

16. The memory medium of claim 1 wherein the prepositional constraint component comprises a word or a symbol followed by at least one search term.

17. The memory medium of claim 16 wherein the word is the phrase "PREP CONTAINS" or the symbol is the character "^" followed by the at least one search term.

18. The memory medium of claim 1 wherein the keyword constraint component comprises a word or a symbol followed by at least one search term.

19. The memory medium of claim 18 wherein the word is the phrase "DOCUMENT CONTAINS" or the symbol is the character ";" followed by the at least one search term.

20. The memory medium of claim 1 wherein the metadata constraint component comprises a word or a symbol followed by at least one value.

21. The memory medium of claim 20 wherein the word is the phrase "METADATA CONTAINS" or the symbol is the character "#" followed by at least one expression that specifies a desired value for a metadata variable.

22. The memory medium of claim 1 wherein a wildcard can be specified as the value of a search term of a prepositional constraint component, a keyword constraint component, or a metadata constraint component or as a parameter of the base component.

23. The memory medium of claim 22 wherein the wildcard is at least one of a single character wildcard operator, the characters "*" or "?", a multi-character wildcard operator, or a word wildcard operator.

24. The memory medium of claim 1 wherein square brackets are used to indicate an action type, an entity type, or an entity classification.

25. A computer-based search engine programmed and configured to process relationship queries that are stored in the structured data contained in the computer readable memory medium and configured according to claim 1.

26. A method in a computer system comprising storing relationship queries as data in the structured data contained in the computer readable memory medium and configured according to claim 1.

27. The memory medium of claim 1 wherein the direction of directional operator parameter indicates a grammatical role of the one of the one or more entity parameters.

* * * * *